US012492841B2

(12) United States Patent
Lecoq et al.

(10) Patent No.: US 12,492,841 B2
(45) Date of Patent: Dec. 9, 2025

(54) DUAL SOURCE HEAT PUMP SYSTEM

(71) Applicant: Schlumberger Technology Corporation, Sugar Land, TX (US)

(72) Inventors: Olivier Lecoq, Clamart (FR); Matthieu Simon, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/924,283

(22) Filed: Oct. 23, 2024

(65) Prior Publication Data
US 2025/0129967 A1   Apr. 24, 2025

Related U.S. Application Data

(60) Provisional application No. 63/592,298, filed on Oct. 23, 2023.

(51) Int. Cl.
*F24F 13/30* (2006.01)
*F24F 11/67* (2018.01)
(Continued)

(52) U.S. Cl.
CPC ............. *F24F 13/30* (2013.01); *F24F 11/67* (2018.01); *F24F 11/84* (2018.01); *F24F 2110/10* (2018.01)

(58) Field of Classification Search
CPC .. F24F 13/30; F24F 11/84; F24F 11/67; F24F 2110/10; F24F 2005/0057; F24F 5/0046; F25B 30/06; Y02B 10/40
See application file for complete search history.

(56) References Cited

U.S. PATENT DOCUMENTS 4,062,489 A * 12/1977 Henderson .......... F24D 11/0221
                                                62/235.1
4,091,636 A *  5/1978 Margen .................. F25B 30/06
                                                165/45
(Continued)

FOREIGN PATENT DOCUMENTS

CN        209726509 U      12/2019
EP          3770514 A1       1/2021
(Continued)

OTHER PUBLICATIONS

"Micro channel heat exchangers", downloaded on Apr. 4, 2025 from the internet at [https://www.danfoss.com/en/products/dcs/heat-exchangers/micro-channel-heat-exchangers/#tab-overview], Danfoss, 7 pages.

*Primary Examiner* — Nelson J Nieves
(74) *Attorney, Agent, or Firm* — Jeffrey D. Frantz

(57) ABSTRACT

A thermal system for a facility includes a facility fluid circuit, a ground-source heat pump, and an air-source heat pump. The ground-source heat pump and the air-source heat pump each include a fluid circuit connected to the facility fluid circuit in parallel via a common facility heat exchanger. The ground-source heat pump includes a ground-source heat exchanger for transferring heat between a ground-source working fluid and a downhole fluid of a downhole fluid circuit. The air-source heat pump includes an air-source heat exchanger for transferring heat between an air-source working fluid and an ambient air. Heat can be transferred, at the facility heat exchanger, between the facility fluid and one or more of the ground-source working fluid or the air-source working fluid in order to provide thermal heating, cooling, or both to the facility.

20 Claims, 54 Drawing Sheets

(51) Int. Cl.
*F24F 11/84* (2018.01)
*F24F 110/10* (2018.01)

(56) References Cited

U.S. PATENT DOCUMENTS

| | | | |
|---|---|---|---|
| 4,375,831 | A | 3/1983 | Downing, Jr. |
| 4,993,483 | A * | 2/1991 | Harris ............... F24T 10/15 165/104.31 |
| 5,465,588 | A * | 11/1995 | McCahill ............ F24D 15/04 62/238.7 |
| 6,233,951 | B1 * | 5/2001 | Cardill ............... F24F 5/0046 62/81 |
| 8,726,682 | B1 * | 5/2014 | Olson ................ F24F 5/0046 62/235.1 |
| 8,794,015 | B1 | 8/2014 | Dahlen |
| 9,797,611 | B2 | 10/2017 | Gault |
| 10,535,245 | B2 | 1/2020 | Callemo |
| 12,181,179 | B2 * | 12/2024 | Taras ................. F25B 30/02 |
| 12,241,664 | B2 * | 3/2025 | Dunn ................. F25B 30/06 |
| 2007/0151286 | A1 | 7/2007 | Park |
| 2007/0235179 | A1 * | 10/2007 | Phillips ............. F24F 5/0046 165/254 |
| 2010/0108290 | A1 | 5/2010 | Maxwell |
| 2011/0042057 | A1 * | 2/2011 | Li ..................... F24F 5/0046 165/59 |
| 2011/0048037 | A1 * | 3/2011 | Graslund ........... F28D 20/0052 62/260 |
| 2011/0272117 | A1 | 11/2011 | Hamstra et al. |
| 2012/0067300 | A1 | 3/2012 | Berrio |
| 2012/0125019 | A1 * | 5/2012 | Sami ................. F25B 30/06 62/235.1 |
| 2015/0033779 | A1 | 2/2015 | Seggerman |
| 2015/0219365 | A1 * | 8/2015 | Zaynulin ........... F24D 19/1045 165/45 |
| 2015/0267941 | A1 * | 9/2015 | Kato .................. F25B 49/02 62/235.1 |
| 2015/0292759 | A1 * | 10/2015 | Ding ................. H05K 7/20945 165/45 |
| 2016/0320097 | A1 * | 11/2016 | Leiper ............... F25B 49/02 |
| 2017/0016653 | A1 | 1/2017 | Kim |
| 2017/0138639 | A1 * | 5/2017 | Andrews ............ E04F 17/04 |
| 2017/0314822 | A1 | 11/2017 | Wong |
| 2018/0335219 | A1 | 11/2018 | Callemo et al. |
| 2021/0095896 | A1 * | 4/2021 | Andrews ............ F24T 10/10 |
| 2021/0404696 | A1 * | 12/2021 | Jacobi ............... C02F 3/006 |
| 2022/0400625 | A1 * | 12/2022 | Gordon .............. A01G 9/245 |
| 2023/0349568 | A1 * | 11/2023 | Nguyen .............. F24F 5/0046 |
| 2025/0003602 | A1 * | 1/2025 | Simppala ........... F24D 19/1072 |
| 2025/0043962 | A1 * | 2/2025 | Göransson ......... F24D 17/02 |

FOREIGN PATENT DOCUMENTS

| | | | | |
|---|---|---|---|---|
| EP | 3809050 | A1 | 4/2021 | |
| JP | 2013190202 | A * | 9/2013 | |
| JP | 2013238371 | A * | 11/2013 | |
| JP | 2013245874 | A * | 12/2013 | ........... F24F 5/0046 |
| JP | 2014228238 | A * | 12/2014 | |
| JP | 2015028418 | A * | 2/2015 | |
| JP | 2015124918 | A * | 7/2015 | |
| JP | 2015129616 | A * | 7/2015 | |
| JP | 2018200168 | A * | 12/2018 | |
| KR | 100926480 | B1 | 11/2009 | |
| WO | 2025054633 | A1 | 3/2025 | |

* cited by examiner

DUAL SOURCE HEAT PUMP SYSTEM

CROSS REFERENCE TO RELATED APPLICATIONS

This application claims priority and the benefit of U.S. Patent Application No. 63/592298, filed on Oct. 23, 2023, which is hereby incorporated by reference in its entirety.

BACKGROUND OF THE DISCLOSURE

It is becoming ever more important to limit the emission of carbon dioxide, for example, in view of climate change. One particular approach has often been the efficient and renewable use of energy resources for human activities. For instance, heating and cooling systems for buildings and other facilities, whether industrial, commercial, or residential, may typically use a substantial amount of energy. Accordingly, optimizing heating and cooling systems to operate more efficiently and with renewable energy resources may be advantageous.

SUMMARY

In some embodiments, a thermal system for a facility includes a facility fluid circuit, and a ground-source heat pump and an air-source heat pump each thermally connected to the facility fluid circuit. The facility fluid circuit includes a facility fluid for circulating in the facility to provide thermal conditioning of the facility, a facility heat exchanger for exchanging heat with the facility fluid. The ground-source heat pump includes a ground-source heat pump fluid circuit, a ground-source heat exchanger positioned on the ground-source heat pump fluid circuit and configured to exchange heat with a downhole fluid, the facility heat exchanger positioned on the ground-source heat pump fluid circuit, and a ground-source working fluid for circulating through the ground-source heat pump fluid circuit to exchange heat with the facility fluid at the facility heat exchanger, and to exchange heat with the downhole fluid of a downhole fluid circuit at the ground-source heat exchanger. The air-source heat pump includes an air-source heat pump fluid circuit, an air-source heat exchanger positioned on the air-source heat pump fluid circuit and configured to exchange heat with an ambient air, the facility heat exchanger positioned on the air-source heat pump fluid circuit, and an air-source working fluid for circulating through the air-source heat pump fluid circuit to exchange heat with the facility fluid at the facility heat exchanger, and to exchange heat with the ambient air at the air-source heat exchanger.

In some embodiments, a thermal unit for connecting to a facility fluid circuit of a facility for providing thermal conditioning to the facility based on exchanging heat with a facility fluid of the facility fluid circuit includes an enclosure having a return coupling for receiving a return flow of the facility fluid from the facility and having a supply coupling for providing a supply flow of the facility fluid to the facility. The thermal unit includes a facility heat exchanger positioned within the enclosure for exchanging heat with the facility fluid. The thermal unit includes a ground-source heat pump positioned within the enclosure. The ground-source heat pump includes a ground-source heat pump fluid circuit, a ground-source heat exchanger positioned on the ground-source heat pump fluid circuit and configured to exchange heat with a downhole fluid of a downhole fluid circuit, the facility heat exchanger positioned on the ground-source heat pump fluid circuit, and a ground-source working fluid for circulating through the ground-source heat pump fluid circuit to exchange heat with the facility fluid at the facility heat exchanger, and to exchange heat with the downhole fluid at the ground-source heat exchanger. The thermal unit includes an air-source heat pump positioned within the enclosure. The air-source heat pump includes an air-source heat pump fluid circuit, an air-source heat exchanger positioned on the air-source heat pump fluid circuit and configured to exchange heat with an ambient air, the facility heat exchanger positioned on the air-source heat pump fluid circuit, and an air-source working fluid for circulating through the air-source heat pump fluid circuit to exchange heat with the facility fluid at the facility heat exchanger, and to exchange heat with the ambient air at the air-source heat exchanger. The ground-source heat pump and the air-source heat pump are connected to the facility heat exchanger in parallel and the thermal unit is configured to exchange heat between the facility fluid and the ambient air, and between the facility fluid and the downhole fluid.

In some embodiments, a method of providing thermal conditioning to a facility includes circulating a ground-source working fluid through a ground-source heat pump fluid circuit including exchanging heat between the ground-source working fluid and a facility fluid at a facility heat exchanger positioned on the ground-source heat pump fluid circuit, and exchanging heat between the ground-source working fluid and a downhole fluid at a ground-source heat exchanger positioned on the ground-source heat pump fluid circuit. The method includes circulating an air-source working fluid through an air-source heat pump fluid circuit, including, exchanging heat between the air-source working fluid and the facility fluid at the facility heat exchanger positioned on the air-source heat pump fluid circuit, and exchanging heat between the ground-source working fluid and an ambient air at an air-source heat exchanger positioned on the air-source heat pump fluid circuit. The method includes conditioning the facility fluid to generate a conditioned facility fluid based on circulating the ground-source working fluid and the air-source working fluid, and circulating the conditioned facility fluid through a facility fluid circuit through the facility to provide the thermal conditioning to the facility.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 illustrates and example schematic diagram of a thermal system, according to at least one embodiment of the present disclosure;

FIG. 2-2 illustrates and example of the thermal system of FIG. 2-1 operating in a dual heating mode, according to at least one embodiment of the present disclosure;

FIG. 2-3 illustrates and example of the thermal system of FIG. 2-1 operating in a dual cooling mode, according to at least one embodiment of the present disclosure;

FIGS. 3-1 through 3-3 illustrate example schematic diagrams of a thermal system, according to at least one embodiment of the present disclosure;

FIGS. 4-1 and 4-2 illustrate example schematic diagrams of a thermal system, according to at least one embodiment of the present disclosure;

FIGS. 5-1 through 5-3 illustrate example schematic diagrams of a thermal system, according to at least one embodiment of the present disclosure;

FIG. 6-1 illustrates an example schematic diagram of a thermal system, according to at least one embodiment of the present disclosure;

FIGS. 6-2 through 6-7 illustrate various operating modes of the thermal system of FIG. 6-1 with respect to a secondary facility heat exchanger, according to embodiments of the present disclosure;

FIG. 7-1 through 7-3 illustrates an example schematic diagram of a thermal system, according to at least one embodiment of the present disclosure;

FIG. 8-1 illustrates an example schematic diagram of a thermal system, according to at least one embodiment of the present disclosure;

FIG. 8-2 illustrates an example schematic diagram of a thermal system, according to at least one embodiment of the present disclosure;

FIG. 9-1 illustrates an example schematic diagram of a thermal system, according to at least one embodiment of the present disclosure;

FIG. 9-2 illustrates an example schematic diagram of a thermal system, according to at least one embodiment of the present disclosure;

FIG. 9-3 illustrates an example schematic diagram of a thermal system, according to at least one embodiment of the present disclosure;

FIGS. 9-4 through 9-29 illustrate various operating modes or configurations of the thermal system of FIG. 9-3, according to embodiments of the present disclosure; and FIG. 10 illustrates a flow diagram for a method 1000 or a series of acts for providing thermal conditioning of a facility as described herein, according to at least one embodiment of the present disclosure.

DETAILED DESCRIPTION

Figure 1:
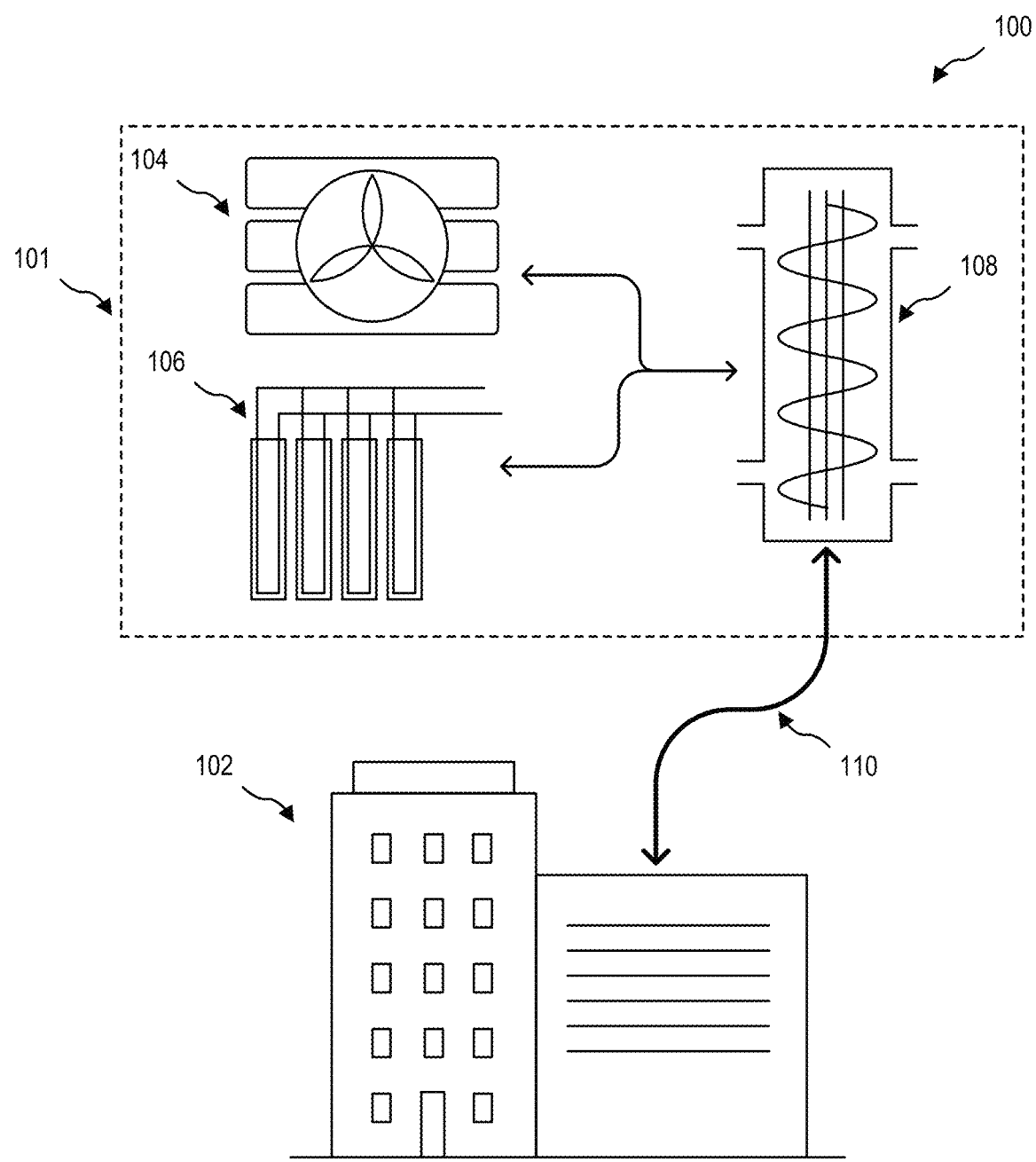
FIG. 1 illustrates an example of a thermal system for providing heating and/or cooling to a facility, according to at least one embodiment of the present disclosure.

This disclosure generally relates to a heating and/or cooling thermal system with an integrated heat pump system connected to two sources, such as air and a geological formation. For example, the thermal system includes an air-source heat pump for exchanging heat with an ambient air, as well as a ground-source heat pump system for exchanging heat with a geological formation through an open-or closed-loop system like a borehole heat exchanger. In some cases, these two heat pumps are independently controlled and are connected and operated in parallel to provide heating and/or cooling to a facility. For instance, a facility fluid may circulate through a facility for providing thermal conditioning to the facility, and the facility fluid may exchange heat with both the air-source heat pump system and the ground-source heat pump system.

In some embodiments, the thermal system can include one or more additional thermal components, for example, for meeting other thermal loads of the facility, increasing efficiency, managing ground temperatures, etc. For example, the thermal system may include thermal components for providing domestic hot water to the facility, secondary heating and/or cooling to the facility, as well as cooling directly from the borefield (e.g., for data center cooling). The thermal system may include thermal components for recovering thermal energy from exhaust air that would otherwise be exhausted from the building and lost, as well as thermal components for pre-conditioning inlet air that flows into the facility.

By utilizing two or more different thermal sources (e.g., the air and the ground), and by selectively implementing each heat pump system, the thermal systems described herein may operate at considerable efficiency. For example, the thermal system may implement, or more heavily utilize, the heat pump system having the source that has the most favorable operating conditions (e.g., temperatures) at a given time, leading to efficiency gains. The thermal systems described herein may also be configured to provide many or all of the thermal needs of a facility, reducing the cost, complexities, and inefficiencies of implementing multiple different thermal subsystems for different thermal needs. For instance, the thermal systems described herein may be housed, packaged, or otherwise contained within an enclosure, module, or unit, for example, for transporting to a facility and implementing (e.g., positioning) at or on the facility. By implementing a thermal system in this way (e.g., as a thermal unit) designed to handle many or all of the thermal needs of a facility, the total energy use by the facility may be better optimized by controlling the energy use with a single control system.

Such a packaged, thermal unit may include all of the fluid circuits and working fluids (and/or couplings for connecting to associated fluid circuits), pumps, valves, sensors, controllers (e.g., processor), etc., for implementing the thermal system and meeting the thermal needs of a facility as one centralized, integrated system. For instance, the thermal system may integrate multiple sensors for taking relevant measurements. For example, the thermal system may measure energy fluxes to and/or from the ground such as through inlet temperatures, outlet temperatures, and flowrates of a downhole fluid through a borehole heat exchanger. The thermal system may measure energy fluxes to and/or from the air, as well as to and/or from the facility, by measuring, for example, the supply air temperature, the return air temperature, and air flow rates. The thermal system may measure the electricity consumption of the various components such as compressors, fans and/or circulation pumps. Based on these sensor measurements, the thermal system may determine a system efficiency, such as coefficients of performance for the air and ground heat pump subsystems.

The thermal system may leverage this information and more to calibrate digital models of the thermal system, in order to identify and implement an efficient control strategy. For example, the system efficiency may be optimized, based on shifting and/or leveraging and selectively implementing the air energy source and/or ground energy source based on the current operating conditions (e.g., temperatures) of the sources to transfer thermal energy in an efficient manner. For example, the various components, heat pumps, fluid circuits, etc. of the thermal system described herein may be selectively operated and/or modulated in connection with a control strategy to increase the efficiency of compressor and/or circulation pump usage, leverage sources of thermal energy in an advantageous way, and to manage the temperature of the ground thermal battery in the short and long term (e.g., over the course of a year as well as over the course of a regulatory period, such as 25 of 50 years). In this way, the thermal system may be controlled to meet various objectives, such as efficiency objectives, while meeting the thermal needs (both current and forecasted) of the facility. The thermal system may also leverage sensor data and other measurements, coupled with the digital models, to estimate the health of the thermal system, including predicting potential failures before they arise, or predicting a need for maintenance.

Turning now to FIG. 1, this figure illustrates a thermal system 100 for providing heating and/or cooling to a facility 102. The thermal system 100 is in thermal communication with the facility 102 via a flow of a facility fluid 110, which may be a gaseous thermal fluid such as air or may be a liquid thermal fluid such as water, glycol, etc. The facility 102 may be any structure, building, area, or space that may have one or more thermal loads, or which may require thermal conditioning, such as in the form of heating, cooling, hot water, cold water, etc. For instance, the facility 102 may be a building, group, or campus of several buildings, a warehouse, etc.

The thermal system 100 may be a dual-source thermal system. For example, the thermal system 100 may include a dual-source heat pump system, which may have one or more heat pump circuits that are configured to exchange heat with one or more sources. For example, the thermal system 100 may include an air-source heat pump system 104 for exchanging heat or calories with an air source, such as with ambient air and/or exhaust air exhausted from the building. The thermal system 100 may include a ground-source heat pump system 106 for exchanging heat or calories with a ground source, such as a geological formation (e.g., including any underground source which may include underground air, water, or other fluids) through a borehole heat exchanger. The air-source and ground-source heat pump systems 104, 106 may each be in thermal communication with a facility heat exchanger 108 for transferring heat to and/or from the facility fluid 110 through the facility heat exchanger 108.

In this way, thermal conditioning of the facility 102 may be facilitated through the thermal system 100. For example, the ground-source heat pump system 106 and the air-source heat pump system 104 may be implemented in parallel to each provide heating and/or cooling to the facility heat exchanger 108. Each heat pump system may be operated independently of the other in order to provide thermal conditioning to satisfy thermal loads at an increased efficiency, for example, based on the operating conditions of a given source. In this way, the thermal system 100 may provide improvements to the efficiency, operating cost, carbon emissions, etc. of providing heat and/or cooling (e.g., thermal conditioning to satisfy thermal needs as described herein) to the facility 102.

The thermal system 100 may also be implemented as a packaged, plug-and-play thermal system (e.g., thermal unit) for implementing at or on the facility 102. For example, as described herein, one or more (or all) of the components of the thermal system 100 may be contained within an enclosure 101, which may facilitate transporting the thermal system 100 to the facility 102, and positioning, implementing, connecting, maintaining, and operating the thermal system 100 for providing thermal conditioning to satisfy various thermal loads of the facility 102. For instance, the thermal system 100 may be implemented as a single plug-and-play module or unit, which may be implemented on a roof of the facility, within the facility, etc. In this way, the thermal system 100 may be implemented to replace or forego the need for an onsite technical or mechanical room for implementing, managing, operating, etc. multiple different thermal systems associated with multiple different thermal needs of the facility 102. For instance, in some embodiments the thermal system 100 may be implemented to cover and/or replace other thermal equipment for providing heating and/or cooling to the facility 102 (e.g., hot and/or cool air) including providing both heating and cooling simultaneously, as well as for providing hot and/or cold water to the facility 102.

The thermal system 100 may accordingly provide a reduction in the capital expense of the facility 102, by reducing the number of systems and/or components needed for meeting different thermal needs of the facility 102. Additionally, the thermal system 100 may provide improved overall performance of heating and/or cooling of the facility 102, such as by increasing the usage of renewable energy at the facility.

Figures 1, 2:
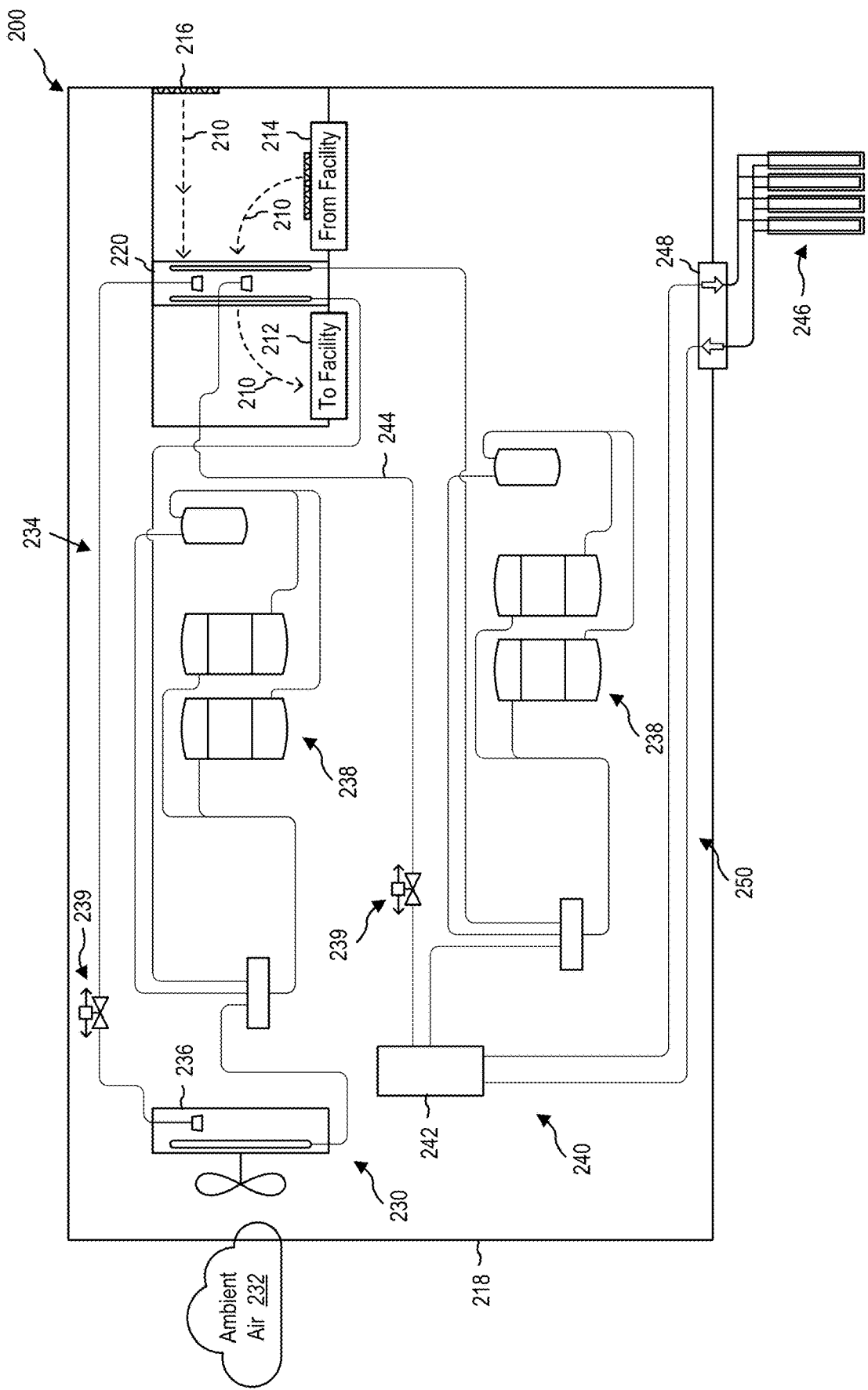
Figure 2:
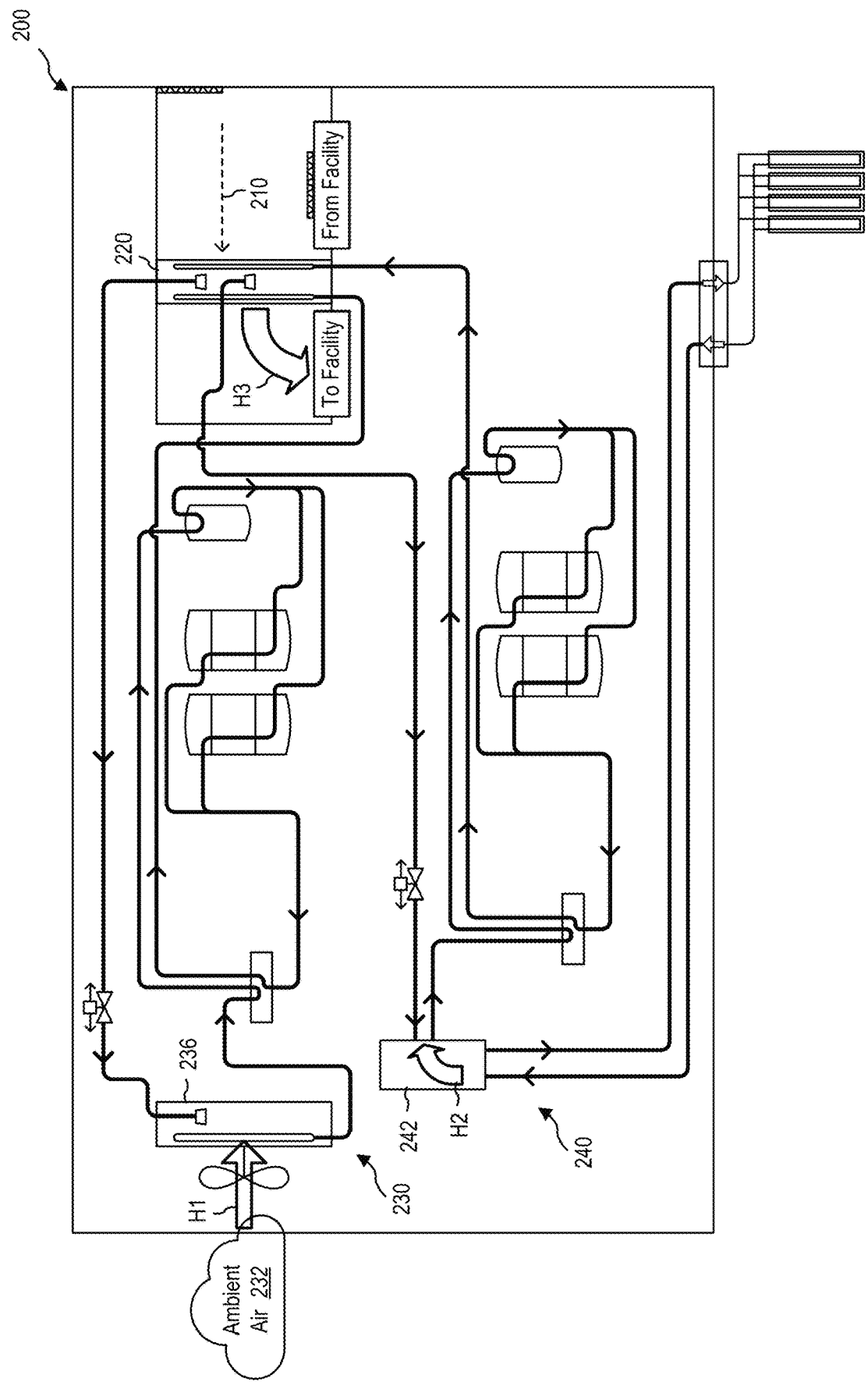

FIG. 2-1 illustrates an example schematic diagram of a thermal system 200, according to at least one embodiment of the present disclosure. The thermal system may be implemented for providing heating and/or cooling to a facility via a flow of a facility fluid 210. The facility fluid 210 may be air which may circulate within the facility to provide thermal conditioning to the facility. For instance, the thermal system 200 may include an air supply 212 through which the facility fluid 210 may flow from the thermal system 200 to the facility, and may include an air return 214 through which the facility fluid 210 may flow from the facility to the thermal system 200. In some cases, the thermal system 200 may include an air inlet 216 through which inlet air, such as outside air or fresh air, may flow to circulate through the facility as part of the facility fluid 210.

The thermal system 200 includes a facility heat exchanger 220. The facility heat exchanger 220 may be positioned such that the facility fluid 210 flows through the facility heat exchanger 220 to thermally condition the facility fluid 210 before it flows to the facility through the air supply 212. For instance, the facility fluid 210 may exchange heat through the facility heat exchanger 220 in order to heat or cool the facility fluid 210.

The thermal system 200 includes an air-source heat pump 230. The air-source heat pump 230 is thermally connected to the facility heat exchanger 220 as well as to an ambient air 232 for exchanging heat between the ambient air and the facility fluid 210. For example, the air-source heat pump 230 includes an air-source heat exchanger 236. The air-source heat exchanger 236 may include one or more fins, tubes, coils, plates, or any other type of heat exchanger for transferring heat to and/or from the ambient air 232. In some embodiments, the air-source heat exchanger 236 includes or is associated with a fan, pump, or other means for forcing air to facilitate heat transfer. The thermal system 200 may include ductwork or other suitable fluid passage or coupling for providing the ambient air 232 to the air-source heat exchanger 236. For example, the ambient air 232 may be fresh air or outside air captured outside of the enclosure 218 and/or exhaust air exhausted from the building. The thermal system 200 may include one or more dampers, fans, motive devices, etc., for providing the ambient air 232 in this way.

The air-source heat pump 230 is implemented via an air-source heat pump fluid circuit 234. For example, the air-source heat pump fluid circuit 234 may include a system of pipes, tubes, channels, lines, etc., through which an air-source working fluid may be circulated. For instance, the air-source working fluid may be a coolant, refrigerant, thermal fluid, or any other suitable fluid for implementing the heat pump techniques of the air-source heat pump 230. The air-source heat pump 230 includes one or more compressors 238 and one or more expansion valves 239 positioned on the air-source heat pump fluid circuit 234. In this way, the air-source heat pump 230 may implement a refrigerant cycle for transferring heat at the facility heat exchanger 220 and at the air-source heat exchanger 236 based on performing mechanical work (e.g., compressing and/or expanding) the air-source working fluid. The air-source heat pump 230 may include one or more pumps and/or valves for directing the flow of the air-source working fluid through various fluid paths and with respect to various operating modes as described herein. In some embodiments, the air-source heat pump 230 includes one or more decoupling tanks or buffer tanks.

The air-source heat pump 230 may be reversible, or may work in two, reversible directions of a refrigerant cycle. For example, in a first mode or direction, the air-source heat pump 230 may be operated to extract heat from the ambient air 232 and transfer the heat to the facility fluid 210. In a second mode or direction, the air-source heat pump 230 may be operated to extract heat from the facility fluid 210 and transfer the heat to the ambient air 232. In this way, the thermal system 200 may provide thermal conditioning to the facility fluid 210 with the air-source heat pump 230.

On the FIG. 1, the air source heat pump has been represented as being connected to ambient air but in other embodiments, it may be connected to other air source, such as exhaust air exhausting from the building. In one embodiment, the air source heat exchanger may be selectively connected to the ambient air and/or the exhaust air depending on the temperature of the source and the building. For instance, the air source heat exchanger may be connected to the hottest air sources if in heating mode or the coolest air source if in cooling mode. In another example, the air source heat exchanger may receive air from both sources, the proportion of flow of air received from each of the source may be controlled depending on the temperature of the source and the building needs.

The thermal system 200 includes a ground-source heat pump 240. The ground-source heat pump 240 is thermally connected to the facility heat exchanger 220 as well as to a downhole fluid circuit 250 for exchanging heat between the facility fluid 210 and a downhole fluid of the downhole fluid circuit 250. For example, the ground-source heat pump 240 includes a ground-source heat exchanger 242. The ground-source heat exchanger 242 may be a heat exchanger (e.g., liquid-to-liquid) of any suitable type for facilitating the exchange of heat between the ground-source heat pump 240 and the downhole fluid circuit 250.

The ground-source heat pump 240 is implemented via a ground-source heat pump fluid circuit 244. For example, the ground-source heat pump fluid circuit 244 includes a system of pipes, tubes, channels, lines, etc., through which a ground-source working fluid may be circulated. For instance, the ground-source working fluid may be a coolant, refrigerant, thermal fluid, or any other suitable fluid for implementing the heat pump techniques of the ground-source heat pump 240. The ground-source heat pump 240 also includes one or more compressors 238 and one or more expansion valves 239 positioned on the ground-source heat pump fluid circuit 244. In this way, the ground-source heat pump 240 may implement a refrigerant cycle for transferring heat at the facility heat exchanger 220 and at the ground-source heat exchanger 242 based on performing mechanical work on (e.g., compressing and/or expanding) the ground-source working fluid. The ground-source heat pump 240 may include one or more pumps and/or valves for directing the flow of the ground-source working fluid through various fluid paths and with respect to various operating modes as described herein. In some embodiments, the ground-source heat pump 240 includes one or more decoupling tanks or buffer tanks.

The downhole fluid circuit 250 may be a fluid circuit for facilitating exchanging heat between the ground-source heat pump 240 and a geological formation or other underground thermal source. For example, the downhole fluid may flow through the downhole fluid circuit 250 and may flow between the ground-source heat exchanger 242 and a borehole heat exchanger 246. The borehole heat exchanger 246 may include one or more boreholes of a borefield through which a downhole fluid may flow in order to exchange heat with the geological formation. The borehole heat exchanger 246 may be situated at, near, or in the neighborhood of, or otherwise in association with the facility. The downhole fluid may be water, glycol, a mixture thereof, or any other appropriate thermal fluid.

The thermal system 200 may include a portion of the downhole fluid circuit 250. For example, one or more lines, flow paths, pipes, etc., of the downhole fluid circuit 250 may be included as part of the thermal system 200 and/or the enclosure 218. The thermal system 200 may include a downhole coupling 248 for facilitating the connection of the portion of the downhole fluid circuit included in the thermal system with the remainder of the downhole fluid circuit, including connecting to the borehole heat exchanger 246. In this way, in some cases, the borehole heat exchanger 246 may be external to, or may not be considered as part of or included in the thermal system 200. For instance, as described herein, some or all of the thermal system 200 may be included within an enclosure, module, or unit, and the borehole heat exchanger 246 may not be included within that enclosure.

Accordingly, the thermal system 200 includes both the air-source heat pump 230 and the ground-source heat pump 240. The air-source heat pump 230 and the ground-source heat pump 240 may be implemented independently. For example, the air-source heat pump fluid circuit 234 and the ground-source heat pump fluid circuit 244 may be distinct fluid circuits for circulating distinct working fluids. In this way, an operation of the air-source heat pump 230 (e.g., circulation of the air-source working fluid) to exchange heat with the facility fluid 210 may be implemented independent of an operation of the ground-source heat pump 240, and vice versa. The air-source heat pump 230 and the ground-source heat pump 240 may each be connected to the facility heat exchanger 220. For example, the facility heat exchanger 220 may be common to and/or may be included on both the air-source heat pump fluid circuit 234 as well as the ground-source heat pump fluid circuit 244. For instance, the facility heat exchanger 220 may include two heat exchangers (e.g., one for each heat pump) that are positioned in parallel or in series such that the facility fluid 210 flows through both of the heat exchangers, and therefore exchanges heat with both the air-source heat pump 230 and the ground-source heat pump 240 (e.g., when both heat pumps are in operation). For instance, the heat exchangers (e.g., for each heat pump) of the facility heat exchanger 220 may be connected together; may be included within the same unit, enclosure, housing, or package; or may otherwise be positioned, coupled, or associated together as the facility heat exchanger 220.

The thermal system 200 may implement either, or both of, the air-source heat pump 230 or the ground-source heat pump 240 to provide thermal conditioning of the facility fluid 210. For example, if the ambient air 232 has more favorable conditions (e.g., more advantageous or efficient operating temperatures) at a specific time for a given operating mode than the geological formation, the thermal system 200 may implement the air-source heat pump 230 to condition the facility fluid 210. In some embodiments, if the geological formation has more favorable conditions (e.g., more advantageous or efficient operating temperatures) at another specific time for a given operating mode than the ambient air 232, the thermal system 200 may implement the ground-source heat pump 240 to condition the facility fluid 210. In some cases, both the ground-source heat pump 240 and the air-source heat pump 230 may be implemented to condition the facility fluid 210, for example, in parallel. For instance, if a thermal load of the facility exceeds the thermal conditioning capacity of one heat pump, the other may be implemented to supplement. In some cases, a mix of the two heat pumps may be implemented at various levels or percentages.

In this way, both (and in some cases, one or the other) of the air-source heat pump 230 and the ground-source heat pump 240 may be implemented to exchange heat with the facility fluid 210 and provide thermal conditioning to the facility. The thermal system 200 may include various sensors (e.g., temperature, pressure, flowrate, etc.) for monitoring and managing the operation of the thermal system 200. For example, the thermal system 200 may monitor temperatures at one or more of the ambient air 232, the borehole heat exchanger 246 (e.g., inlet and/or outlet temperatures), the geological formation (e.g., one or more ground locations), various locations along the air-source heat pump fluid circuit 234, various locations along the ground-source heat pump fluid circuit 244, the facility fluid, the facility, the downhole fluid circuit 250, or any other relevant temperature. Based on one or more of these temperatures (e.g., based on an identified thermal load of the facility), the thermal system 200 may operate one or more of the air-source heat pump 230 or the ground-source heat pump 240, each at a specified thermal power level, to provide the thermal load of the facility.

As described herein, in some embodiments, the air-source heat pump 230 and the ground-source heat pump 240 may be operated in a same operation mode, such as both operating in a heating mode or both operating in a cooling mode. In some embodiments, the air-source heat pump 230 and the ground-source heat pump 240 may be operated in different or opposite modes, such as one in a heating mode and the other in a cooling mode. In this way, the thermal system 200 may achieve the various features and benefits as described herein, for example, in connection with one or more additional heat exchangers.

In some embodiments, the thermal system 200 may be included within an enclosure 218. The enclosure may be a housing, unit, module, casing, or other enclosure within which the various components, systems, etc., of the thermal system 200 are situated. For example, the facility heat exchanger 220, the air-source heat pump 230, the ground-source heat pump 240 and the various components associated with each of these may be enclosed within the enclosure 218. In some embodiments, one or more components of the thermal system 200 may be considered included in the enclosure 218 when they are positioned on or at the enclosure 218, such as the downhole coupling 248 which may be positioned on and/or may penetrate through the enclosure 218.

The thermal system 200 included in the enclosure 218 may facilitate implementing the thermal system 200, for example, as an assembled, packaged thermal system (e.g., thermal unit) at the facility. For example, the thermal system 200 may be shipped or otherwise transported to the facility within the enclosure 218, and the enclosed thermal system 200 may be positioned at, near, or on the facility. This may facilitate implementing the thermal system 200, for example, by replacing one or more other thermal components, systems, or units, for example, on a roof or in a mechanical room of the facility. For instance, existing ductwork of the facility may be re-used by positioning the enclosure in an existing space or connected to an existing hole in a roof or ceiling of the facility. As described herein, one or more thermal systems may include additional or alternative thermal components (e.g., for providing hot and/or cold water, secondary conditioning, etc.), which may serve to replace or forego implementing other dedicated thermal systems or components at a facility. The thermal system 200 may include pumps, valves, sensors, controllers, processors, etc. incorporated at, on, or within the enclosure 218 for operating the thermal system 200 as described herein. In this way, the thermal system 200 may be transported to the facility, positioned in its desired location, and various circulation systems (e.g., hot and/or cold water and/or air circulation systems for flowing through the facility) may simply be connected to the thermal system 200 for a plug-and-play-type implementation to provide one or more (or all) thermal needs of the facility.

FIG. 2-2 illustrates an example of the thermal system 200 of FIG. 2-1 operating in a dual heating mode. As shown, the air-source heat pump 230 may be operated and may circulate the air-source working fluid such that heat H1 is transferred from the ambient air 232 to the air-source working fluid at the air-source heat exchanger 236. Similarly, the ground-source heat pump 240 may be operated and may circulate the ground-source working fluid such that heat H2 is transferred from the downhole fluid to the ground-source working fluid at the ground-source heat exchanger 242. Accordingly, heat H3 may be transferred from the air-source working fluid and from the ground-source working fluid to the facility fluid 210 at the facility heat exchanger 220. In this way, the thermal system 200 may provide heating to the facility with both the air-source heat pump 230 and the ground-source heat pump 240 operating in parallel.

The operation of the thermal system 200 includes transferring heat H1 (and/or H2) from the ambient air 232 (and/or from the downhole fluid) to the air-source working fluid (and/or to the ground-source working fluid) at the air-source heat exchanger 236 (and/or at the ground source heat exchanger 242), thereby evaporating the associated working fluid(s). Then, it includes compressing the evaporated working fluid(s) at the associated compressor(s) 238, thereby increasing significantly its temperature, and transferring the heat (H3) from the air-source working fluid and/or the ground-source working fluid to the facility fluid 210, thereby sometimes condensing the working fluid(s). After that, the working fluid(s) is/are expanded at the expansion valve(s) 239, further decreasing its temperature. The working fluid(s) is/are generally chosen to have a low evaporation temperature (for instance, below 0° C.), to allow the heat pump(s) to be able to work even when the downhole fluid and ambient air 232 are well below the comfort temperature of the facility.

As described herein, the air-source heat pump 230 and the ground-source heat pump 240 may be distinct, and may be operated independently. For example, in some cases, the ground-source heat pump 240 may be operated at a higher capacity than the air-source heat pump 230, or vice versa. For example, the ground-source heat pump 240 may be operated with a higher thermal power, and may provide more heat transfer to the facility fluid 210 than the air-source heat pump 230 (or vice versa). The thermal power(s) may be adjusted based on a flow rate of the fluids through the various fluid circuits described herein.

The operation of the heat pumps at different levels or power capacities in this way may facilitate fine tuning or optimizing the operation of the thermal system 200, for example based on the ambient and/or operating conditions of the associated sources of the heat pumps. For example, because the air-source heat pump 230 and the ground-source heat pump 240 are implemented with distinct fluid circuits, each heat pump can operate based on its own parameters, and the thermal system 200 may prioritize and/or more heavily weigh or operate one heat pump over the other based on having more favorable operating conditions to reach a target facility fluid temperature and without having one of the sources affecting the other source, sometimes losing efficiency. Accordingly, the ground-source heat pump 240 may be operated more efficiently to transfer heat to the ground-source working fluid via the ground-source heat exchanger 242 than can the air-source heat pump 230. The thermal system 200 may accordingly operate the ground-source heat pump 240 to provide more thermal conditioning (e.g., 60%, 70%, 80%, 90%, or 100%, or other ratio) than the air-source heat pump 230. The independent and parallel configuration of the heat pumps in this way facilitates operating the ground-source heat pump 240 with an increased efficiency without being limited to the relatively poorer operating conditions of the air-source heat pump 230. For instance, in a serial configuration, where the air-source heat exchanger 236 and the ground-source heat exchanger 242 may be implemented in series as part of a single fluid circuit, the operation of both the air-source heat exchanger 236 and the ground-source heat exchanger 242 would be limited to the worse operating conditions, negatively affecting efficiency of the thermal system. Similar situations are contemplated in which the air-source heat pump 230 may be operated more efficiently than the ground-source heat pump 240 based on having more favorable operating conditions of the ambient air 232.

Figures 2, 3:
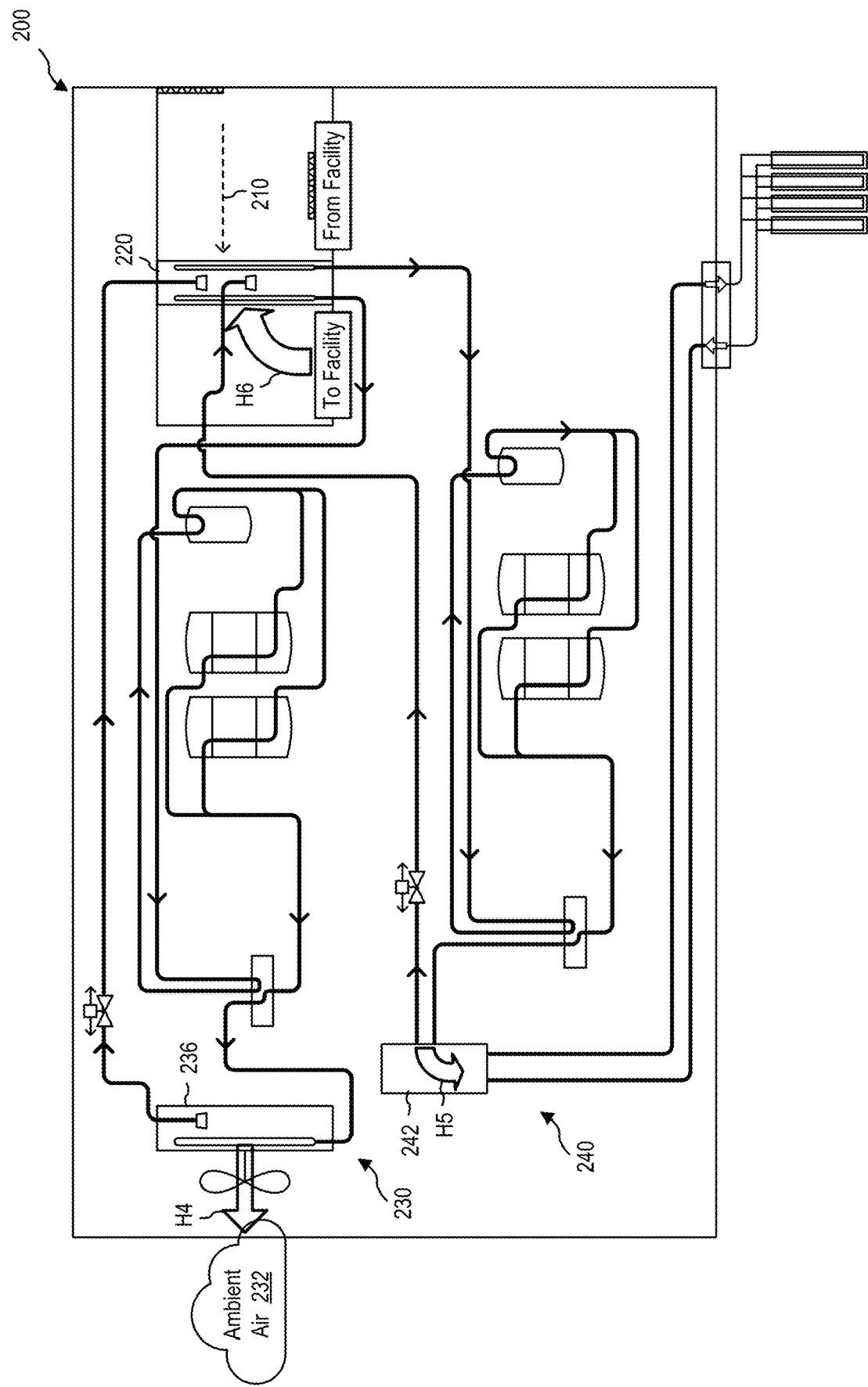
Figures 1, 3:
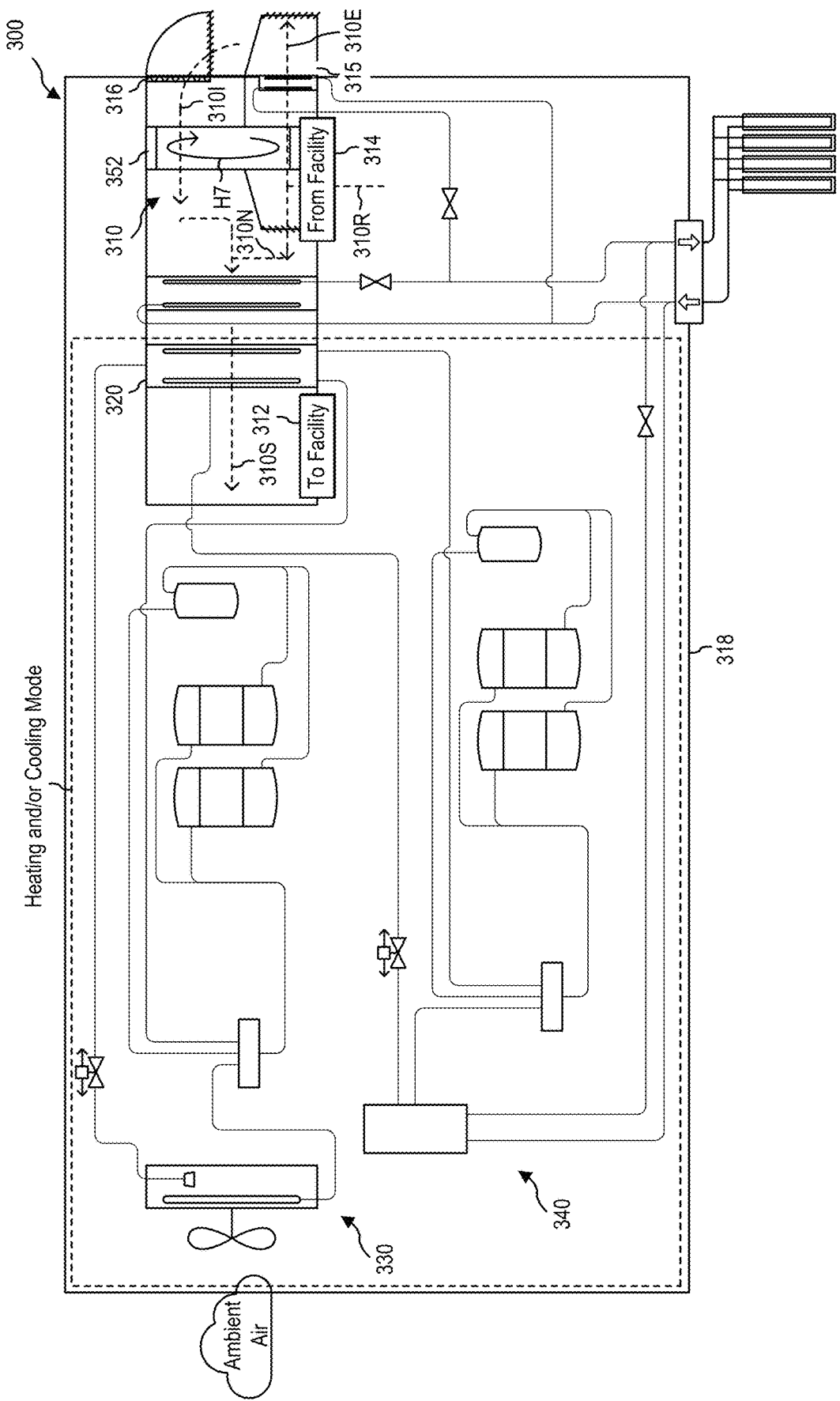
Figures 2, 3:
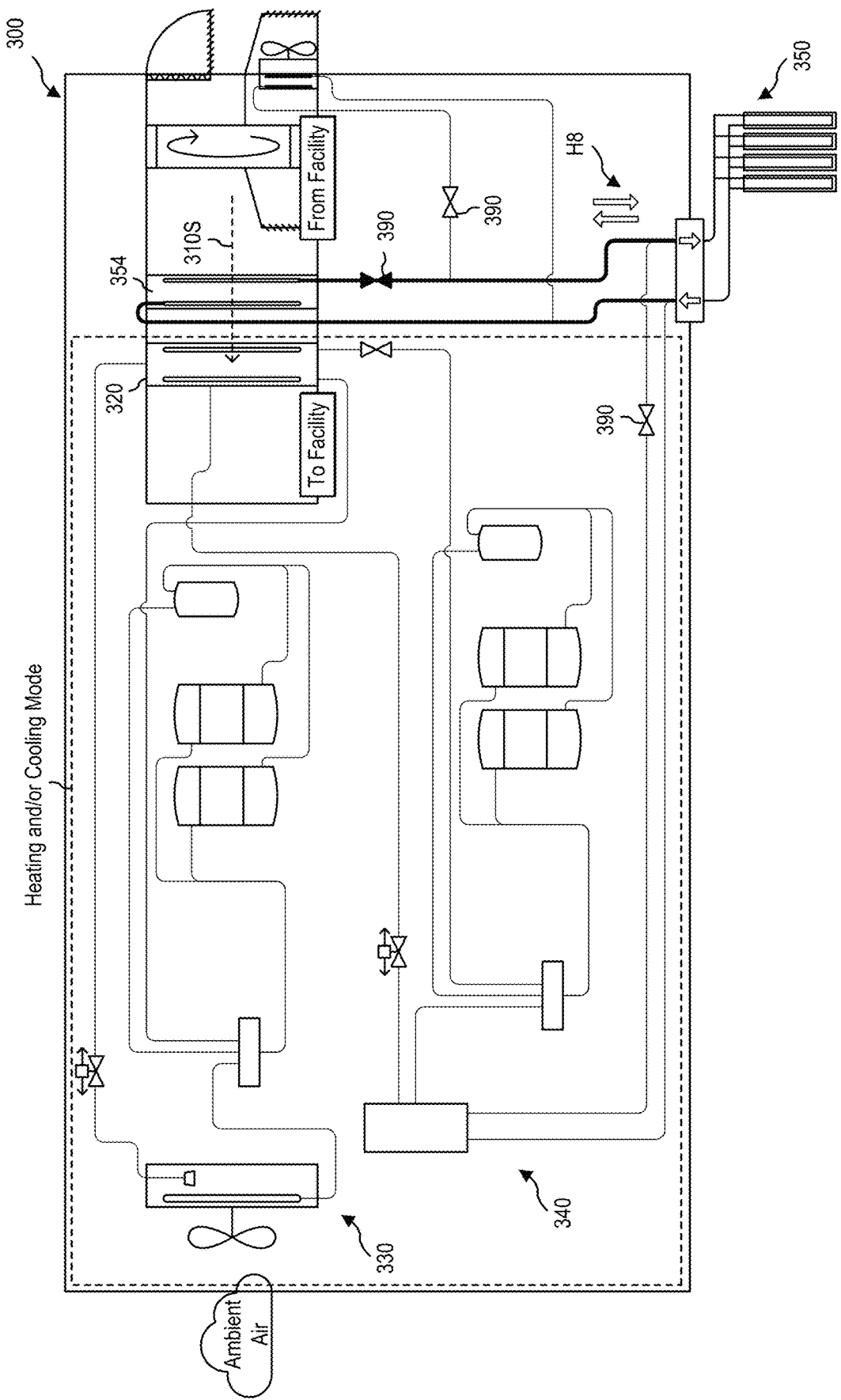
Figure 3:
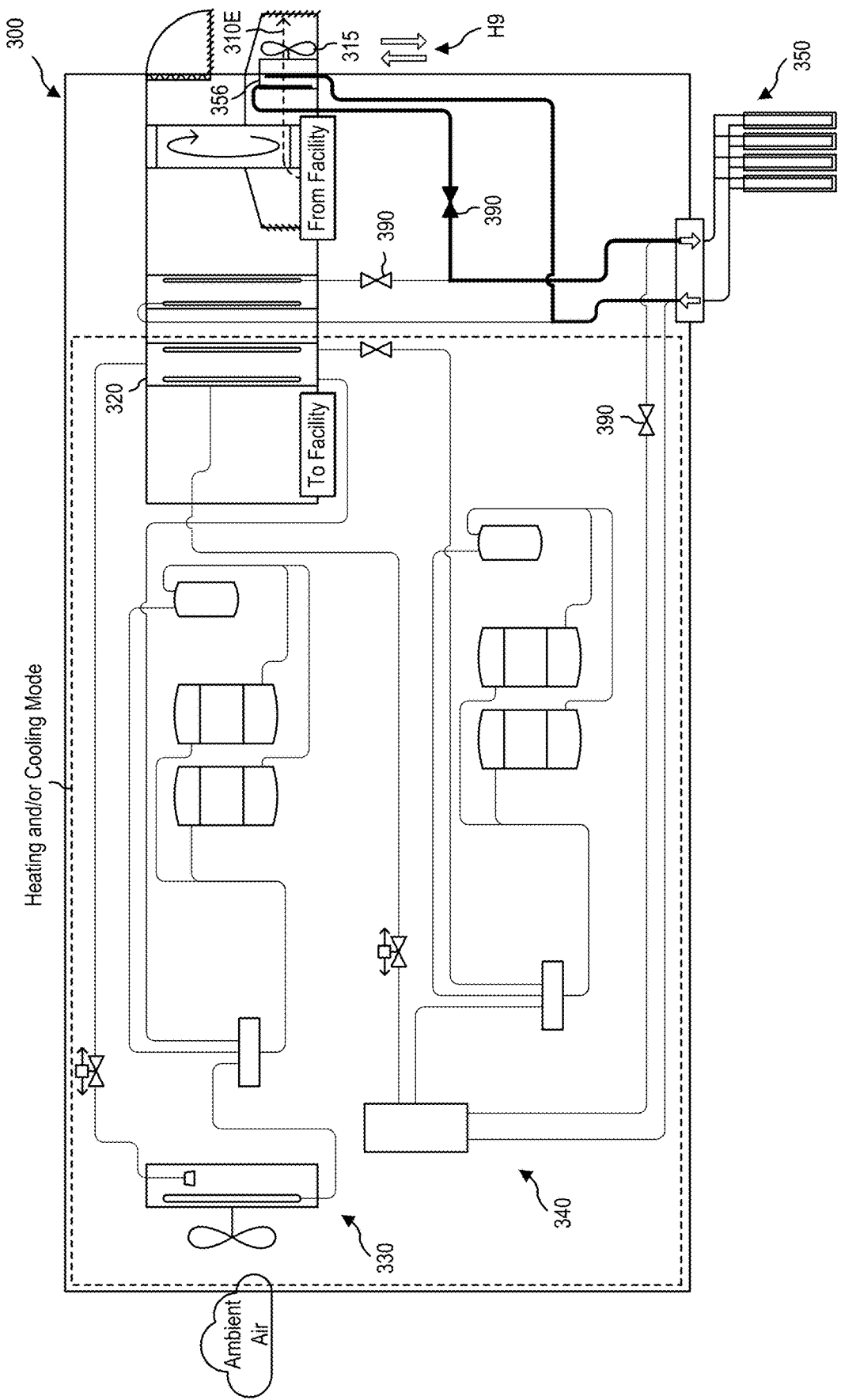

FIG. 2-3 illustrates an example of the thermal system 200 of FIG. 2-1 operating in a dual cooling mode. As shown, the air-source heat pump 230 may be operated and may circulate the air source working fluid such that heat H6 may be transferred to the air-source working fluid and to the ground-source working fluid from the facility fluid 210 at the facility heat exchanger 220. Accordingly, heat H4 is transferred to the ambient air 232 from the air-source working fluid at the air-source heat exchanger 236. Similarly, the ground-source heat pump 240 may be operated and may circulate the ground-source working fluid such that heat H6 may be transferred to the air-source working fluid and to the ground-source working fluid from the facility fluid 210 at the facility heat exchanger 220. Accordingly, heat H5 is transferred to the downhole fluid from the ground-source working fluid at the ground-source heat exchanger 242. In this way, the thermal system 200 may provide cooling to the facility with both the air-source heat pump 230 and the ground-source heat pump 240 operating in parallel.

In some cases, the operation of the thermal system 200 includes transferring heat H6 from the facility fluid 210 to the air-source working fluid and to the ground-source working fluid at the facility heat exchanger 220, thereby evaporating the air source and ground source working fluids. Then, it includes compressing the evaporated working fluids at the compressors 238, thereby increasing significantly their temperature, and transferring the heat H4 and H5) from the air-source working fluid to the ambient air 232 and from the ground source working fluid to the downhole fluid, thereby sometimes condensing the working fluids. After that, the working fluids are expanded at the expansion valves 239, further decreasing their temperature. The compression/expansion cycle is performed in the reverse direction compared to the previously described operation mode of FIG. 2-2.

Similar to that discussed above in connection with FIG. 2-2, the air-source heat pump 230 and the ground-source heat pump 240 may be operated independently and at different thermal conditioning capacities in order to provide cooling to the facility with an increased efficiency.

FIGS. 3-1 through 3-3 illustrate example schematic diagrams of a thermal system 300, according to at least one embodiment of the present disclosure. The thermal system 300 may be substantially similar to, and may include any of the features of, the thermal system 200 as described herein in connection with FIGS. 2-1 through 2-3. The thermal system 300 may include an air-source heat pump 330 and a ground-source heat pump 340 and associated components for providing heating and/or cooling to a facility via a facility heat exchanger 320 as described herein. In accordance with the components, features, and functionalities described in connection with FIGS. 3-1 through 3-3, the air-source heat pump 330 and the ground-source heat pump 340 may operate in either a heating or cooling mode, including each operating in a different mode.

In some embodiments, the thermal system 300 includes an air supply 312 for providing a supply flow 310S of the facility fluid from the thermal system 300 to the facility. The thermal system 300 includes an air return 314 for receiving a return flow 310R of the facility fluid from the facility. In some cases, the thermal system 300 includes an air inlet 316 for receiving an inlet flow 310I of the facility fluid 310 to the thermal system 300, such as outside air or fresh air. In some embodiments, the thermal system 300 includes an air outlet 315 for exhausting an exhaust flow 310E of the facility fluid 310 out of the facility. For example, the thermal system 300 may include one or more dampers or louvers for splitting and/or directing a portion of the return flow 310R as the exhaust flow 310E to the air outlet 315. A portion of the return flow 310R may be split and/or directed as a recycled flow 310N of the facility fluid toward the air supply 312. Accordingly, the supply flow 310S may comprise the inlet flow 310I and the recycled flow 310N. In this way, the thermal system 300 may facilitate circulating the facility fluid throughout the facility, including providing fresh, outside air based on the inlet flow 310I and the exhaust flow 310E. One or more dampers, ducts, circulation devices, or other components may be implemented for directing the airflow as described and/or for producing the various flows of the facility fluid 310.

In some embodiments, one or more of the air supply 312, air return 314, air outlet 315, or air inlet 316 may be included in the thermal system 300, for example, and contained in, on, or at an enclosure 318 of the thermal system 300. In some embodiments, one or more of these components may be implemented apart from the thermal system 300 and/or the enclosure 318, such as being implemented at or within the facility.

In some embodiments, the thermal system 300 includes a recovery heat exchanger 352. The recovery heat exchanger 352 may be positioned and configured to interact with and/or thermally engage with the inlet flow 310I and the exhaust flow 310E of the facility fluid 310. The recovery heat exchanger 352 may facilitate transferring heat H7 between the inlet flow 310I and the exhaust flow 310E, which may serve to pre-condition (e.g., preheat or precool) at least somewhat, the outside or fresh air entering the facility fluid 310 via the air inlet 316. For example, the recovery heat exchanger 352 may be a rotary heat exchanger, thermal wheel, or other suitable heat exchanger for facilitating heat transfer between two flows of air.

The recovery heat exchanger 352 in this way may facilitate recovering at least some of the thermal energy that was expended to condition the facility fluid 310 and that may otherwise be lost based on exhausting the (e.g., conditioned) exhaust flow 310E out of the air outlet 315. For example, in a heating mode of the thermal system 300, the facility fluid may be heated such that the facility may be heated, and the outside air may be relatively cool. Thus, the inlet flow 310I may provide a flow of relatively cool air to supply flow 310S, requiring an increased amount of thermal energy to heat to the temperature needed to condition the facility. Additionally, the return flow 310R may be conditioned air at or near a desired facility temperature, and the exhaust flow 310E may represent thermal energy being wasted or expended out of the thermal system 300. By utilizing the recovery heat exchanger 352, at least some of the heat in the exhaust flow 310E may be transferred to the inlet flow 310I such that the inlet flow 310I may be somewhat warmer and may require less thermal energy to heat to a desired temperature for conditioning the facility. The recovery heat exchanger 352 may be similarly operated for precooling the inlet flow 310I comprising relatively warmer air with cooler air of the exhaust flow 310E, for example, when the thermal system 300 is operating in a cooling mode to cool the facility. In this way, the recovery heat exchanger 352 may facilitate recovering at least some of the energy expenditure from conditioning the facility fluid 310 that would otherwise be lost via the exhaust flow 310E.

Turning now to FIG. 3-2, in some embodiments, the thermal system 300 includes a supply heat exchanger 354. The supply heat exchanger 354 may be positioned upstream of the facility heat exchanger 320 such that the supply flow 310S flows through the supply heat exchanger 354 before flowing through the facility heat exchanger 320. The supply heat exchanger 354 may be connected to a downhole fluid circuit 350 for circulating a downhole fluid between the supply heat exchanger 354 and a borehole heat exchanger. The supply heat exchanger 354 may be an air-to-liquid heat exchanger of any suitable type. The thermal system 300 may include one or more fluid distribution devices 390 for directing the flow of the downhole fluid in accordance with one or more embodiments described herein. For example, the fluid distribution devices 390 may include valves, pumps, and the like for flowing (or preventing the flow of) the downhole fluid through particular loops and/or to particular components of the thermal system 300.

In some cases, the supply heat exchanger 354 may facilitate preconditioning the supply flow 310S based on geothermal heating and/or cooling. For example, the downhole fluid may flow directly between the supply heat exchanger 354 and the borehole heat exchanger, for example, without implementing one or more compressors or expansion valves to execute a refrigerant cycle and/or heat pump. In this way, the supply heat exchanger 354 may leverage the temperatures of the downhole fluid to transfer heat H8 between the supply flow 310S and the downhole fluid to provide efficient geothermal preheating and/or precooling of the facility fluid 310.

For example, in some cases the thermal system 300 may be implemented such that at or near the end of the winter, the temperature of the geological formation may be relatively low, such as at or near a lowest temperature for the year. This may be based on the fact that throughout the winter, the thermal system 300 may have been implemented to remove heat from the geological formation. Near the end of winter, the ambient temperatures may begin to rise such that the facility need to heat the facility fluid 310 may be nil. Based on the relatively cool ground temperatures (e.g., ground temperatures, such as below 0° C., below that of the ambient air, such as 25° C.), the supply heat exchanger 354 may be implemented to transfer heat from the supply flow 310S to the ground via the cooler downhole fluid. In this way, the facility fluid 310 may be precooled with an energy-efficient means, and less or no cooling may be required at the facility heat exchanger 320, therefore limiting the energy consumption necessary to bring the facility to comfort temperature. A similar implementation may be utilized at or near the end of summer. For instance, the temperature of the geological formation may be relatively high (e.g., higher than the ambient air) at a time when the facility is beginning to call for heating, and the warmer downhole fluid may be leveraged to efficiently preheat the supply flow 310S such that less heating is required at the facility heat exchanger 320. In some cases, the pre-conditioning of the supply flow 310S by the supply heat exchanger 354 may be only a portion of the conditioning that the thermal system 300 performs on the facility fluid 310. In some embodiments, the conditions of the ground and the ambient air may be such that the 354 may be implemented to condition the facility fluid 310 substantially completely, for example, without needing to implement the facility heat exchanger 320 and/or the heat pumps 330, 340.

The pre-conditioning of the supply flow 310S in this way may have the additional benefit of advantageously transferring thermal energy to and/or from the geological formation. For example, based on the operating conditions of the thermal system 300, location of the facility, thermal needs of the facility, etc., it may be the case that the temperature of the ground may approach a regulatory limit (e.g., imposed by a governing body). For instance, extracting a substantial amount of heat from the ground throughout the winter may cause the ground temperature to be at or near a lower limit, or vice versa for an upper temperature limit. Accordingly, it may be advantageous to transfer heat (e.g., in a direct and efficient manner without the use of a heat pump) between the ambient air and the ground. For instance, by cooling the supply flow 310S with cool downhole temperatures, heat may advantageously be transferred to the ground, which may help with regulating borefield temperatures. Similarly, heat may be transferred from the ground to preheat the supply flow 310S which may help to reduce elevated ground temperatures. In this way, the supply heat exchanger 354 may be advantageously implemented to better manage the use of the geological formation in order to prevent one or more thresholds from being met, which could otherwise lead to the ground-source heat pump 340 becoming temporarily or permanently inoperable.

In the embodiment of FIG. 3-2, the supply heat exchanger 354 exchanges heat between the supply flow 310S and downhole fluid, but heat may be exchanged with the inlet flow 310I. Similarly, in FIG. 3-1, the recovery heat exchanger 352 is situated downstream of the supply heat exchanger 352, but in another embodiment, it may be situated upstream. The facility fluid circuit may also include fluid distribution devices, such as valves, etc. so that the facility fluid bypasses or goes through the various heat exchangers depending on different conditions, such as the temperature of the downhole fluid and the air supply 310I or 310S.

For the purposes of a similar end, in some embodiments, the thermal system 300 includes an exhaust heat exchanger 356, as shown in FIG. 3-3. The exhaust heat exchanger 356 may be positioned at or near the air outlet 315 such that the exhaust flow 310E flows through the exhaust heat exchanger 356. The exhaust heat exchanger 356 may be connected to the downhole fluid circuit 350 for circulating the downhole fluid between the exhaust heat exchanger 356 and the borehole heat exchanger. The 354 may be an air-to-liquid heat exchanger of any suitable type.

The exhaust heat exchanger 356 may transfer heat H9 between the exhaust flow 310E and the borehole heat exchanger via the downhole fluid. For example, when exhausting warm air (e.g., in a heating mode of the facility) the exhaust heat exchanger 356 may facilitate transferring heat to the ground from the exhaust flow 310E. Similarly, when exhausting cool air (e.g., in a cooling mode of the facility) the exhaust heat exchanger 356 may facilitate transferring heat from the ground to the exhaust flow 310E.

Similar to the supply heat exchanger 354, the exhaust heat exchanger 356 may facilitate managing the temperatures of the geological formation by leveraging the thermal energy of the exhaust flow 310E that would otherwise be exhausted or lost from the thermal system 300. For instance, during colder months when heat is being extracted from the ground to heat the facility, the exhaust flow 310E may exhaust warm air, and the exhaust heat exchanger 356 may facilitate capturing at least some of that heat and transferring it back to the geological formation. This may facilitate maintaining a temperature of the geological formation, for example, to prevent a lower temperature limit from being reached during the winter. Advantageously, this exhaust heat exchanger 356 may be implemented whenever the exhaust flow 310E exhausts hot air, i.e., air hotter than the downhole fluid and/or geological formation, such as during all of the winter to recharge the ground thermal battery (e.g., in contrast to the recharging features of the supply heat exchanger 354 which may be limited to certain ground and ambient temperature conditions). Similarly, during warmer months, heat may be transferred from the geological formation to the cooler exhaust flow 310E, to manage the ground temperatures and prevent the geological formation from reaching an upper temperature limit during extended uses of cooling. In this way, the exhaust heat exchanger 356 may be implemented to leverage the otherwise lost or wasted thermal energy of the exhaust flow 310E to facilitate managing the temperatures of the geological formation.

In the embodiment of FIG. 3-3, the exhaust heat exchanger 356 is situated downstream of the recovery heat exchanger 352, but in another embodiment, it may be situated upstream. The facility fluid circuit may also include fluid distribution devices, such as valves, etc. so that the facility fluid bypasses or goes through the various heat exchangers depending on different conditions, such as the temperature of the downhole fluid and the air exhaust 310E.

In some embodiments, one or more of the recovery heat exchanger 352, supply heat exchanger 354, or exhaust heat exchanger 356 may be implemented together and/or included in the thermal system 300. For instance, in some cases each of these components may be included in the thermal system 300. In some embodiments, one or more of the recovery heat exchanger 352, supply heat exchanger 354, or exhaust heat exchanger 356, may be contained within the enclosure 318. Additionally, the thermal system 300 may include one or more valves, pumps, controllers, processors, etc., for implementing, modulating, and/or selectively operating any or all of the recovery heat exchanger 352, supply heat exchanger 354, or exhaust heat exchanger 356 just described.

Figures 1, 4:
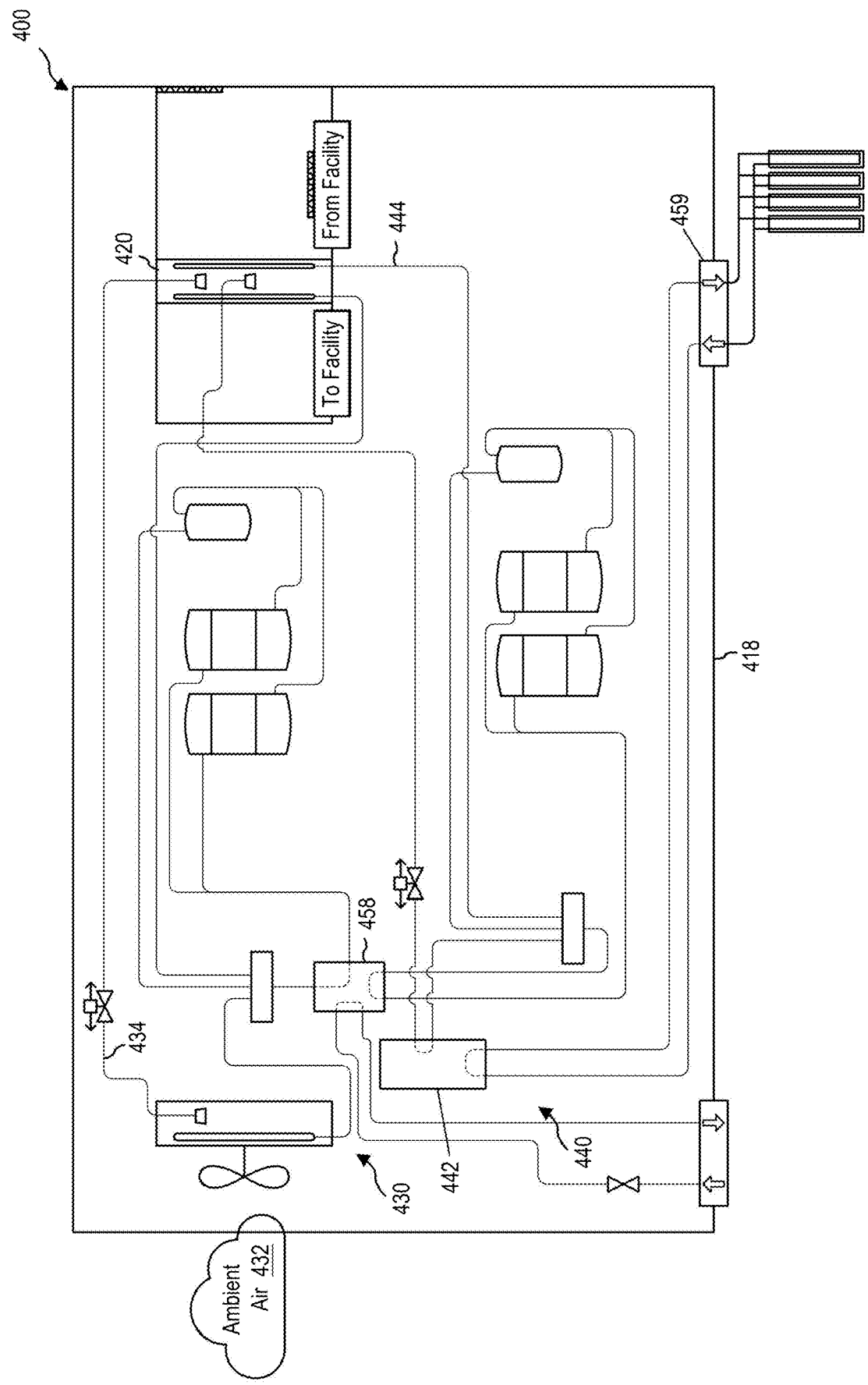
Figures 2, 4:
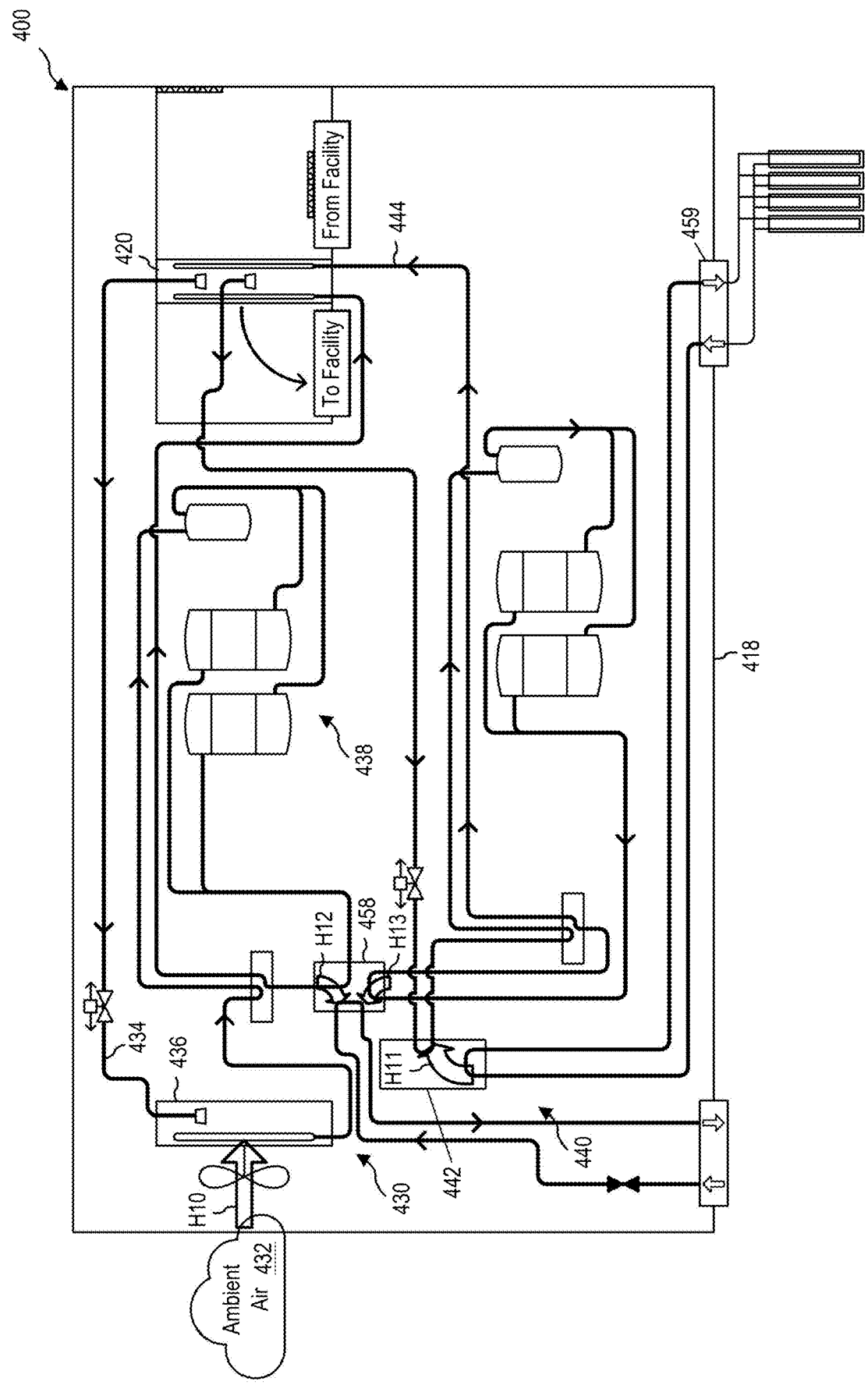

FIGS. 4-1 and 4-2 illustrate example schematic diagrams of a thermal system 400, according to at least one embodiment of the present disclosure. The thermal system 400 may be substantially similar to, and may include any of the features of the thermal systems as described herein. The thermal system 400 may include an air-source heat pump 430 and a ground-source heat pump 440 and associated components for providing heating and/or cooling to a facility via a facility heat exchanger 420 as described herein. In accordance with the components, features, and functionalities described in connection with FIGS. 2-1 through 3-3, the air-source heat pump 430 and the ground-source heat pump 440 may operate in either a heating or cooling mode, including each operating in a different mode.

In some embodiments, the thermal system 400 includes a hot fluid heat exchanger 458. The hot fluid heat exchanger 458 may be connected to the air-source heat pump 430, the ground-source heat pump 440, or both. For example, the hot fluid heat exchanger 458 may be included on an air-source heat pump fluid circuit 434 of the air-source heat pump 430 and/or may be included on a ground-source fluid circuit 444 of the ground-source heat pump 440.

With reference to FIG. 4-2, the hot fluid heat exchanger 458 may be positioned on the air-source heat pump fluid circuit 434 and/or the ground-source fluid circuit 444 directly downstream or after one or more compressors of the associated fluid circuit(s). For example, the hot fluid heat exchanger 458 may be positioned such that no heat transfer components, heat sink or heat generation components, or other thermal components are positioned between the one or more compressors and the hot fluid heat exchanger 458. For instance, the working fluid in the associated fluid circuit(s) that flows from the one or more compressors may represent a point in the fluid circuit in which the working fluid is at its hottest within the refrigeration cycle. Accordingly, the hot fluid heat exchanger 458 may be positioned in this way in order that an increased amount of heat may be transferred to the hot fluid from the working fluid(s) via the hot fluid heat exchanger 458. For instance, heat H10 may be transferred from an ambient air 432 to an air-source working fluid of the air-source heat pump 430 via an air-source heat exchanger 436. Immediately after one or more compressors 438 of the air-source heat pump 430 compresses and increases the temperature of the air-source working fluid, the air-source working fluid may flow through the hot fluid heat exchanger 458 where heat H12 may be transferred from the air-source working fluid to the hot fluid. Similarly, heat H11 may be transferred from a downhole fluid to a ground-source working fluid at a ground-source heat exchanger 442 of the ground-source heat pump 440. Immediately or directly after one or more compressors 438 of the air-source heat pump 430 compresses and increases the temperature of the ground-source working fluid, the ground-source working fluid may flow through the hot fluid heat exchanger 458 where heat H13 may be transferred from the ground-source working fluid to the hot fluid. In this way, the hot fluid heat exchanger 458 may provide the hot fluid at elevated temperatures.

In both fluid circuits, downstream of the hot fluid heat exchanger 458, the working fluid(s) may flow through the facility fluid heat exchanger 420 and heat the facility fluid as has been described in relationship with FIG. 2-2.

In some embodiments, the hot fluid is water or another liquid. The hot fluid may be a superheated fluid and/or a fluid that is at an elevated temperature, higher than that provided at the facility heat exchanger 420. The hot fluid may be provided as a domestic hot water to the facility. The hot fluid may be provided for any other purpose, such as to provide heating to one or more portions of the facility at elevated temperatures (e.g., above that of the facility fluid), providing hot water, providing steam, etc.

The thermal system 400 may include a hot fluid coupling 459 for facilitating connecting the thermal system 400 to a fluid circuit for the hot fluid, for example, within the facility. In this way, the hot fluid heat exchanger 458 may be contained within an enclosure 418 of the thermal system 400, for example, packaged and/or assembled with the thermal system 400 for a plug-and-play-type implementation. For example, the hot fluid coupling 459 may be implemented in, on, or at the enclosure 418 to facilitate connecting the hot fluid heat exchanger 458 to a hot fluid circuit of the facility.

The hot fluid heat exchanger 458 may be implemented in this way in connection with one or more of the air-source heat pump 430 or the ground-source heat pump 440 operating in a heating mode, for example, for heating the facility. For instance, in some embodiments, the hot fluid heat exchanger 458 is implemented with both the air-source heat pump 430 and ground-source heat pump 440 operating in parallel in a dual heating mode. In some embodiments, one or more of the air-source heat pump 430 or ground-source heat pump 440 may not provide heating to the hot fluid heat exchanger 458 to heat the hot fluid. For example, the thermal system 400 may include one or more valves, pumps, etc. to divert, disconnect, or bypass the hot fluid heat exchanger 458 such that heat is not transferred from the air-source working fluid or ground-source working fluid. For instance, the hot fluid heat exchanger 458 may be configured in this way for instances when the hot fluid is not needed or called for by the facility. In other cases, the hot fluid heat exchanger 458 may be configured in this way for cases in which one of the air-source heat pump 430 or ground-source heat pump 440 is being operated in a heating mode while the other is in a cooling mode. In other configurations, heat is transferred to the hot fluid heat exchanger 458 via one or both fluid circuits but the facility fluid heat exchanger 420 may be bypassed on one or more of the fluid circuits. The thermal system 400 may include one or more valves, pumps, controllers, processors, etc. for implementing and/or selectively operating the hot fluid heat exchanger 458 in accordance with a thermal need (or no need) of the facility for the hot fluid and/or heat or cold. In this way, the thermal system 400 may provide the hot fluid to the facility via the hot fluid heat exchanger 458.

FIG. 4-2 has shown the thermal system operating when heat is transferred to the facility fluid, but heat may be transferred to the hot fluid also when the facility fluid is cooled. For example, one of the heat pumps may be operated to provide cooling to the facility via the facility heat exchanger 420 while the other heat pump is operated to provide heating to the hot fluid heat exchanger 458.

Figures 1, 5:
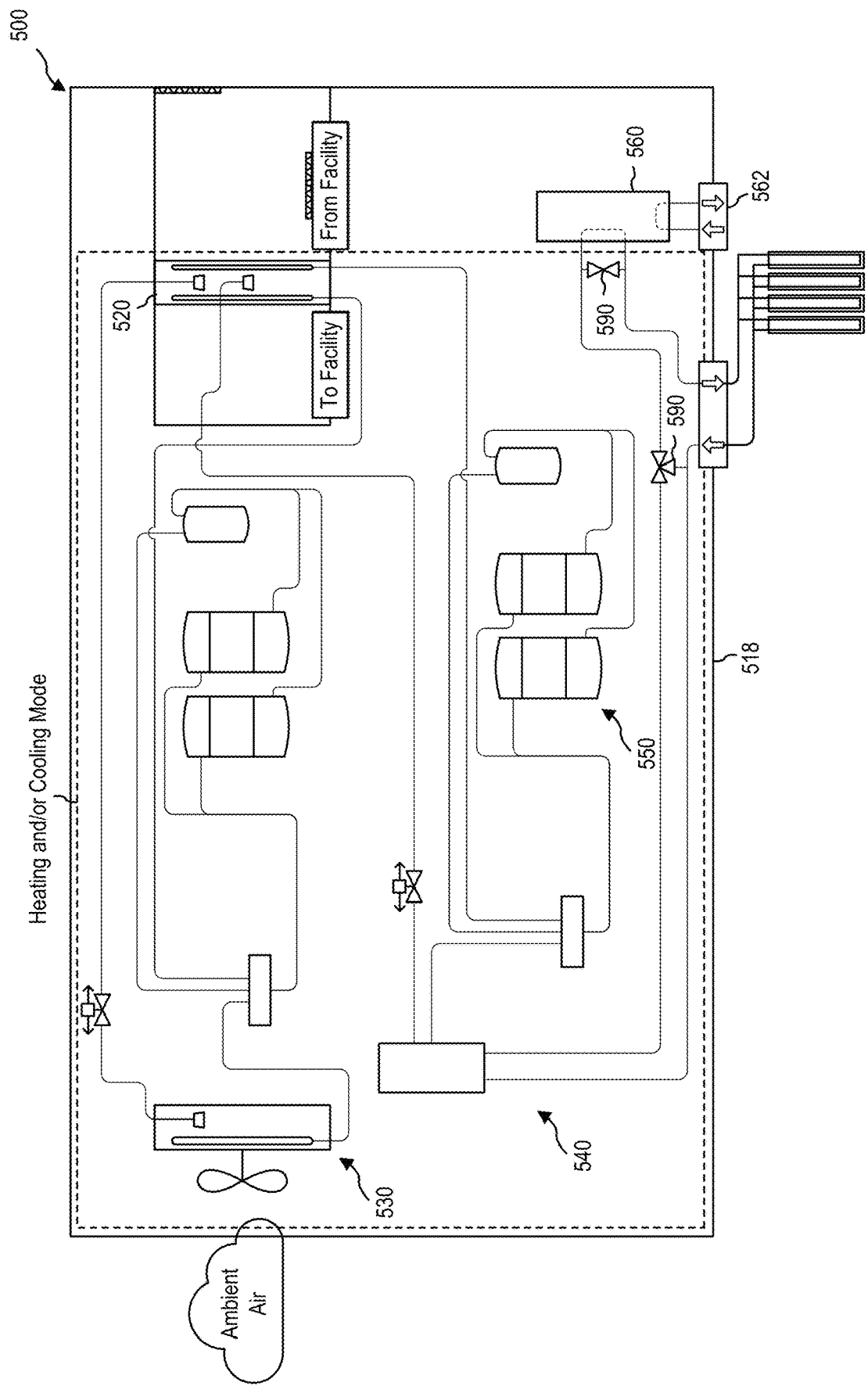
Figures 2, 5:
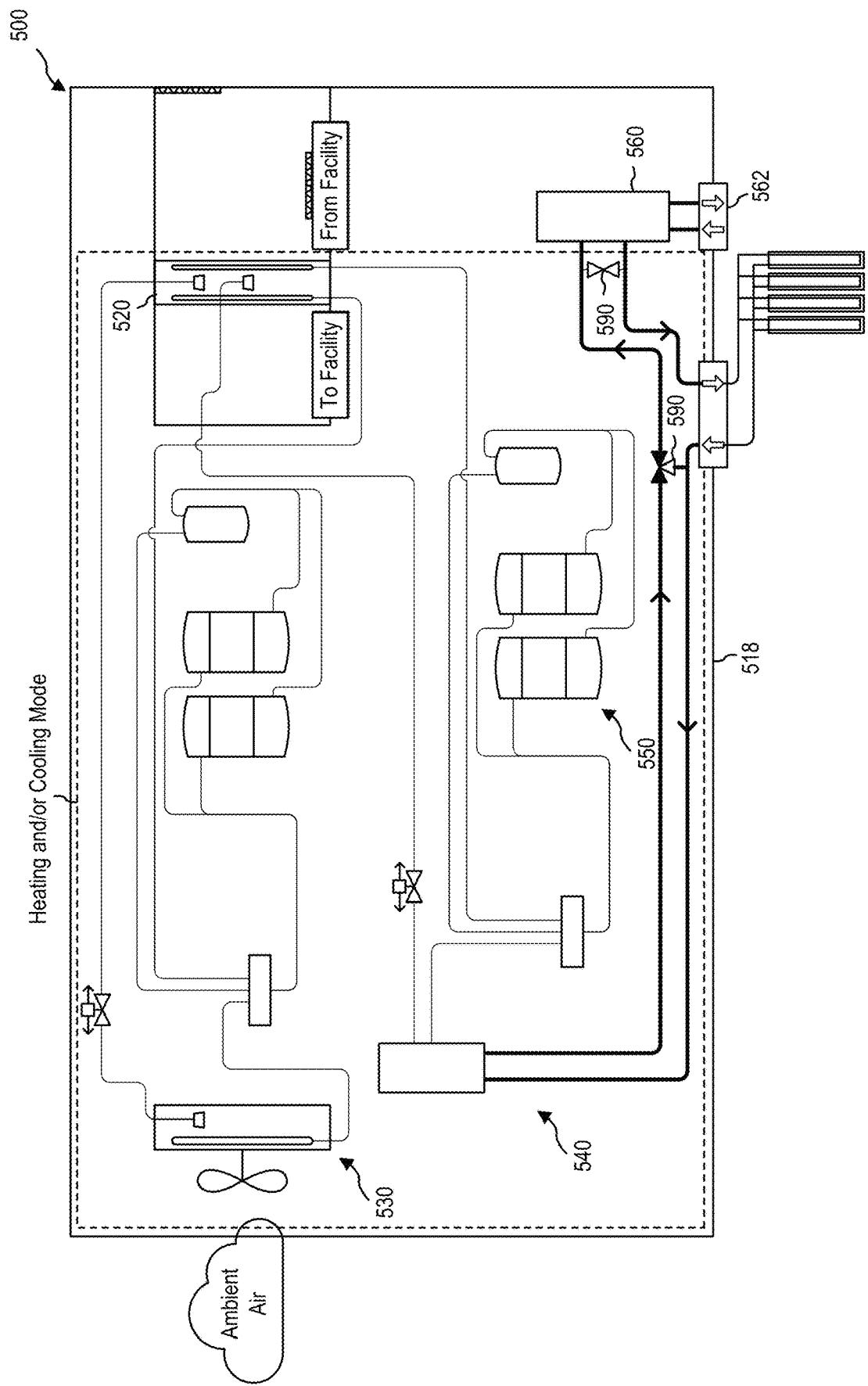
Figures 3, 5:
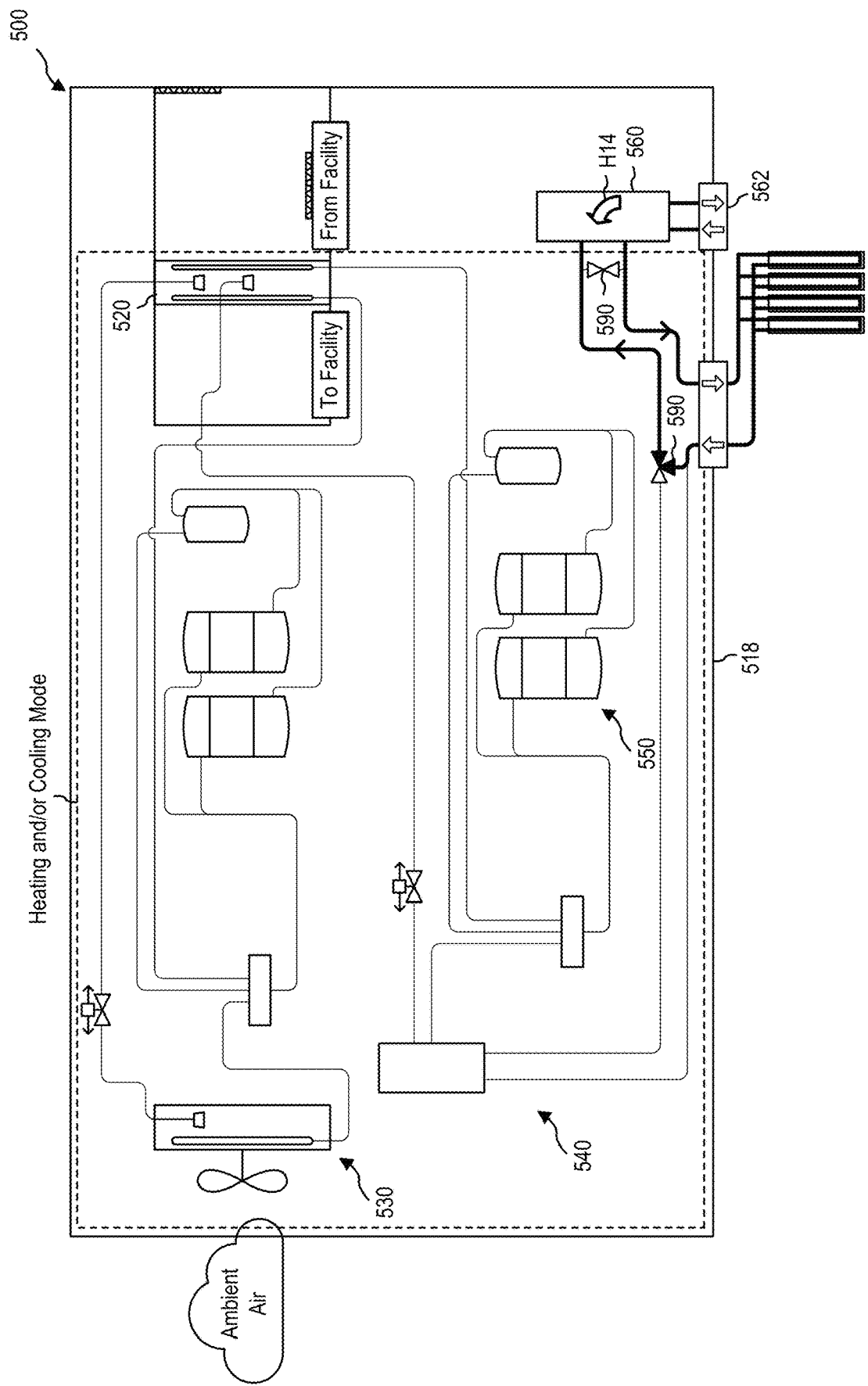

FIGS. 5-1 through 5-3 illustrate example schematic diagrams of a thermal system 500, according to at least one embodiment of the present disclosure. The thermal system 500 may be substantially similar to, and may include any of the features of, the thermal systems as described herein. The thermal system 500 may include an air-source heat pump 530 and a ground-source heat pump 540 and associated components for providing heating and/or cooling to a facility via a facility heat exchanger 520 as described herein. In accordance with the components, features, and functionalities described in connection with FIGS. 2-1 through 4-2, the air-source heat pump 530 and the ground-source heat pump 540 may operate in either a heating or cooling mode, including each operating in a different mode.

In some embodiments, the thermal system 500 includes a cold fluid heat exchanger 560. The cold fluid heat exchanger 560 may be connected to a downhole fluid circuit 550, which may circulate a downhole fluid through a borehole heat exchanger to exchange heat with a geological formation. For example, with reference to FIG. 5-2, the cold fluid heat exchanger 560 may facilitate transferring heat H14 from a cold fluid to the downhole fluid to provide a flow of the cold fluid to the facility. In another example, with reference to FIG. 5-3, the cold fluid heat exchanger 560 may facilitate transferring the heat H14 from the cold fluid to the downhole fluid to reject the heat H14 to the geological formation. For example, the thermal system 500 may include one more fluid distribution devices 590 for directing the downhole fluid and/or configuring the various operations of the thermal system 500 as described herein. The cold fluid may be water or another liquid. The cold fluid heat exchanger 560 may be situated downstream of the downhole fluid heat exchanger and upstream of the borehole heat exchanger, on the path of the downhole fluid when returning to the ground after having exchanged heat with the ground-source working fluid. In some embodiments, one or more fluid distribution devices 590 may facilitate bypassing the cold fluid heat exchanger 560 such that the cold fluid heat exchanger 560 may not be operated or implemented in one or more cases.

The cold fluid may be a fluid that is circulated to provide cooling for components, utilities, spaces, etc. of a facility. The cold fluid may be a cooling fluid which may exhibit temperatures that are relatively higher than that which may be typical for facility cooling, such as at the facility heat exchanger 520. For instance, because the cold fluid heat exchanger 560 is implemented directly with the downhole fluid circuit 550 and without one or more compressors, expansion valves, etc., the cold fluid heat exchanger 560 may not achieve cold temperatures of the cold fluid to the extent of the heat pumps. Accordingly, the cold fluid heat exchanger 560 may directly exchange heat with the downhole fluid. This cold fluid in this way may be cold in that it may provide cooling to one or more components, and in some cases may not be as cold as cold working fluids provided at the facility heat exchanger 520. Nevertheless, the cold fluid may be implemented to provide cooling of components which may effectively be cooled by these relatively warmer temperatures.

In some embodiments, the cold fluid may be implemented to provide cooling to a data center, such as by liquid cooling or immersion cooling. For example, in such implementations, data centers may be cooled with relatively warmer temperature fluids compared to the building, such as 25° C.

or 30° C. Thus, a data center may be cooled by leveraging the (e.g., direct, without the effects of a heat pump) fluid temperatures of the downhole fluid to reject heat from the cold fluid to the geological formation. Transferring heat from the cold fluid in this way may also advantageously inject heat into the ground, for example, to facilitate the ground temperature management benefits described herein. In some embodiments, the cold fluid may be implemented for providing cool to a wastewater recovery heat exchanger, for food refrigeration systems, for exhaust air recovery systems, or cooling for other industrial processes.

The cold fluid heat exchanger 560 being connected to the downhole fluid circuit 550 may also advantageously facilitate transferring heat H14 from the cold fluid (e.g., from a data center) to the ground-source heat pump 540 through the downhole fluid. For example, in colder months, when the ground-source heat pump 540 is operating in a heating mode to extract heat from the ground, the cold fluid heat exchanger 560 may facilitate injecting heat into the ground, which may effectively be transferred to the ground-source heat pump 540. Additionally, as ground temperatures may tend to gradually decrease over the winter months, the downhole fluid temperatures may accordingly also decrease, providing for more efficient cooling of the cold fluid via the cold fluid heat exchanger 560. In warmer months, when ground and downhole fluid temperatures tend to increase over time, effective cooling may still be provided to the cold fluid via the cold fluid heat exchanger 560, for example, given that the cold fluid is implemented to provide cooling functionalities (e.g., data center cooling) at higher temperatures than may be typical for facility air-conditioning.

In some configurations, the cold fluid heat exchanger 560 may be bypassed, for example, depending on the needs of the facility as well as the temperature of the downhole fluid and/or the geological formation. The thermal system 500 may therefore include a fluid distribution device 590 that may be controlled so that the cold fluid heat exchanger 560 is selectively implemented or bypassed, depending on the facility needs and/or environmental conditions.

The thermal system 500 may include a cold fluid coupling 562 for facilitating connecting the thermal system 500 to a fluid circuit for the cold fluid, for example, within the facility. In this way, the cold fluid heat exchanger 560 may be contained within an enclosure 518 of the thermal system 500, for example, packaged and/or assembled with the thermal system 500 for a plug-and-play-type implementation. For example, the cold fluid coupling 562 may be implemented in, on, or at the enclosure 518 to facilitate connecting the cold fluid heat exchanger 560 to the cold fluid circuit of the facility.

Figures 1, 6:
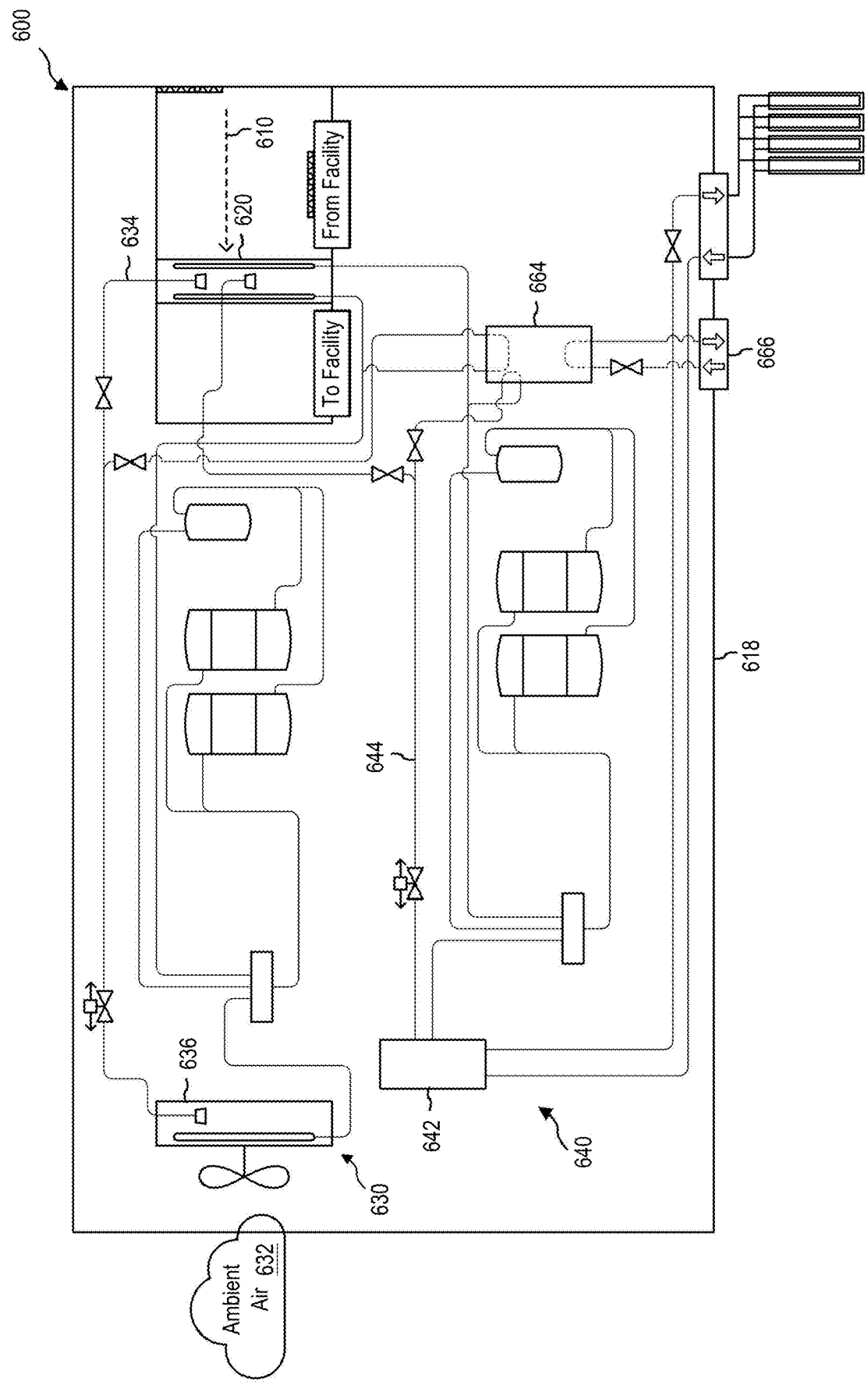
Figures 2, 6:
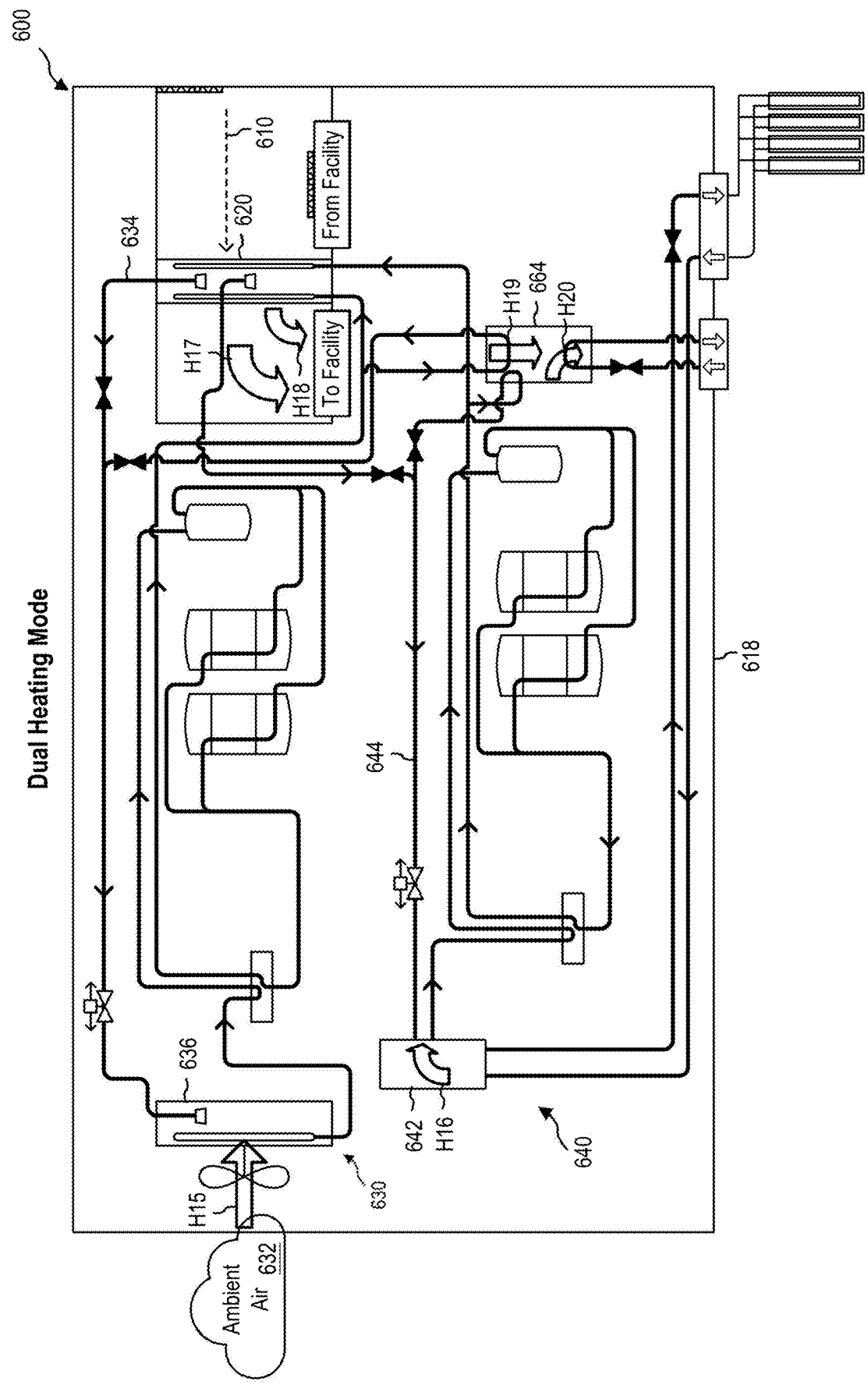
Figures 3, 6:
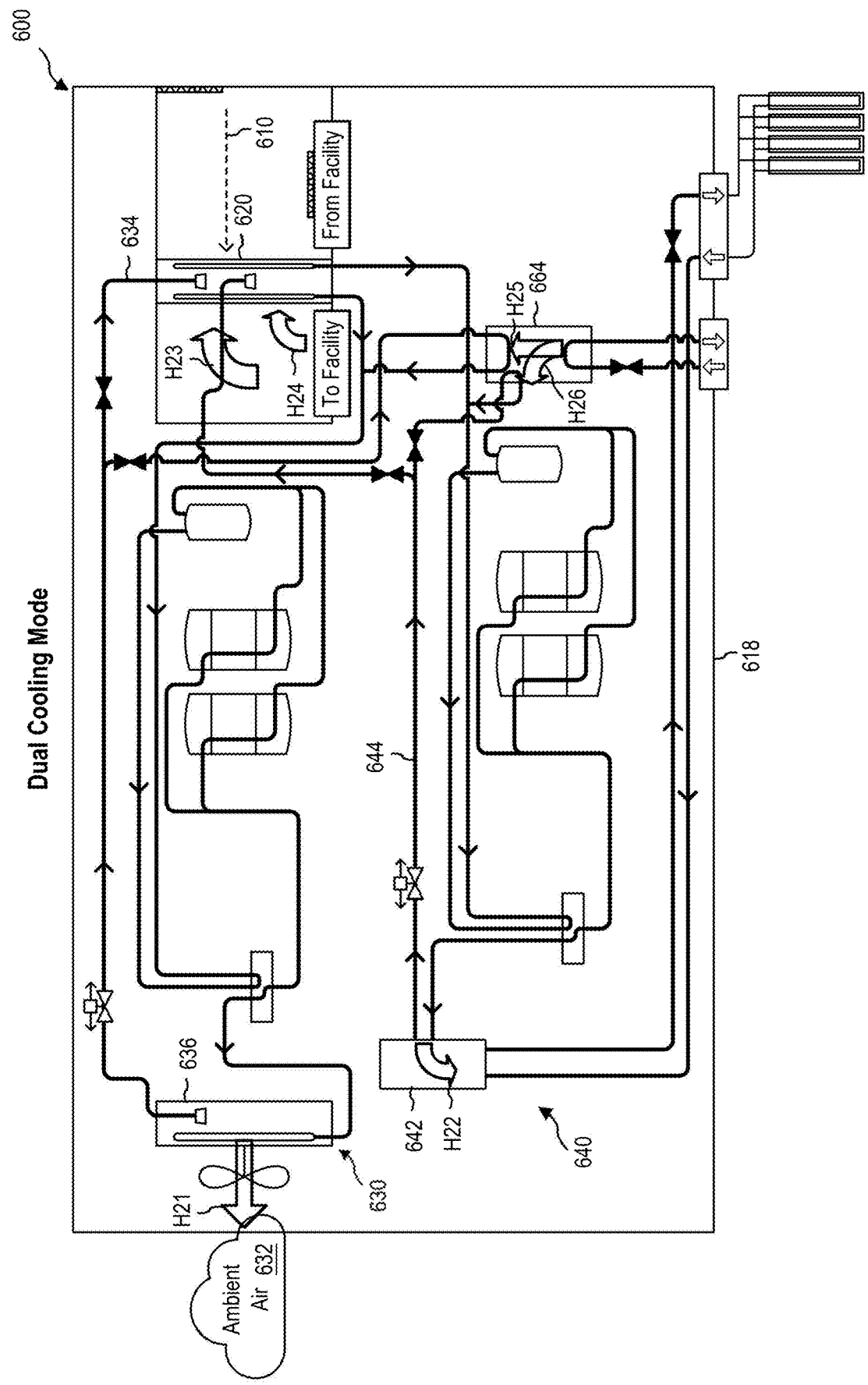
Figures 4, 6:
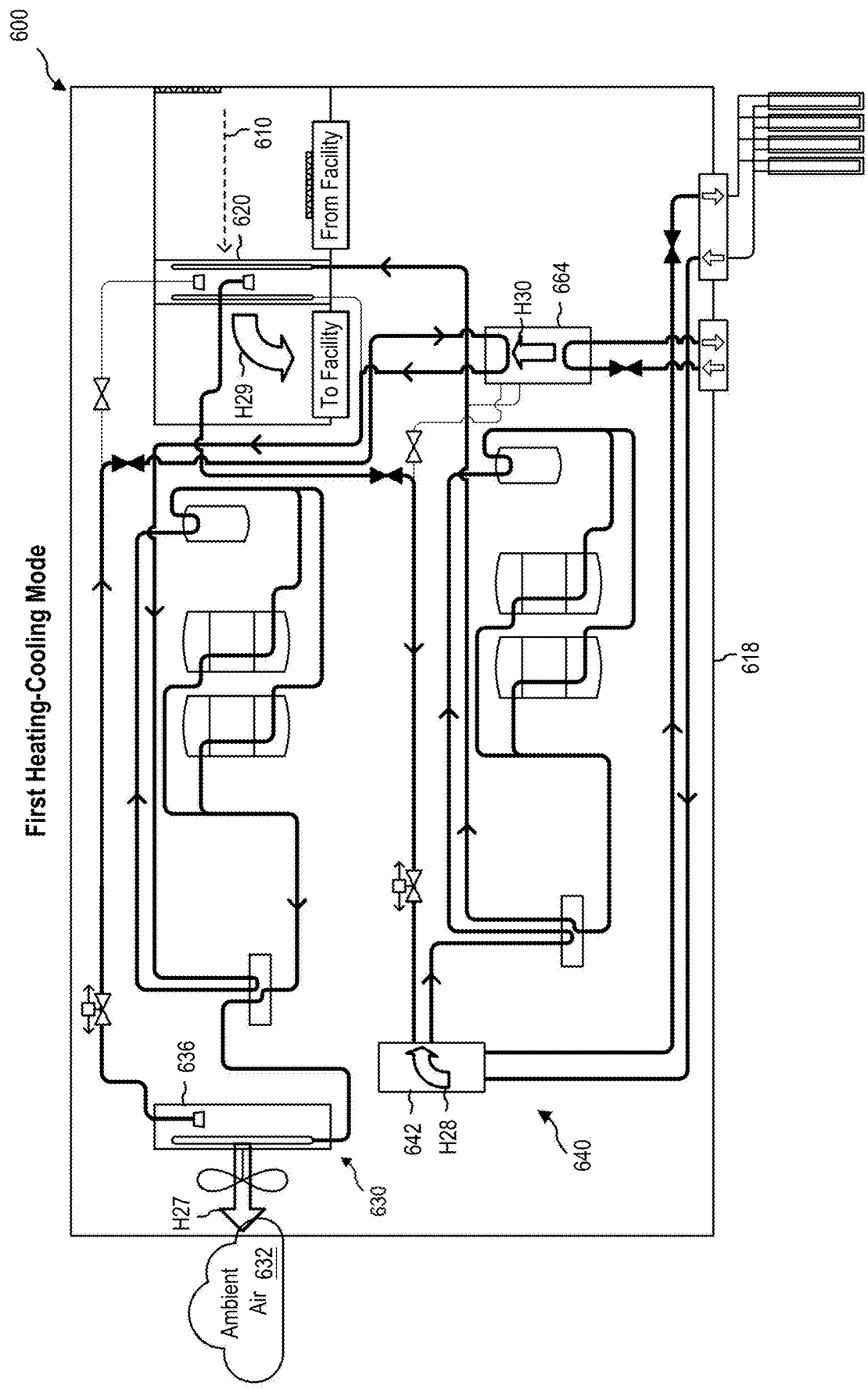
Figures 5, 6:
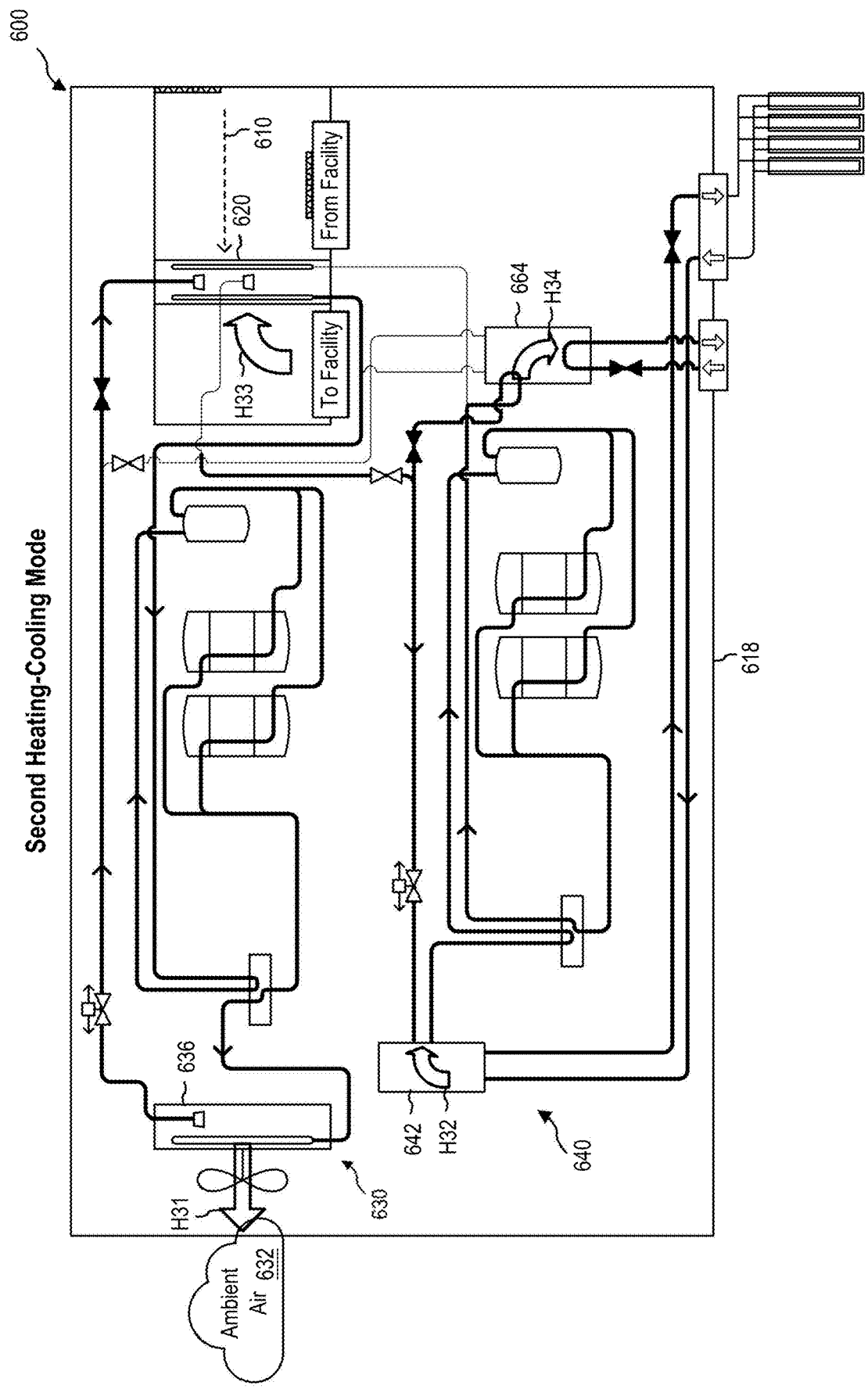
Figure 6:
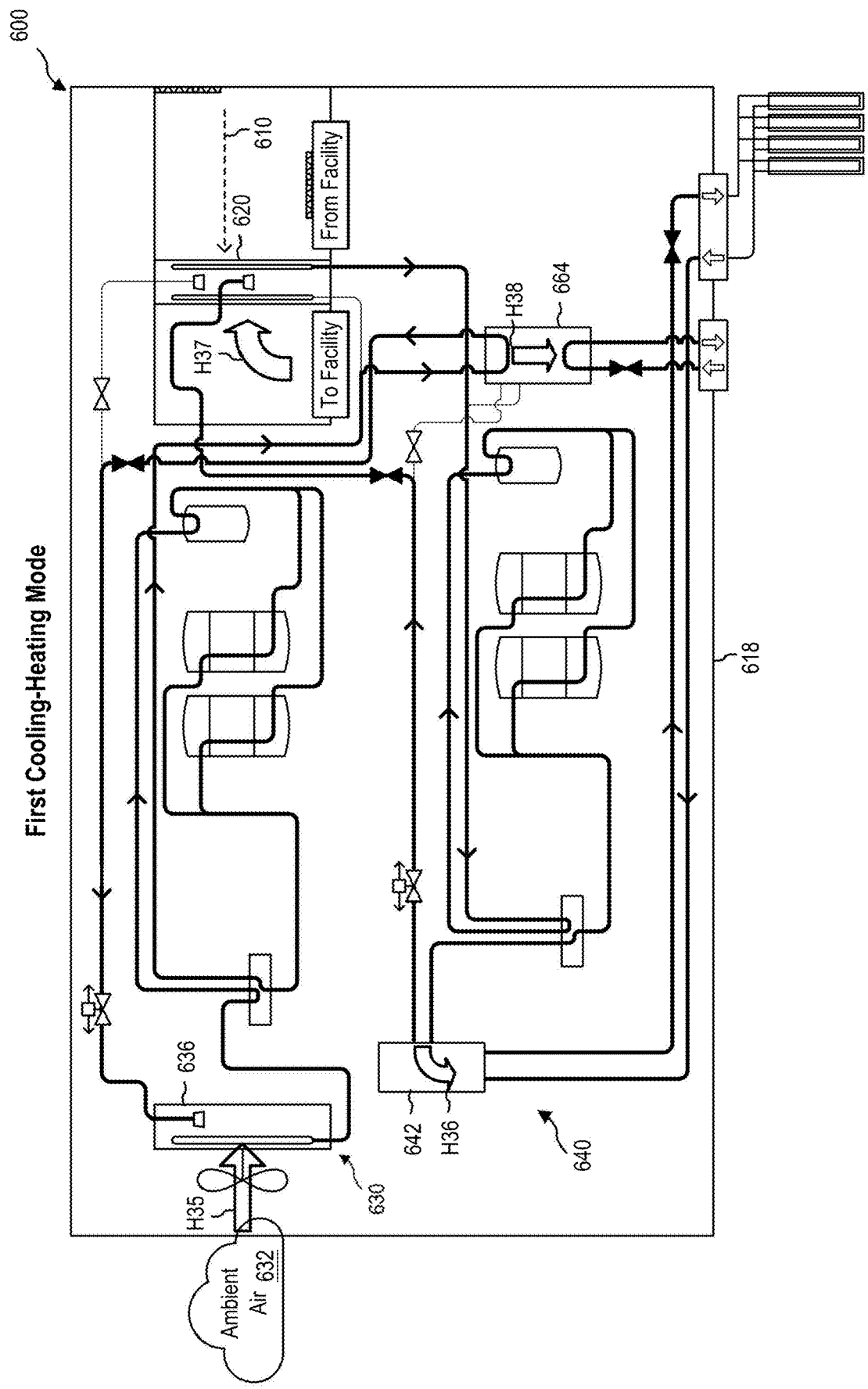

FIG. 6-1 illustrates an example schematic diagram of a thermal system 600, according to at least one embodiment of the present disclosure. The thermal system 600 may be substantially similar to, and may include any of the features of, the thermal systems as described herein. The thermal system 600 may include an air-source heat pump 630 and a ground-source heat pump 640 and associated components for providing heating and/or cooling to a facility via a facility heat exchanger 620 as described herein. In accordance with the components, features, and functionalities described in connection with FIGS. 2-1 through 5-2, the air-source heat pump 630 and the ground-source heat pump 640 may operate in either a heating or cooling mode, including each operating in a different mode.

In some embodiments, the thermal system 600 includes a secondary facility heat exchanger 664. The secondary facility heat exchanger 664 may be connected to the air-source heat pump 630, the ground-source heat pump 640, or both. For example, the secondary facility heat exchanger 664 may be included on an air-source heat pump fluid circuit 643 of the air-source heat pump 630 and/or may be included on a ground-source heat pump fluid circuit 644 of the ground-source heat pump 640.

The secondary facility heat exchanger 664 may be configured to exchange heat between a secondary facility fluid and the associated working fluid(s) of the associated heat pumps to which the secondary facility heat exchanger 664 is connected. In this way, the secondary facility heat exchanger 664 may be configured to provide heating or cooling to the secondary facility fluid. For example, the secondary facility fluid may be liquid such as water, glycol, or other liquid. In some cases, the secondary facility fluid is air. The secondary facility fluid may be circulated through one or more parts of the facility, for example, for providing thermal conditioning to the facility in addition to or as an alternative to the facility fluid as described herein. For example, the secondary facility fluid may be implemented to provide heating when the facility fluid provides cooling, or vice versa. in another example, the secondary facility fluid may be implemented to provide thermal conditioning in one or more areas of the facility that are not conditioned by the facility fluid.

The secondary facility heat exchanger 664 may be positioned on the associated fluid circuit(s) in parallel or in series with the facility heat exchanger 620. For example, as shown in FIGS. 6-1 and 6-2, the secondary facility heat exchanger 664 may be implemented in parallel with the facility heat exchanger 620 in order to receive heating or cooling in parallel with the facility heat exchanger 620 receiving heating or cooling from the air-source heat pump 630 and/or ground-source heat pump 640. For example, the air-source heat pump 630, the ground-source heat pump 640, or both may provide heating (or cooling) to both the secondary facility heat exchanger 664 and the facility heat exchanger 620, for example by circulating the associated working fluid to both of these components. In some embodiments, as mentioned above, the secondary facility heat exchanger 664 may be implemented to provide cooling when the facility heat exchanger 620 is being used for heating (or vice versa). The thermal system 600 may be equipped with various valves, pumps, controllers, processors, etc., for directing and/or flowing the associated working fluids to the secondary facility heat exchanger 664 and to the facility heat exchanger 620 in order to achieve this.

In other embodiments, the secondary facility heat exchanger 664 may be in series with the facility fluid heat exchanger, upstream or downstream of the facility fluid heat exchanger. In some embodiments, the secondary facility heat exchanger 664 and/or the facility fluid heat exchanger may be bypassed in one or both working fluid circuits, depending on the facility needs and/or the environmental conditions (such as temperature of the downhole fluid, etc.). The thermal system 600 may therefore include one or more fluid distribution devices that may be controlled to bypass one or more of the secondary facility heat exchanger 664 and/or the facility fluid heat exchanger 620 in at least one of the fluid circuits.

The thermal system 600 may include a secondary facility fluid coupling 666 for facilitating connecting the thermal system 600 to a fluid circuit for the secondary facility fluid, for example, within the facility. In this way, the secondary facility heat exchanger 664 may be contained within an enclosure 618 of the thermal system 600, for example, packaged and/or assembled with the thermal system 600 for a plug-and-play-type implementation. For example, the secondary facility fluid coupling 666 may be implemented in, on, or at the enclosure 618 to facilitate connecting the secondary facility heat exchanger 664 to a secondary facility fluid circuit of the facility.

Figures 6, 7:
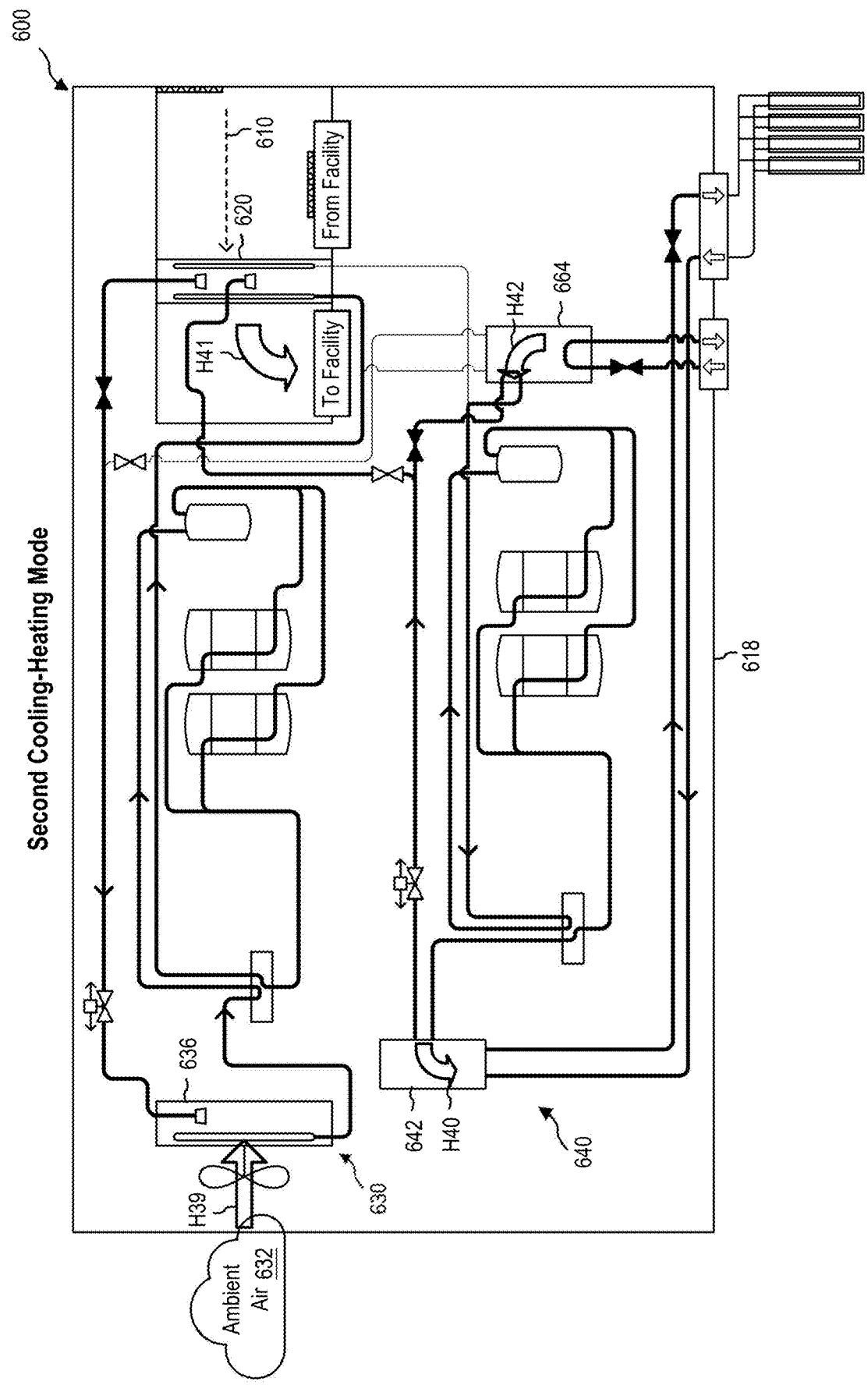
Figures 1, 7:
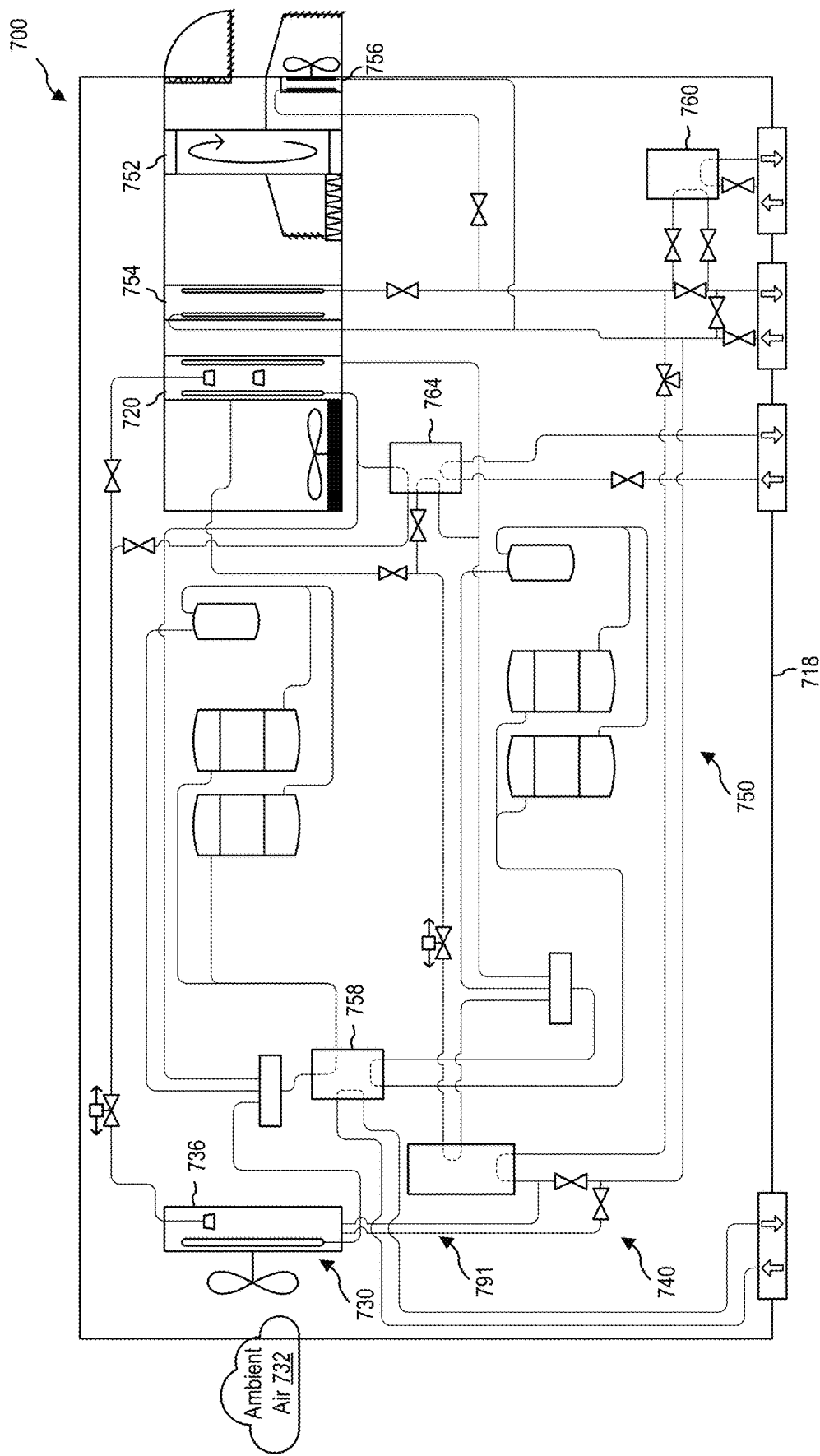
Figures 2, 7:
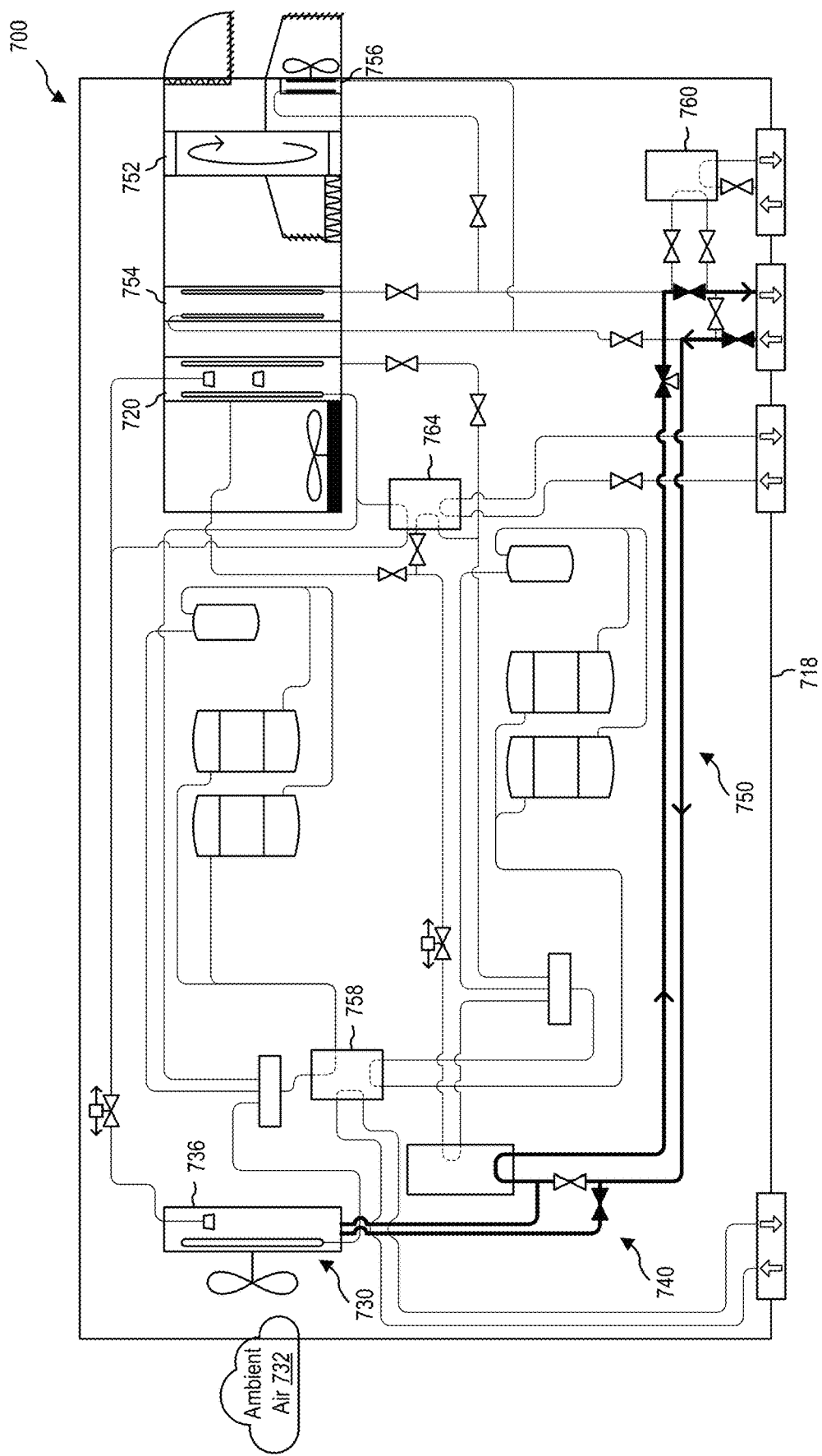
Figures 3, 7:
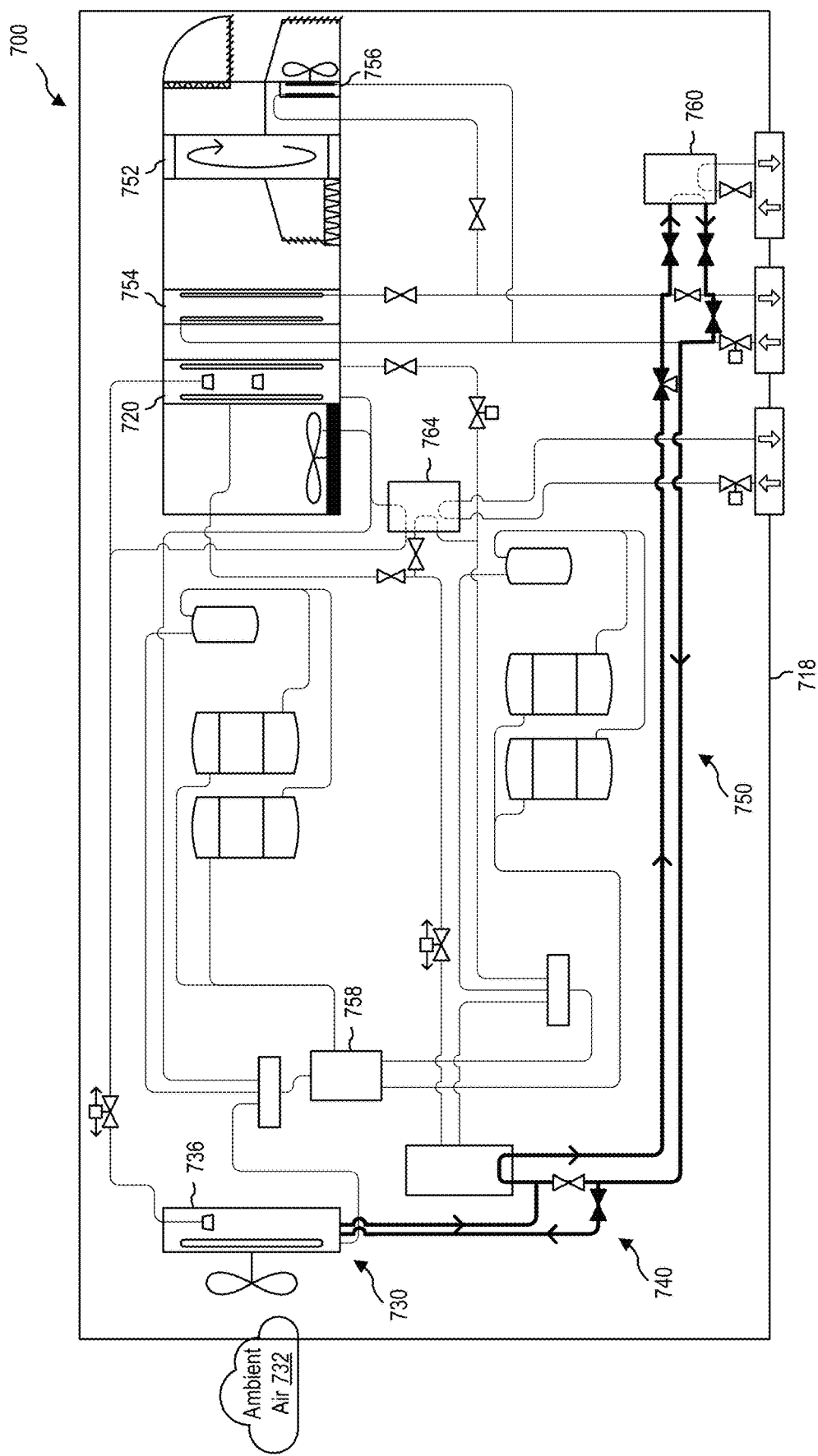

FIGS. 6-2 through 6-7 illustrate various operating modes of the thermal system 600 with respect to the secondary facility heat exchanger 664, according to embodiments of the present disclosure.

With reference to FIG. 6-2, in some embodiments, the thermal system 600 operates in a parallel heating mode in which both the air-source heat pump 630 and the ground-source heat pump 640 are implemented to transfer heat to both the facility heat exchanger 620 and the secondary facility heat exchanger 664. For example, heat H15 is transferred from an ambient air 632 to the air-source working fluid at an air-source heat exchanger 636. Similarly, heat H16 is transferred from a downhole fluid to a ground-source working fluid at a ground-source heat exchanger 642. At the facility heat exchanger 620 heat H17 is transferred from the air-source working fluid to the facility fluid 610 as well as heat H18 being transferred from the ground-source working fluid to the facility fluid 610. In parallel with the heat transfer at the facility heat exchanger 620 heat H19 is transferred from the air-source working fluid to the secondary facility fluid at the secondary facility heat exchanger 664, and heat H20 is also transferred to the secondary facility fluid from the ground-source working fluid at the secondary facility heat exchanger 664. In this way, the thermal system 600 is implemented to provide heating to both the facility fluid 610 at the facility heat exchanger 620 and to the secondary facility fluid at the secondary facility heat exchanger 664 with both the air-source heat pump 630 and the ground-source heat pump 640.

With reference to FIG. 6-3, in some embodiments, the thermal system 600 operates in a parallel cooling mode in which both the air-source heat pump 630 and the ground-source heat pump 640 are implemented to transfer heat from both the facility heat exchanger 620 and the secondary facility heat exchanger 664. For example, at the facility heat exchanger 620, heat H23 is transferred to the air-source working fluid from the facility fluid 610 as well as heat H24 being transferred to the ground-source working fluid from the facility fluid 610. In parallel with the heat transfer at the facility heat exchanger 620, heat H25 is transferred to the air-source working fluid from the secondary facility fluid at the secondary facility heat exchanger 664, and heat H26 is also transferred from the secondary facility fluid to the ground-source working fluid at the secondary facility heat exchanger 664. Accordingly, heat H21 is transferred to the ambient air 632 from the air-source working fluid at the air-source heat exchanger 636. Similarly, heat H22 is transferred to the downhole fluid from the ground-source working fluid at the ground-source heat exchanger 642. In this way the thermal system 600 is implemented to provide cooling to both the facility fluid 610 at the facility heat exchanger 620 and to the secondary facility fluid at the secondary facility heat exchanger 664 with both the air-source heat pump 630 and the ground-source heat pump 640. In a variant, one or both of the facility heat exchanger 620 and the secondary facility heat exchanger 664 may transfer heat with only one of the heat pump circuits. Fluid distribution devices may be configured to select the portion of the flow from each of the ground-source working fluid and air-source working fluid that is directed to each of the heat exchangers.

With reference to FIG. 6-4, in some embodiments, the thermal system 600 operates in a first heating-cooling mode in which the ground-source heat pump 640 operates in a heating mode to provide heat to the facility heat exchanger 620 and the air-source heat pump 630 operates in a cooling mode to provide cooling to the secondary facility heat exchanger 664. For example, heat H30 is transferred to the air-source working fluid from the secondary facility fluid at the secondary facility heat exchanger 664 and heat H27 is transferred to the ambient air 632 from the air-source working fluid at the air-source heat exchanger 636. Heat H28 is transferred from the downhole fluid to the ground-source working fluid at the ground-source heat exchanger 642. At the facility heat exchanger 620, heat H29 is transferred from the ground-source working fluid to the facility fluid 610. In this way the thermal system 600 is implemented to provide heating to the facility fluid 610 at the facility heat exchanger 620 with the ground-source heat pump 640 and cooling to the secondary facility fluid at the secondary facility heat exchanger 664 with the air-source heat pump 630, for example for providing both heating and cooling to different portions of the facility.

With reference to FIG. 6-5, in some embodiments, the thermal system 600 operates in a second heating-cooling mode in which the ground-source heat pump 640 operates in a heating mode to provide heat to the secondary facility heat exchanger 664 and the air-source heat pump 630 operates in a cooling mode to provide cooling to the facility heat exchanger 620. For example, at the facility heat exchanger 620, heat H33 is transferred to the air-source working fluid from the facility fluid 610. Heat H31 is transferred to the ambient air 632 from the air-source working fluid at the air-source heat exchanger 636. In the ground source heat pump 640, heat H32 is transferred from the downhole fluid to the ground-source working fluid at the ground-source heat exchanger 642. Heat H34 is transferred from the ground-source working fluid to the secondary facility fluid at the secondary facility heat exchanger 664. In this way the thermal system 600 is implemented to provide cooling to the facility fluid 610 at the facility heat exchanger 620 with the air-source heat pump 630 and heating to the secondary facility fluid at the secondary facility heat exchanger 664 with the ground-source heat pump 640, for example, for providing both heating and cooling to different portions of the facility.

With reference to FIG. 6-6, in some embodiments, the thermal system 600 operates in a first cooling-heating mode in which the ground-source heat pump 640 operates in a cooling mode to provide cooling to the facility heat exchanger 620 and the air-source heat pump 630 operates in a heating mode to provide heating to the secondary facility heat exchanger 664. For example, heat H35 is transferred from the ambient air 632 to the air-source working fluid at the air-source heat exchanger 636. Heat H38 is transferred from the air-source working fluid to the secondary facility fluid at the secondary facility heat exchanger 664. At the facility heat exchanger 620, heat H37 is transferred to the ground-source working fluid from the facility fluid 610. Heat H36 is transferred to the downhole fluid from the ground-source working fluid at the ground-source heat exchanger 642. In this way, the thermal system 600 is implemented to provide cooling to the facility fluid 610 at the facility heat exchanger 620 with the ground-source heat pump 640 and heating to the secondary facility fluid at the secondary facility heat exchanger 664 with the air-source heat pump 630, for example, for providing both heating and cooling to different portions of the facility.

With reference to FIG. 6-7, in some embodiments, the thermal system 600 operates in a second cooling-heating mode in which the ground-source heat pump 640 operates in a cooling mode to provide cooling to the secondary facility heat exchanger 664 and the air-source heat pump 630 operates in a heating mode to provide heating to the facility heat exchanger 620. For example, heat H39 is transferred from the ambient air 632 to the air-source working fluid at the air-source heat exchanger 636. At the facility heat exchanger 620, heat H41 is transferred from the air-source working fluid to the facility fluid 610. Heat H42 is transferred to the ground-source working fluid from the secondary facility fluid at the secondary facility heat exchanger 664. Heat H40 is transferred to the downhole fluid from the ground-source working fluid at the ground-source heat exchanger 642. In this way, the thermal system 600 is implemented to provide heating to the facility fluid 610 at the facility heat exchanger 620 with the air-source heat pump 630 and cooling to the secondary facility fluid at the secondary facility heat exchanger 664 with the ground-source heat pump 640, for example, for providing both heating and cooling to different portions of the facility.

FIG. 7-1 illustrates an example schematic diagram of a thermal system 700, according to at least one embodiment of the present disclosure. The thermal system 700 may be substantially similar to, and may include any of the features of, the thermal systems described herein. For example, the thermal system 700 may include an air-source heat pump 730 and a ground-source heat pump 740 and associated components for providing heating and/or cooling to a facility via a facility heat exchanger 720 as described herein.

In some embodiments, the thermal system 700 includes a recovery heat exchanger 752 as described herein. In some embodiments, the thermal system 700 includes a supply heat exchanger 754 as described herein. In some embodiments, the thermal system 700 includes an exhaust heat exchanger 756 as described herein. In some embodiments, the thermal system 700 includes a hot fluid heat exchanger 758 as described herein. In some embodiments, the thermal system 700 includes a cold fluid heat exchanger 760 as described herein. In some embodiments, the thermal system 700 includes a secondary facility heat exchanger 764 as described herein. In this way, each of the components, features, functionalities, etc., of the various thermal systems described herein may be combined in any way, including all of the components combined into a single thermal system. For instance, any (or all) of the components shown and described in connection with the thermal system 700 of FIG. 7 may be included or packaged within an enclosure 718, for example, for providing an assembled, transportable, plug-and-play thermal system for implementing and positioning at or on a facility to provide for the various thermal needs of the facility.

In some embodiments, the downhole fluid circuit 750 includes a bypass loop 791. The bypass loop may connect the downhole fluid circuit 750 to an air-source heat exchanger 736 of the air-source heat pump 730. For example, the bypass loop 791 may facilitate transferring heat between the downhole fluid and the ambient air 732 at the air-source heat exchanger 736. For instance, as shown in FIG. 7-2, in some cases the thermal system 700 may be configured such that the downhole fluid flows between the borehole heat exchanger and the air-source heat exchanger via the bypass loop 791. In some cases, this may facilitate exchanging heat between the ambient air 732 and the geological formation. For example, in some cases, given the operating conditions (e.g., temperatures) of the ambient air 732 and/or the geological formation it may be advantageous to transfer heat from the ambient air 732 to the geological formation, for instance, in a direct manner via the downhole fluid and the bypass loop 791. This may facilitate storing heat in the geological formation, such as to regulate a temperature of the geological formation as described herein. Similarly, heat may also be transferred from the geological formation to the ambient air 732 via the bypass loop 791, for instance, to advantageously lower the temperature of the geological formation. In this way, the bypass loop 732 may facilitate leveraging the relative operating temperatures of the ambient air 732 and/or the geological formation in order to advantageously transfer heat therebetween for various purposes.

In some embodiments, the bypass loop 791 may facilitate defrosting the air-source heat exchanger 736. For example, in some cases, such as when the air-source working fluid is at low temperatures (e.g., below 0° C.), ice may form on, around, or at the air-source heat exchanger 736, such as on one or more coils, fins, tubes, channels, etc., of the air source heat exchanger 736. In some cases, ice formation in this way can damage, can affect the efficiency or operation of, and/or can otherwise be undesirable for the air-source heat exchanger 736. Accordingly, in many cases thermal systems may implement various techniques for defrosting air-source heat exchangers. For instance, some solutions may implement specific defrosting components, such as electrical heating components, which may be inefficient and/or may introduce undesirable complexity to the thermal system. Other defrosting solutions may operate the air-source heat pump in reverse (e.g., in a cooling mode), so as to transfer heat from air-source working fluid to the ambient air in order to defrost the air-source heat exchanger. Such a solution, however, may be undesirable in that it may result in halting the heating of, or even providing cooling to, the facility in order to defrost the air-source heat exchanger 736, which can come at considerable expense to the efficiency of the thermal system.

In some embodiments, the bypass loop 791 may be implemented to defrost the air-source heat exchanger 736. For example, the downhole fluid may flow between the borehole heat exchanger and the air-source heat exchanger 736 via the bypass loop 791 to facilitate transferring heat from the geological formation to the ambient air 732 in order that the air-source heat exchanger 736 may defrost. Such a defrosting operation may leverage the relatively warmer temperatures of the geological formation to defrost the air-source heat exchanger 736 in an energy-efficient manner. Heat may be transferred from the geological formation to the ambient air 732 in this way in conjunction with heat being transferred to the ground-source heat pump 740, or else may be operated independent of the ground-source heat pump 740 (e.g., with the ground-source heat pump 740 turned off or otherwise not in operation).

As shown in FIG. 7-3, in some embodiments the thermal system 700 may be configured such that the downhole fluid flows between the air-source heat exchanger 736 and the fold fluid heat exchanger 760. This may facilitate transferring heat from the cold fluid to the downhole fluid at the cold fluid heat exchanger 760, and from the downhole fluid to the ambient air 732 at the air-source heat exchanger 736. For instance, the air-source heat exchanger 736 may serve as a dry cooler in this configuration. For example, when the temperatures of the ambient air 782 permit (e.g., are lower than that supply temperature of the cold fluid), the air-source heat exchanger 736 may facilitate cooling the cold fluid in a passive, energy efficient manner, for example, without implementing a heat pump. In some embodiments, the thermal system 700 may operate in this way without flowing the downhole fluid to the borehole heat exchanger such that the cold fluid is cooled solely by the air-source heat exchanger.

Figures 1, 8:
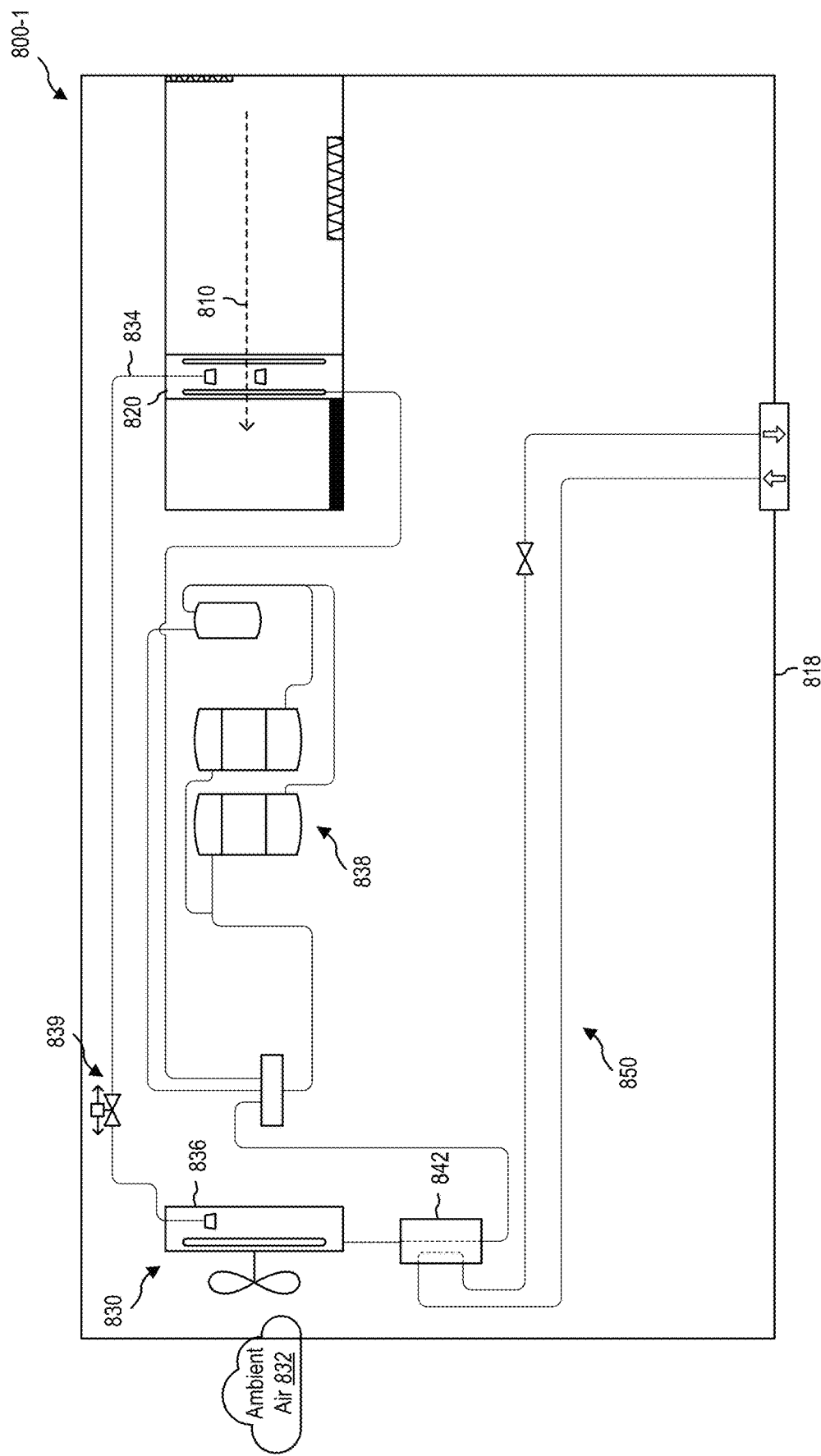
Figures 2, 8:
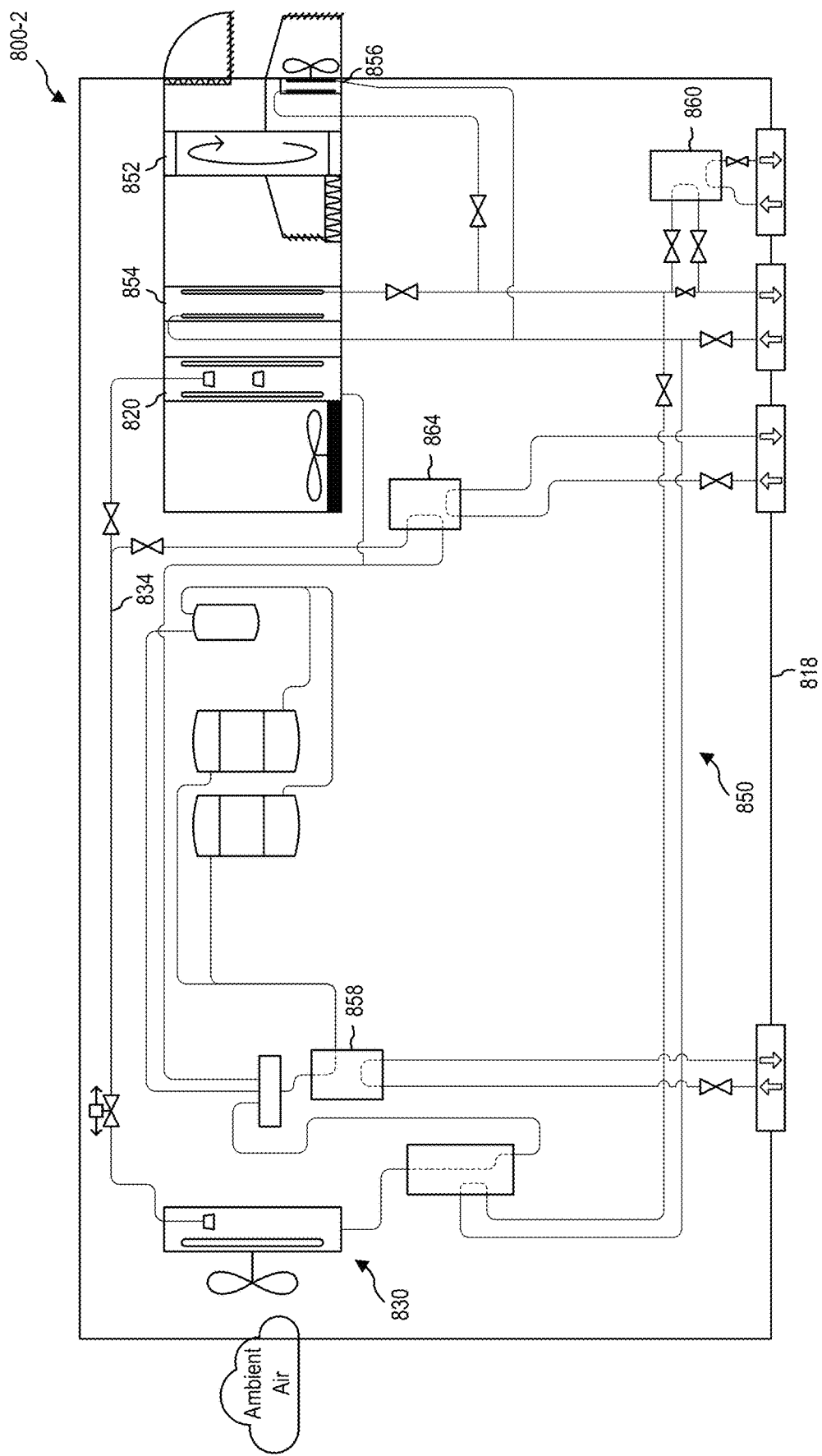

FIG. 8-1 illustrates an example schematic diagram of a thermal system 800-1, according to at least one embodiment of the present disclosure. In some embodiments, the thermal system 800-1 includes one or more of the components, features, and/or functionalities of one or more of the thermal systems described herein. The thermal system 800-1 includes a heat pump 830 for providing heating and/or cooling to a facility fluid 810 via a facility heat exchanger 820 as described herein.

The heat pump 830 includes a heat pump fluid circuit 834. Positioned on the heat pump fluid circuit 834 is the facility heat exchanger 820, one or more compressors 838, and one or more expansion valves 839. The heat pump 830 also includes an air-source heat exchanger 836 and a ground-source heat exchanger 842 positioned on the heat pump fluid circuit 834 in series. The heat pump 830 may circulate through a working fluid through the heat pump fluid circuit 834, and accordingly, through the air-source heat exchanger 836 and the ground-source heat exchanger 842.

In this way, the heat pump 830 may be a dual-source heat pump and may operate to exchange heat with an ambient air 832, as well as with a downhole fluid of a downhole fluid circuit 850 in thermal communication with a geological formation via a borehole heat exchanger. The heat pump 830 may be a reversible heat pump, and may operate in different heating and cooling modes to both transfer heat to and from the facility fluid 810 at the facility heat exchanger 820. In this way, the thermal system 800-1 may be similar to one or more of the thermal systems described above, but may include the air-source heat exchanger 836 and the ground-source heat exchanger 842, for example, connected in series in a same heat pump and in a same fluid circuit for exchanging heat with a same working fluid.

The thermal system 800-1 may be contained within an enclosure 818 as described herein. For example, the components of the thermal system 800-1 just discussed may be packaged together within, on, or at the enclosure 818 in order that the thermal system 800-1 may be transported to a facility, positioned or installed on or at the facility, and connected to one or more systems or subsystems of the facility for a plug-and-play-type implementation. This serial configuration of the thermal system 800-1 with a single heat pump 830 may simplify the implementation and/or operation of the thermal system 800-1 and/or may reduce implementation and/or operational cost associated with the thermal system 800-1.

FIG. 8-2 illustrates an example schematic diagram of a thermal system 800-2, according to at least one embodiment of the present disclosure. The thermal system 800-2 may be substantially similar to the thermal system 800-1 of FIG. 8-1. For example, the thermal system 800-2 may be the thermal system 800-1 with one or more additional components.

The thermal system 800-2 may include one or more of the thermal components and/or subsystems described herein in connection with various other thermal systems, but implemented in connection with the serial heat pump implementation of the thermal system 800-1. For example, the thermal system 800-1 may include a hot fluid heat exchanger 858 connected to the heat pump fluid circuit 834, for example, for providing a hot fluid such as domestic hot water to the facility. In some embodiments, the thermal system 800-2 includes a secondary facility heat exchanger 864, for example, for providing a heated or cooled secondary fluid (e.g., liquid or air) to the facility in conjunction with the heating or cooling of the facility fluid 810. The secondary facility heat exchanger 864 may provide additional thermal conditioning to the facility via a secondary facility fluid. In some cases, the thermal system 800-2 may operate the secondary facility heat exchanger 864 in parallel with the (e.g., operating mode) of the facility heat exchanger 820 to heat the secondary facility fluid in connection with heating the facility fluid 810, or to cool the secondary facility fluid in connection with cooling the facility fluid 810. In some cases, the thermal system 800-2 may operate the secondary facility heat exchanger 864 and may not operate the facility heat exchanger 820.

In some embodiments, the thermal system 800-2 includes a cold fluid heat exchanger 860. The cold fluid heat exchanger 860 may be connected to the downhole fluid circuit 850 and may facilitate transferring heat from a cold fluid to the downhole fluid as described herein. The cold fluid may be utilized for providing cooling to one or more components or areas of the facility, such as to a data center, by directly transferring heat to the downhole fluid (e.g., without utilizing a heat pump).

In some embodiments, the thermal system 800-2 includes a recovery heat exchanger 852 for exchanging heat between an exhaust flow of the facility fluid 810 and an input flow of the facility fluid 810 as described herein. The recovery heat exchanger 852 may facilitate recovering at least some of the energy expenditure associated with the (e.g., conditioned) exhaust flow that would otherwise be lost based on exhausting the exhaust flow. In some embodiments, the thermal system 800-2 includes a supply heat exchanger 854 for exchanging heat between a supply flow of the facility fluid 810 and the downhole fluid. The supply heat exchanger 854 may facilitate preconditioning the facility fluid 810, as well as advantageously exchanging heat with the geological formation to manage a temperature of the ground. In some embodiments, the thermal system 800-2 includes an exhaust heat exchanger 856. The exhaust heat exchanger may facilitate exchanging heat between the exhaust flow and the downhole fluid, for example, as another means for managing the temperature of the geological formation.

In this way, the thermal system 800-2 may include any or all of the components of the various thermal systems described herein, and as applied to a serial configuration of a dual-source heat pump system. The thermal system 800-2 may be contained within the enclosure 818 as described herein.

Figures 1, 9:
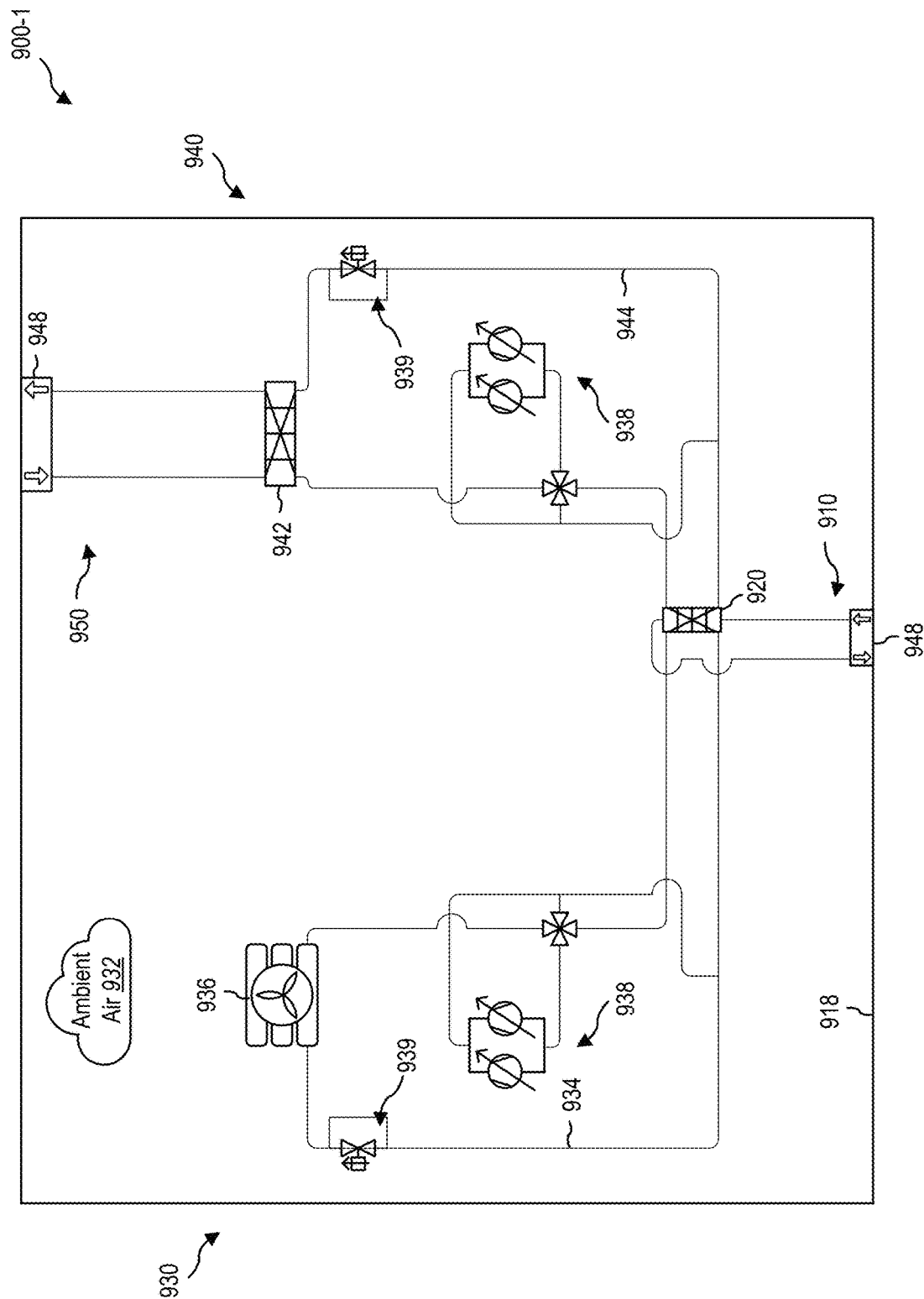
Figures 2, 9:
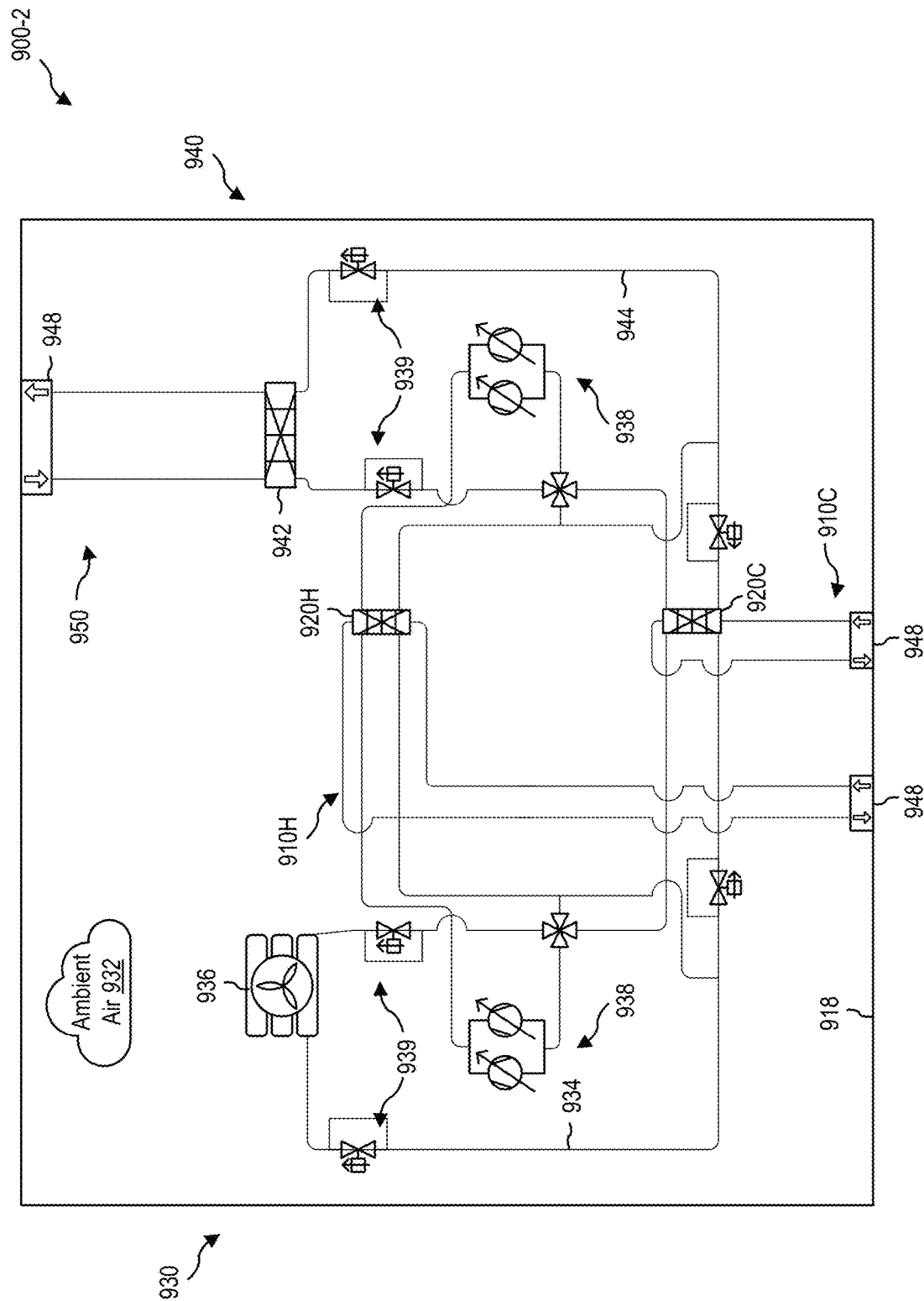
Figures 3, 9:
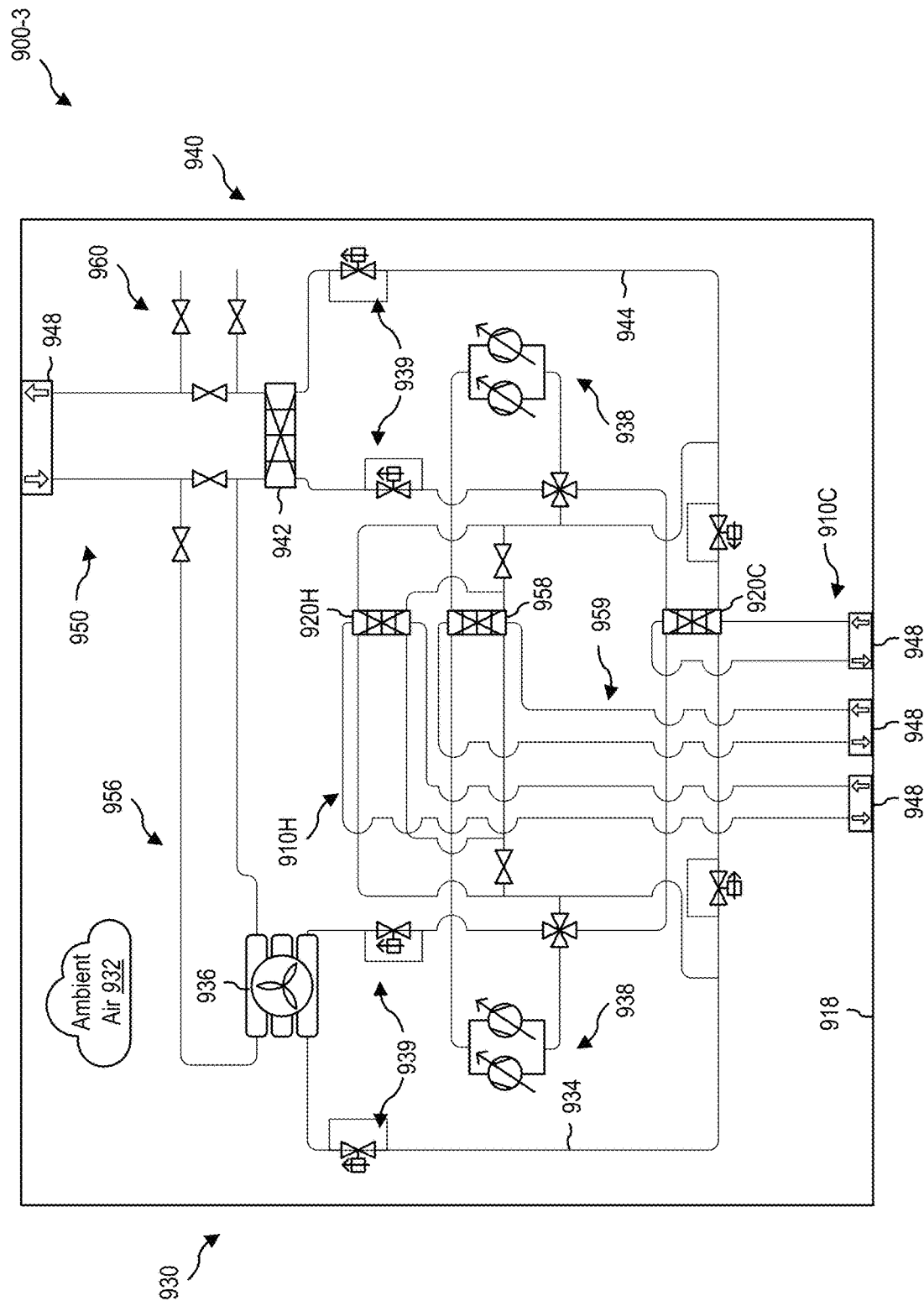
Figures 4, 9:
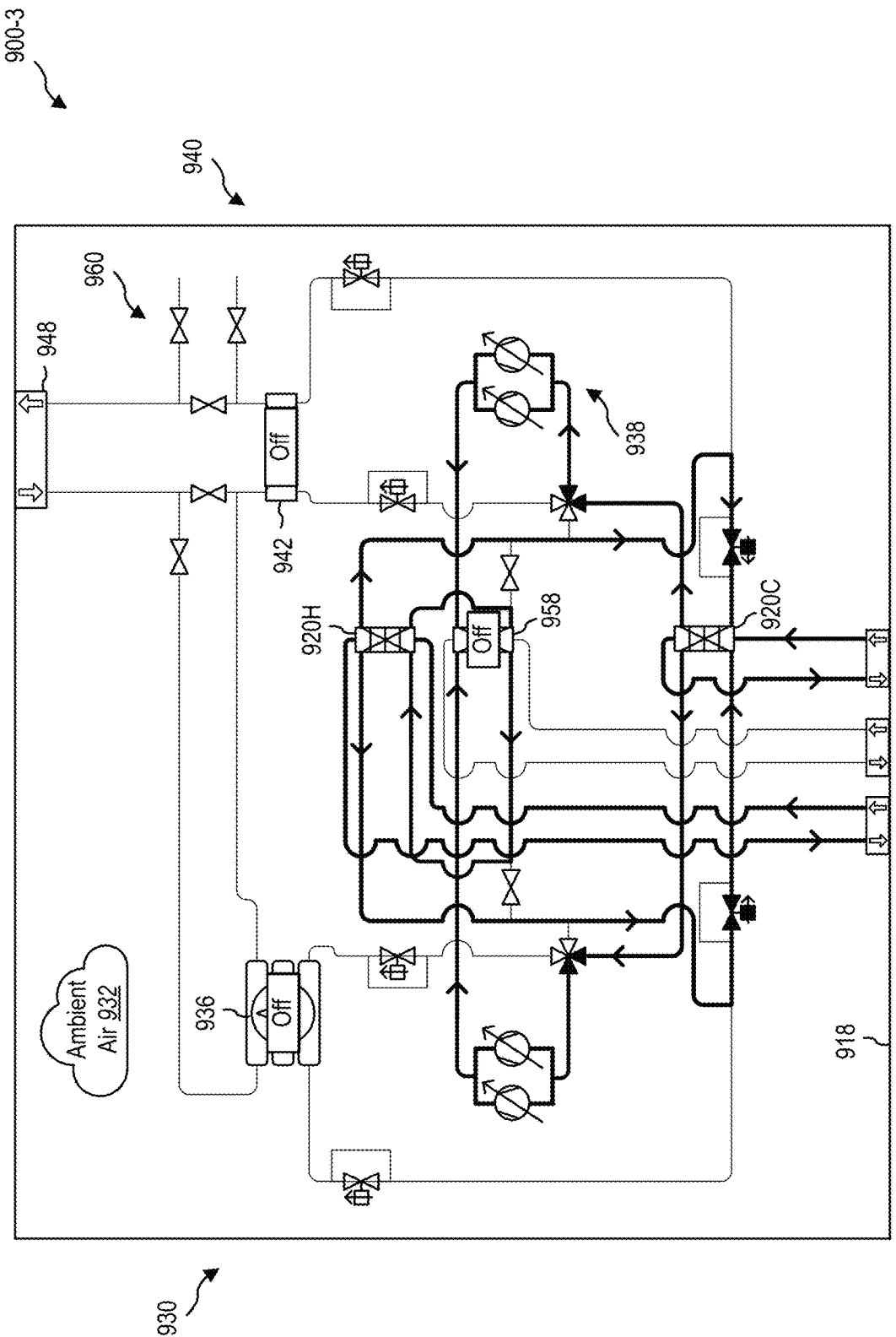
Figures 5, 9:
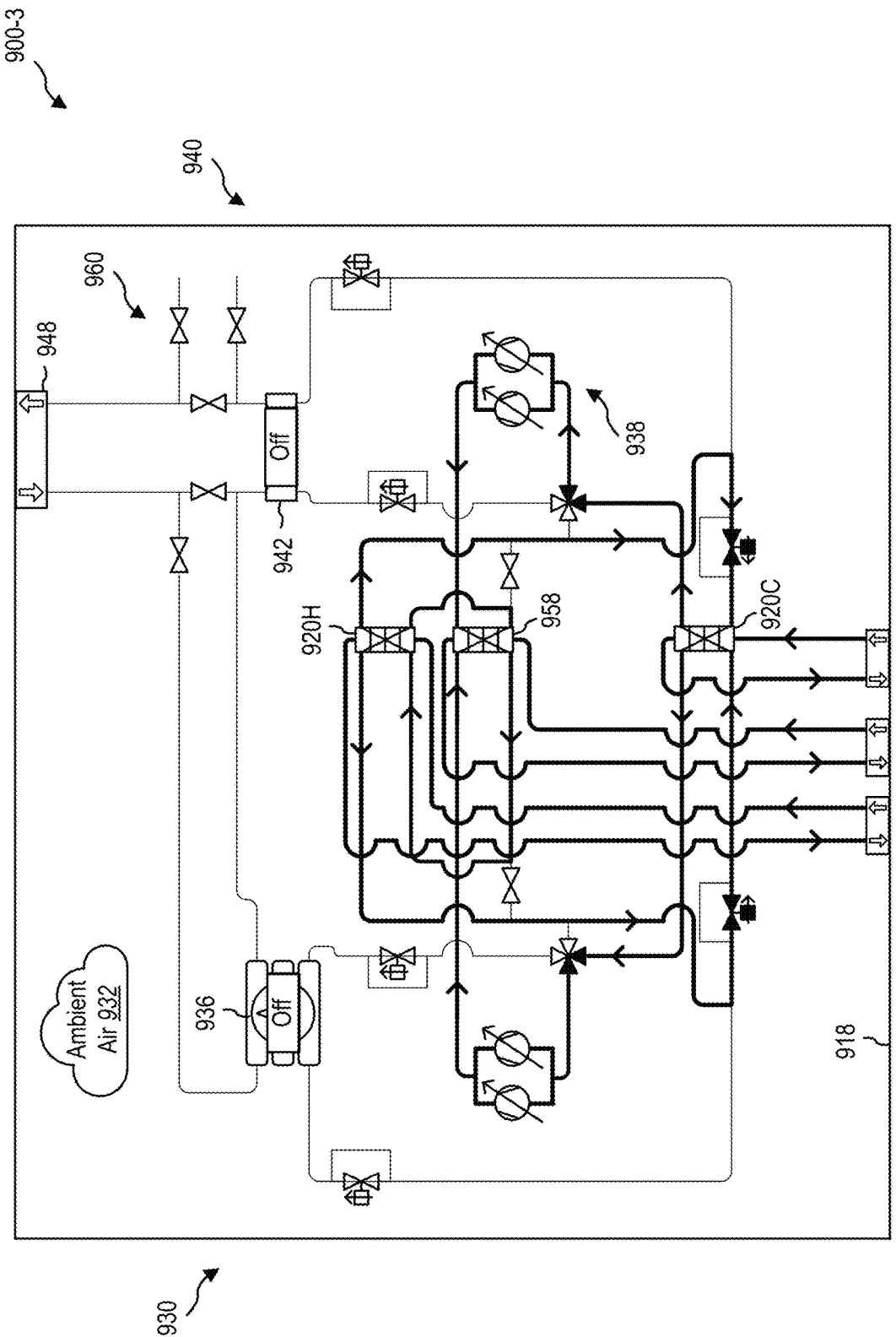
Figures 6, 9:
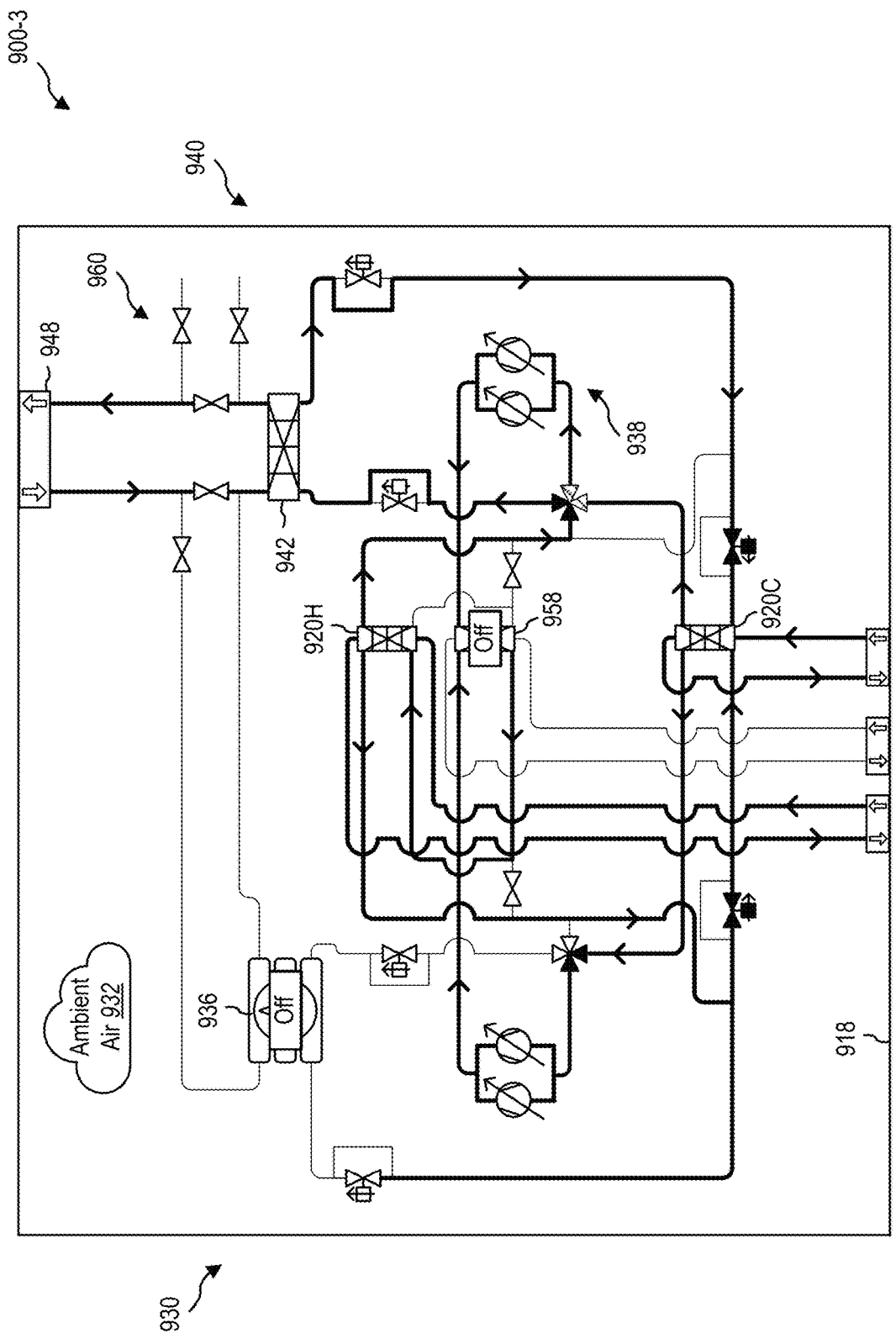
Figures 7, 9:
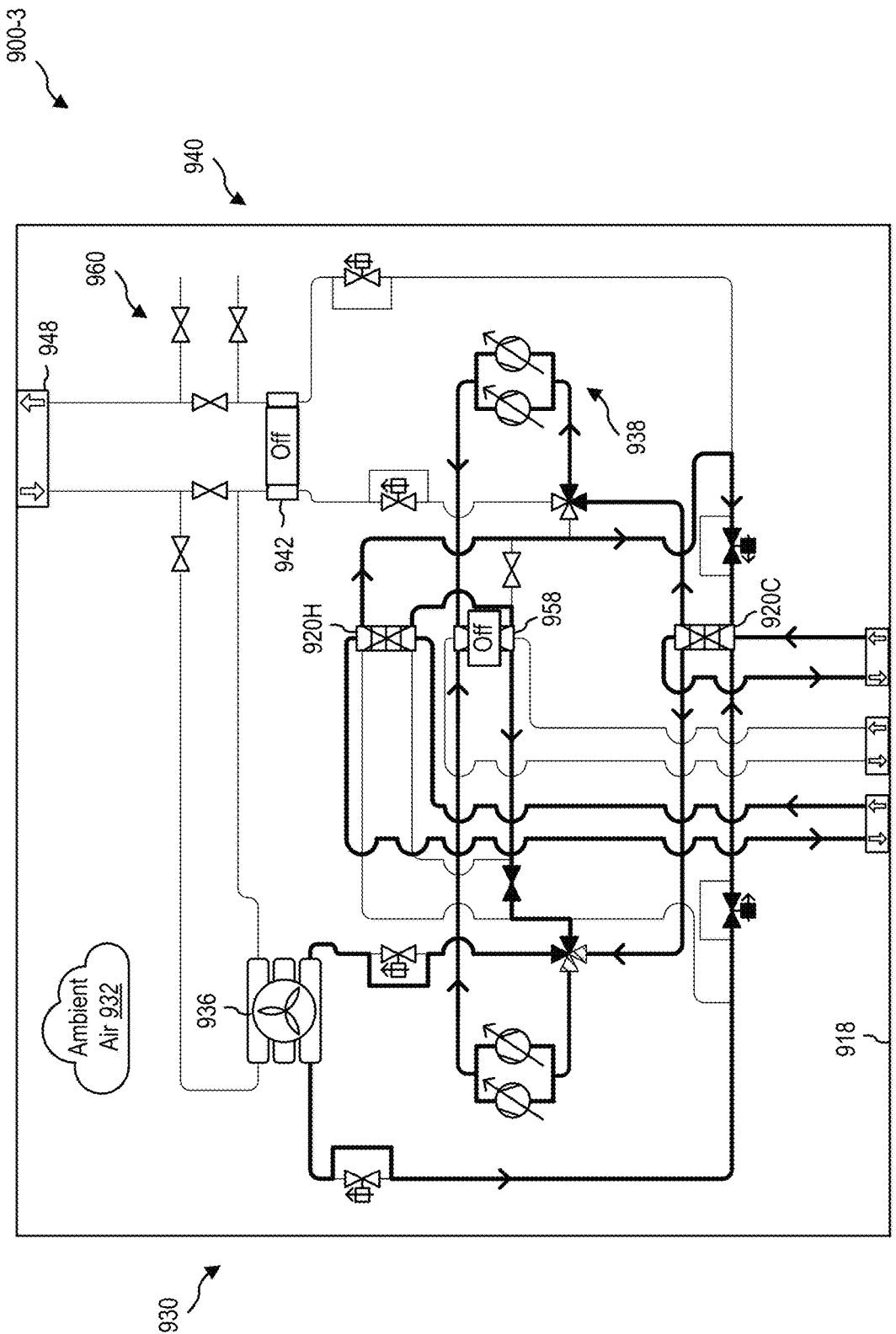
Figures 8, 9:
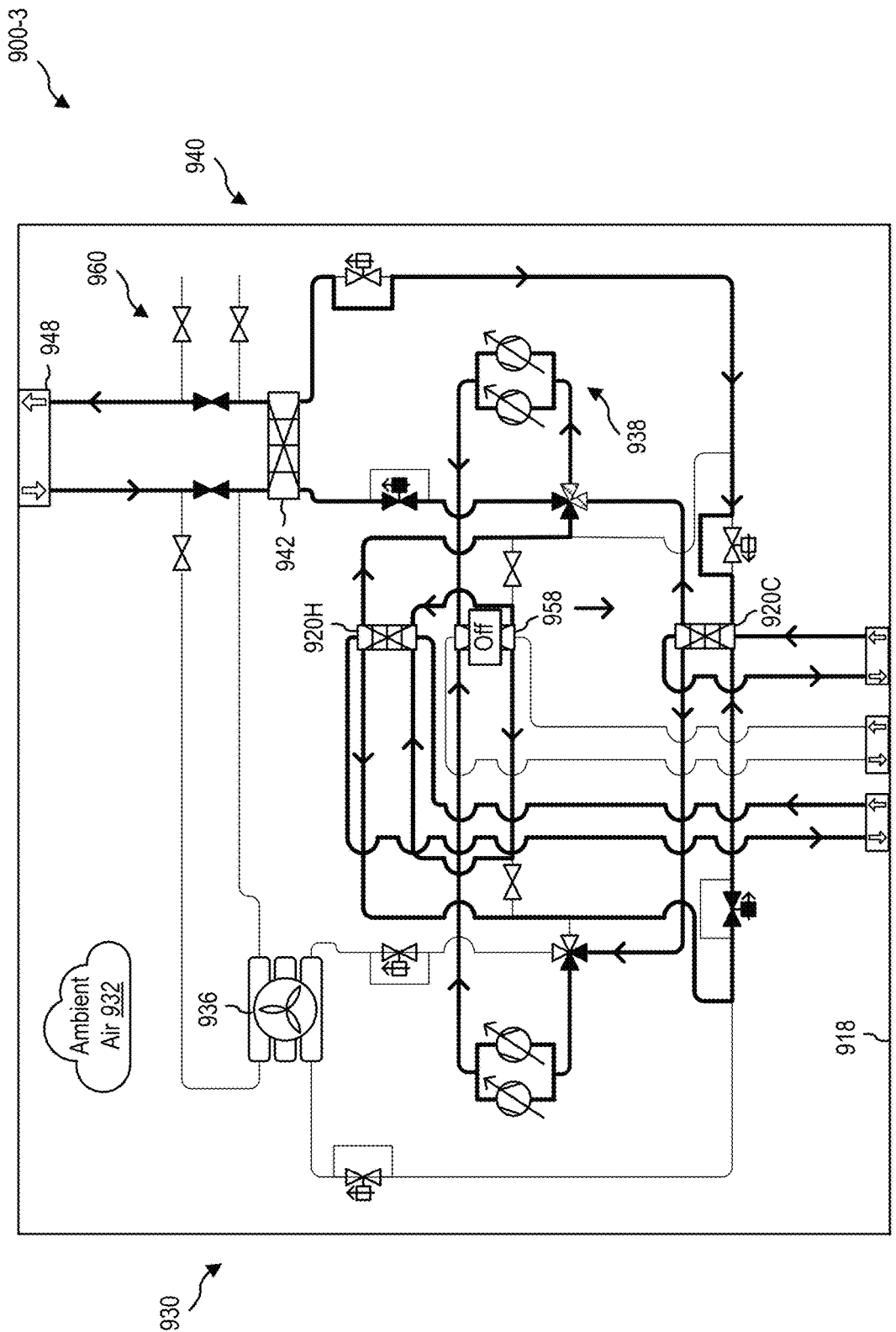
Figure 9:
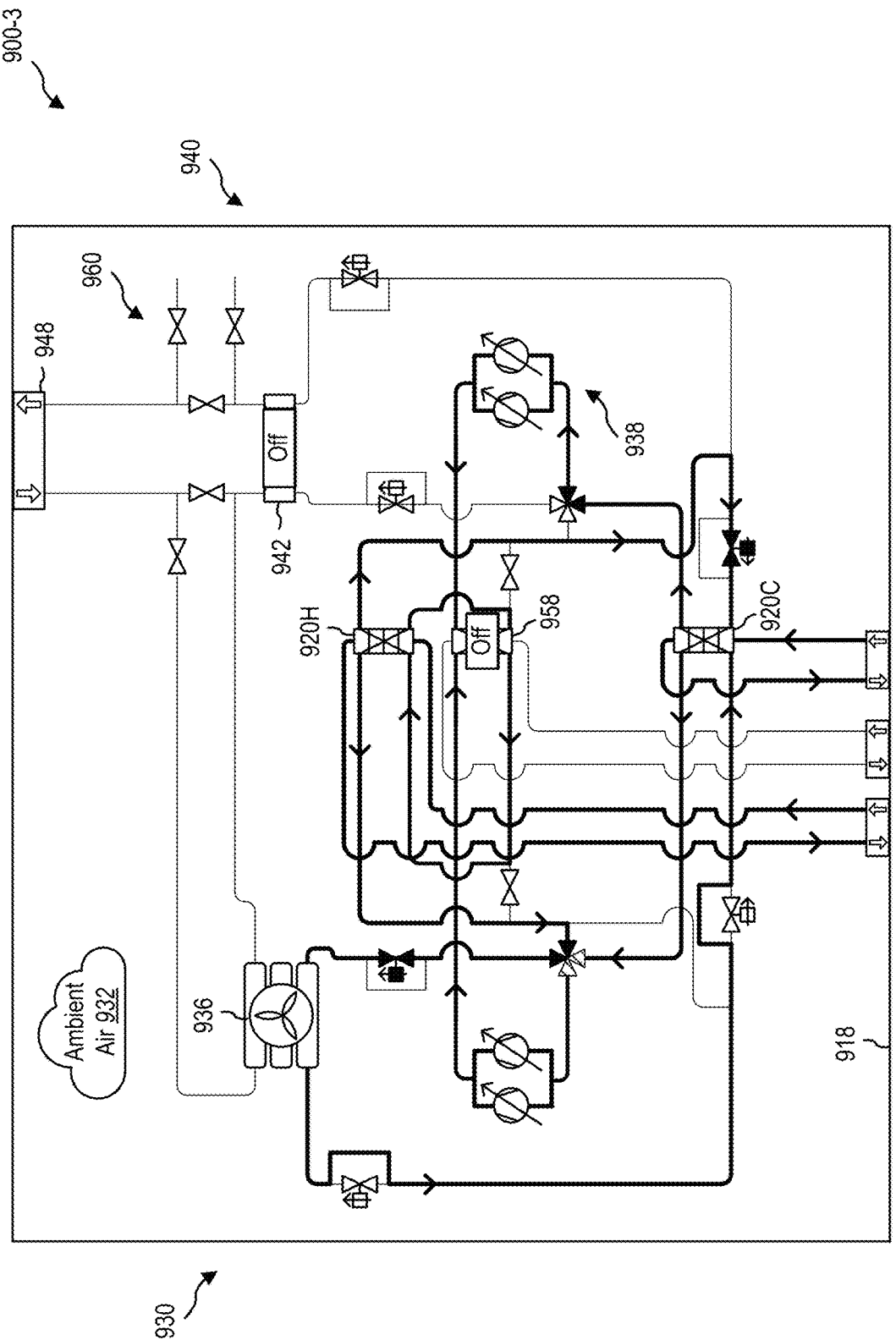

FIG. 9-1 illustrates an example schematic diagram of a thermal system 900-1, according to at least one embodiment of the present disclosure. The thermal system 900-1 may include one or more of the components, features, and/or functionalities of the other thermal systems described herein. For example, the thermal system 900-1 includes an air-source heat pump 930 and a ground-source heat pump 940. The air-source heat pump 930 may include an air-source heat exchanger 936 for exchanging heat with an ambient air 932, one or more compressors 938, one or more expansion valves 939, and a facility heat exchanger 920 positioned on an air-source heat pump fluid circuit 934 for circulating an air-source working fluid through these various components. The air-source heat pump 930 may exchange heat with a facility fluid of a facility fluid circuit 910 at the facility heat exchanger 920. For example, the air-source heat pump 930 may be a reversible heat pump and may be configured to either transfer heat to, or extract heat from the facility fluid at the facility heat exchanger 920. The facility fluid of the facility fluid circuit 910 may be a liquid facility fluid. However, the same architecture may be applicable for a facility fluid that is a gaseous facility fluid such as air.

The ground-source heat pump 940 may include a ground-source heat exchanger 942 for exchanging heat with a downhole fluid of a downhole fluid circuit 950, one or more compressors 938, one or more expansion valves 939, and the facility heat exchanger 920 positioned on a ground-source heat pump fluid circuit 944 for circulating a ground-source working fluid through these various components. The ground-source heat pump 940 may exchange heat with the facility fluid at the facility heat exchanger 920. The ground-source heat pump 940 may also be reversible and may be configured to either transfer heat to, or extract heat from the facility fluid at the facility heat exchanger 920.

In this way, the thermal system 900-1 may include the air-source heat pump 930 and the ground-source heat pump 940 to provide heating and/or cooling to the facility at the facility heat exchanger 920 as described herein. The thermal system 900-1 may be packaged and/or contained within an enclosure 918 as described herein. For example, the thermal system 900-1 may include one or more couplings 948 for connecting one or more of the components of the thermal system 900-1 within the enclosure to associated fluid circuits of the facility.

FIG. 9-2 illustrates an example schematic diagram of a thermal system 900-2, according to at least one embodiment of the present disclosure. The thermal system 900-2 may be substantially similar to the thermal system 900-1 of FIG. 9-1. However, in place of the (e.g., reversible hot or cold) facility heat exchanger 920, the thermal system 900-1 may include a cold facility heat exchanger 920C for providing a cold facility fluid via a cold facility fluid circuit 910C, and a hot facility heat exchanger 920H for providing a hot facility fluid via a hot facility fluid circuit 910H. The thermal system 900-2 may be configured in this way such that heating and/or cooling can be provided to the facility via one or more of the air-source heat pump 930 or the ground-source heat pump 940. Various example operating modes are described herein in connection with FIGS. 9-4 through 9-29.

FIG. 9-3 illustrates an example schematic diagram of a thermal system 900-3, according to at least one embodiment of the present disclosure. The thermal system 900-3 may be substantially similar to the thermal system 900-2 of FIG. 9-2. The thermal system 900-3 may additionally include a hot fluid heat exchanger 958, for example, connected to one or more of the air-source heat pump 930 or the ground-source heat pump 940. For example, the hot fluid heat exchanger 958 may facilitate providing a hot fluid via a hot fluid circuit 959 to the facility as described herein, such as for domestic hot water.

The thermal system 900-3 may include or may be configured to connect to a cold fluid circuit 960. The cold fluid circuit 960 may be connected to the downhole fluid circuit 950, either directly or through a cold fluid circuit heat exchanger. The cold fluid circuit 960 may facilitate providing cooling to one or more components or areas of the facility, as described herein, such as to a data center. For instance, the cold fluid circuit 960 may include any of the feature of and/or may perform any of the functions of the cold fluid heat exchanger 560 as described herein in connection with FIGS. 5-1 through 5-3.

The thermal system 900-3 may include a recovery fluid circuit 956. The recovery fluid circuit may be connected to the air-source heat exchanger 936 and the downhole fluid circuit 950. The recovery fluid circuit may facilitate transferring heat between the ambient air 932 and the geological formation via the downhole fluid circuit 950. The recovery fluid circuit 956 in this way may facilitate transferring heat to or from the ground to advantageously manage the temperature of the ground, especially when the air source heat pump is not used for providing heat and/or cold for the facility. For example, when the ground temperatures are colder than the ambient air 932, the recovery fluid circuit 956 may be implemented to transfer heat to the geological formation as needed to raise the ground temperature as described herein. Similarly, when the ground temperatures are warmer than the ambient air 932, the recovery fluid circuit 956 may be implemented to transfer heat from the geological formation as needed to lower the temperature of the geological formation as described herein. In some cases, the recovery fluid circuit 956 may be implemented to transfer heat from the cold fluid circuit 960 to the ambient air 932 as described herein. In some cases, the recovery fluid circuit 956 may facilitate defrosting the air-source heat exchanger 936 as described herein.

FIGS. 9-4 through 9-29 illustrate various operating modes or configurations of the thermal system 900-3 as described herein, according to at least one embodiment of the present disclosure.

In FIG. 9-4, the thermal system 900-3 operates to provide both heating and cooling to the facility via the air-source heat pump 930 and the ground-source heat pump 940. The thermal system 900-3 may not implement the air-source heat exchanger 936 or the ground-source heat exchanger 942, but rather, heating and cooling may be provided based on transferring heat from the cold facility fluid via the cold facility heat exchanger 920C to the hot facility fluid via the 920H, for instance, in situations where the heating load and the cooling load are somewhat the same. In FIG. 9-4, the air source and ground source heat pumps are transferring heat between both heat exchangers 920C and 920H, but only one of the heat pumps may be selected to transfer the heat between both of the exchangers.

In FIG. 9-5, the thermal system 900-3 may operate similarly to FIG. 9-4, however with the addition of operating the hot fluid heat exchanger 958 to provide the hot fluid to the facility. For example, heat may be transferred from the cold facility fluid via the cold facility heat exchanger 920C to both the hot facility fluid via the hot facility heat exchanger 920H and to the hot fluid via the hot fluid heat exchanger 958, for instance, in situations where the cooling load is about the same as the heating load and hot fluid load together.

In FIG. 9-6, the thermal system 900-3 may operate to provide both heating and cooling to the facility by implementing the ground-source heat exchanger 942. For example, in cooling dominant situations, cooling may be provided to the cold facility fluid via the cold facility heat exchanger 920C with the ground-source heat pump 940 implementing the ground-source heat exchanger 942. Some of the cooling of the cold facility fluid may be accomplished by transferring some heat from the cold facility fluid via heat exchanger 920C to the hot facility fluid via the hot facility heat exchanger 920H. This configuration may be implemented when the ground temperature is less than the ambient air temperature such that heat may be more efficiently rejected from the cold facility heat exchanger 920C based on the ground-source heat exchanger 942. In FIG. 9-7, the thermal system 900-3 may operate similarly but based on implementing the air-source heat exchanger 936, for instance in situations where the ambient temperature is less than the temperature of the geological formation. The configurations of FIGS. 9-6 and 9-7 may be applicable in cooling dominant situations, such as when the facility calls for much more cooling than heating, and the cooling may be provided to the cold facility fluid at the cold facility heat exchanger 920C by the air-source heat exchanger 936 or the ground-source heat exchanger 942, and the heating may be achieved based on transferring heat from the cold facility fluid via the cold facility heat exchanger 920C to the hot facility fluid via the hot facility heat exchanger 920H.

In FIG. 9-8, the thermal system 900-3 may operate to provide both heating and cooling to the facility by implementing the ground-source heat exchanger 942. For example, in heating dominant situations, heating may be provided to the hot facility fluid via hot facility heat exchanger 920H with the ground-source heat exchanger 942. Some of the heating at the hot facility heat exchanger 920H may be accomplished by transferring some heat from the cold facility fluid via cold facility heat exchanger 920C to the hot facility fluid via the hot facility heat exchanger 920H. This configuration may be implemented when the ground temperature is greater than the ambient air temperature such that heat may be more efficiently transferred to the hot facility fluid based on the ground-source heat exchanger 942. In FIG. 9-9, the thermal system 900-3 may operate similarly but based on implementing the air-source heat exchanger 936, for instance in situations where the ambient temperature is greater than the temperature of the geological formation. The configurations of FIGS. 9-8 and 9-9 may be applicable in heating dominant situations, such as when the facility calls for much more heating than cooling, and the heating may be provided at the hot facility heat exchanger 920H based on the air-source heat exchanger 936 or the ground-source heat exchanger 942, and the cooling may be provided to the cold facility fluid by transferring heat from the cold facility fluid via the cold facility heat exchanger 920C to the hot facility fluid via the hot facility heat exchanger 920H.

Figures 9, 10:
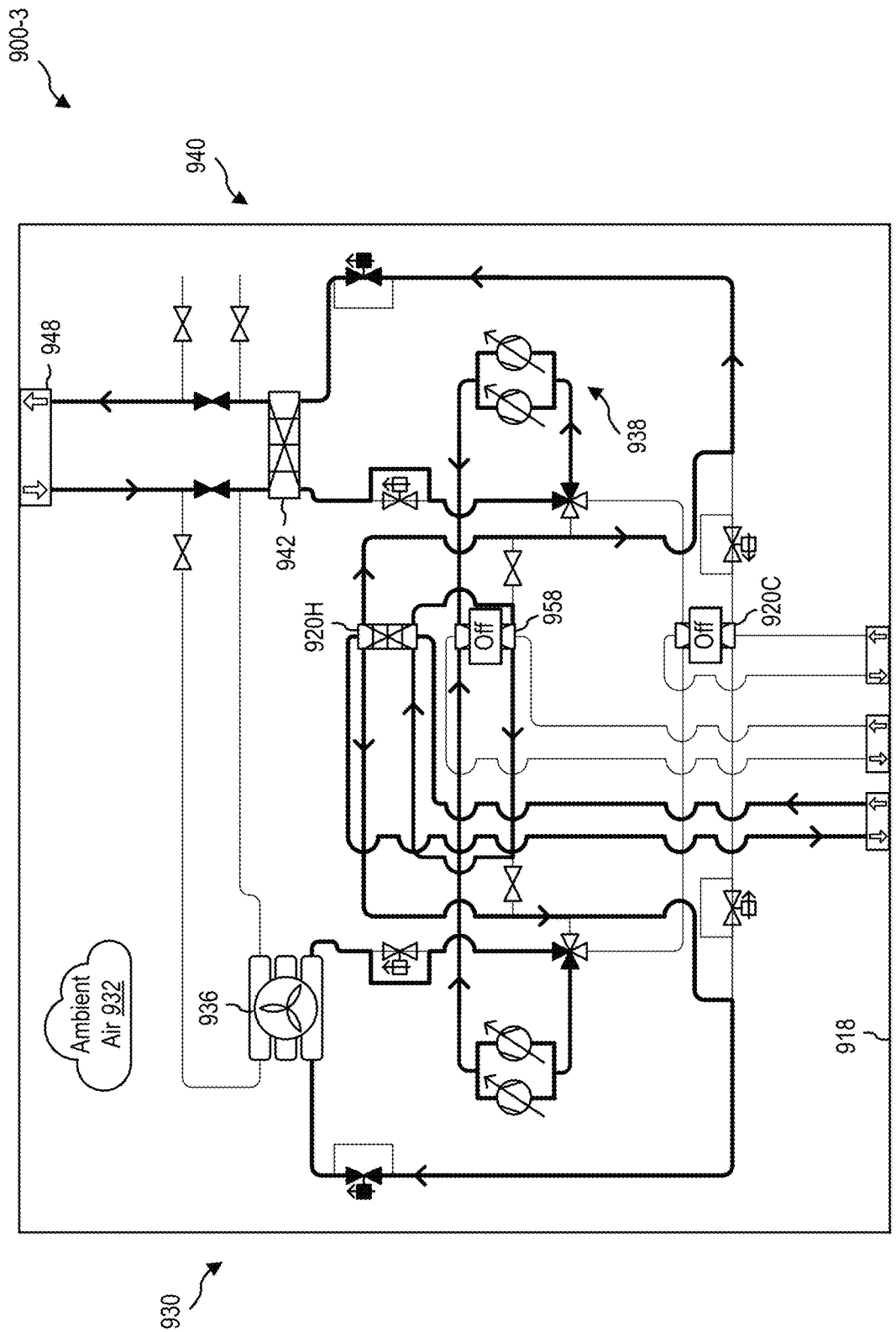
Figures 9, 10, 11:
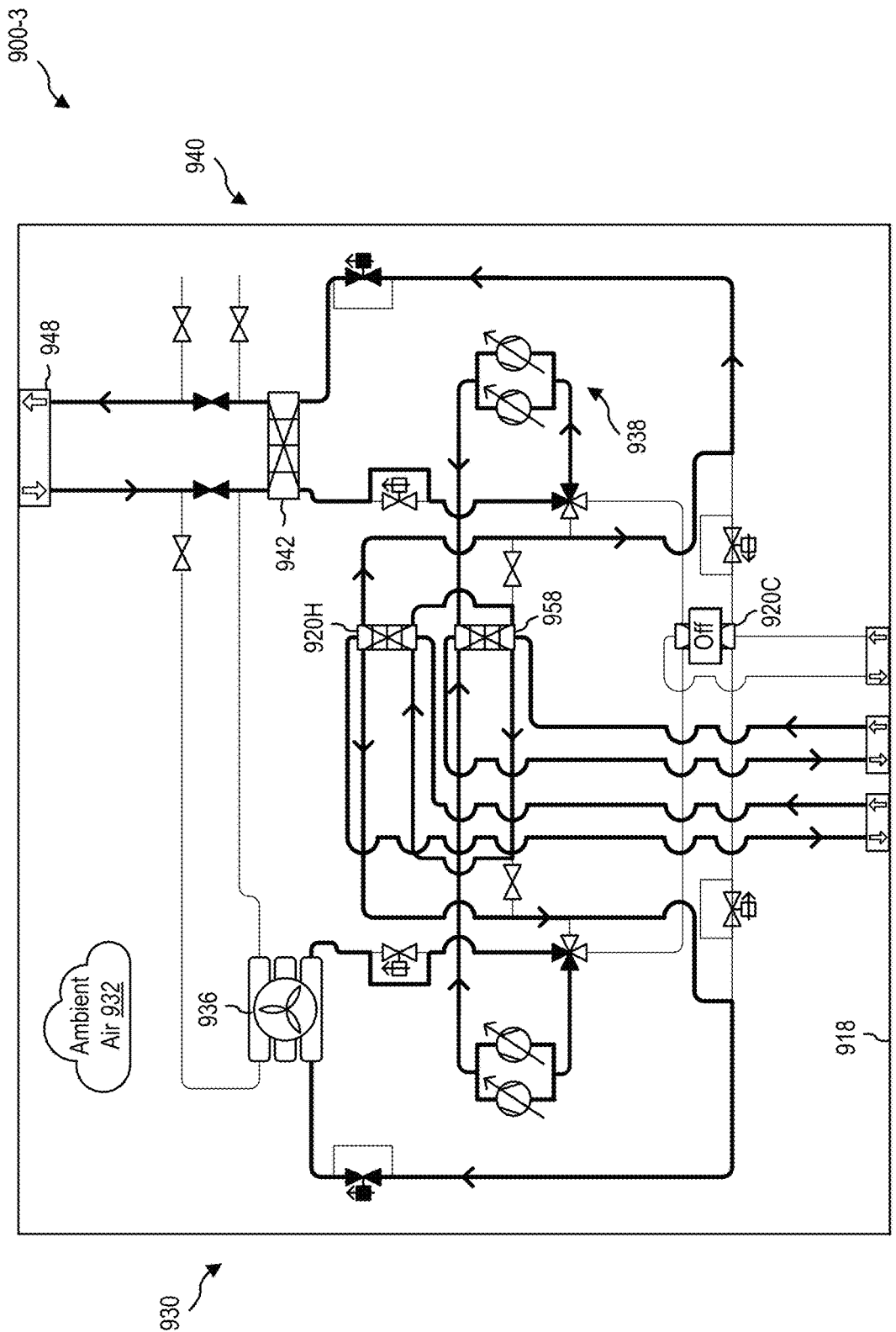
Figures 9, 10, 11, 12:
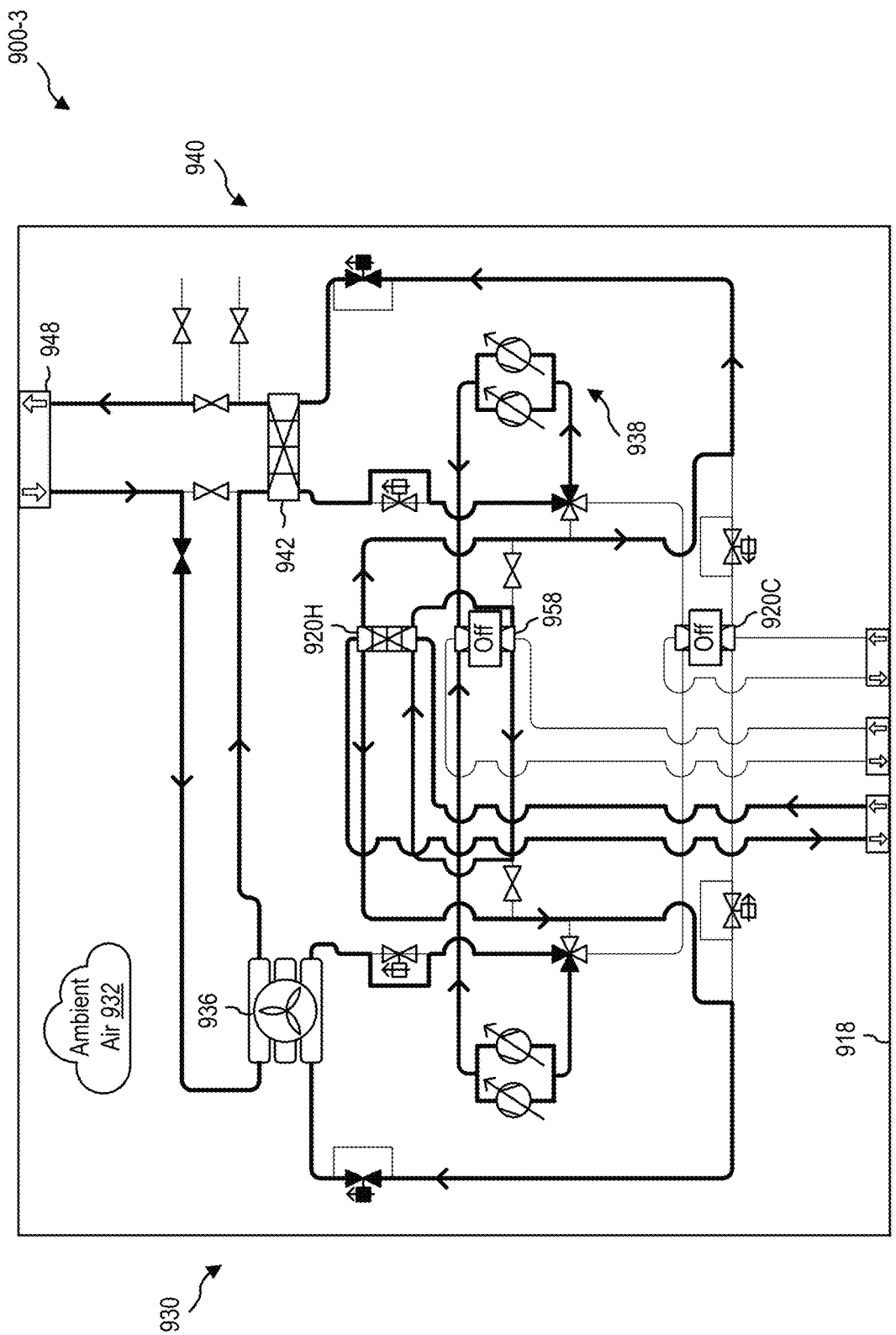
Figures 9, 10, 11, 12, 13:
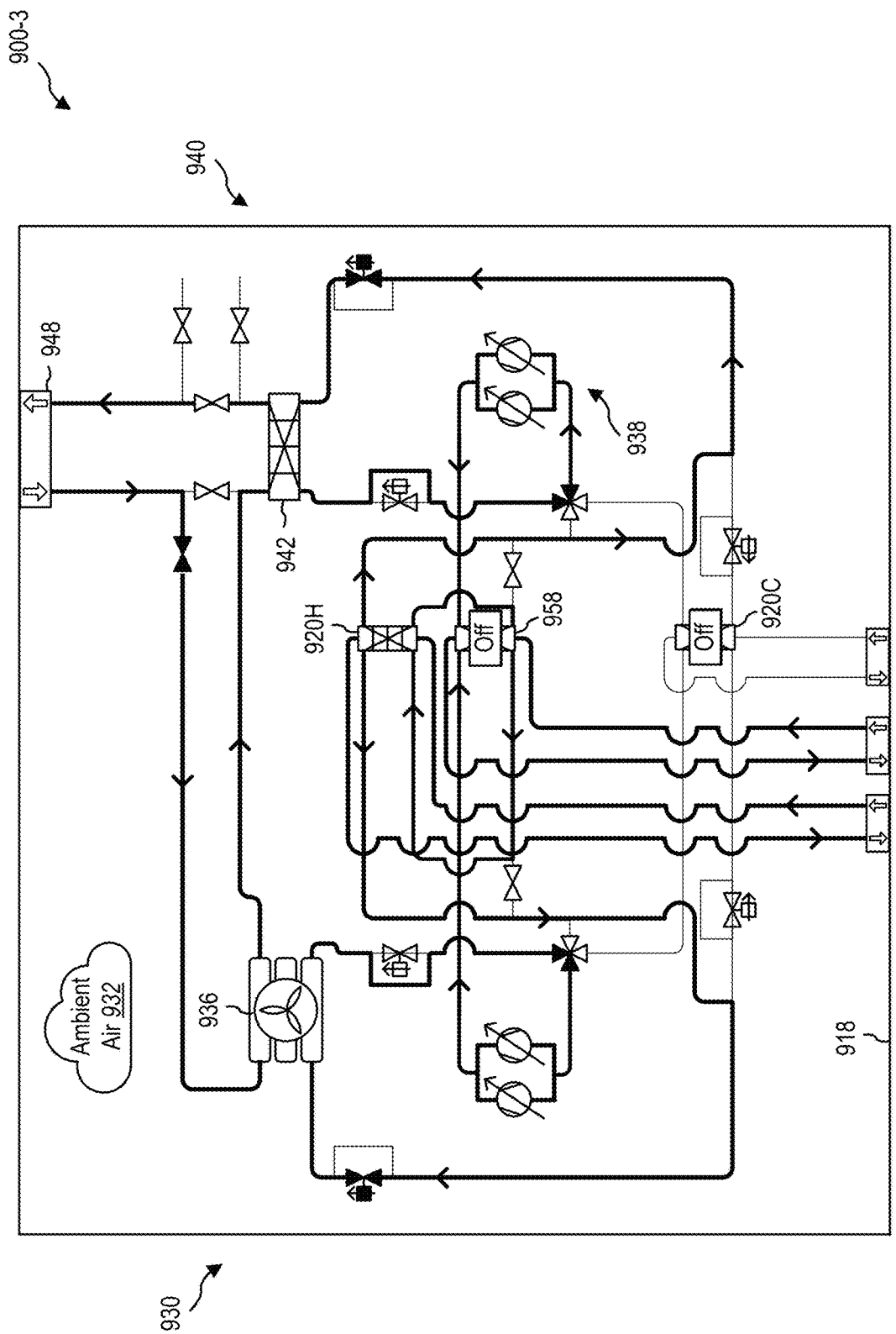
Figures 9, 10, 11, 12, 13, 14:
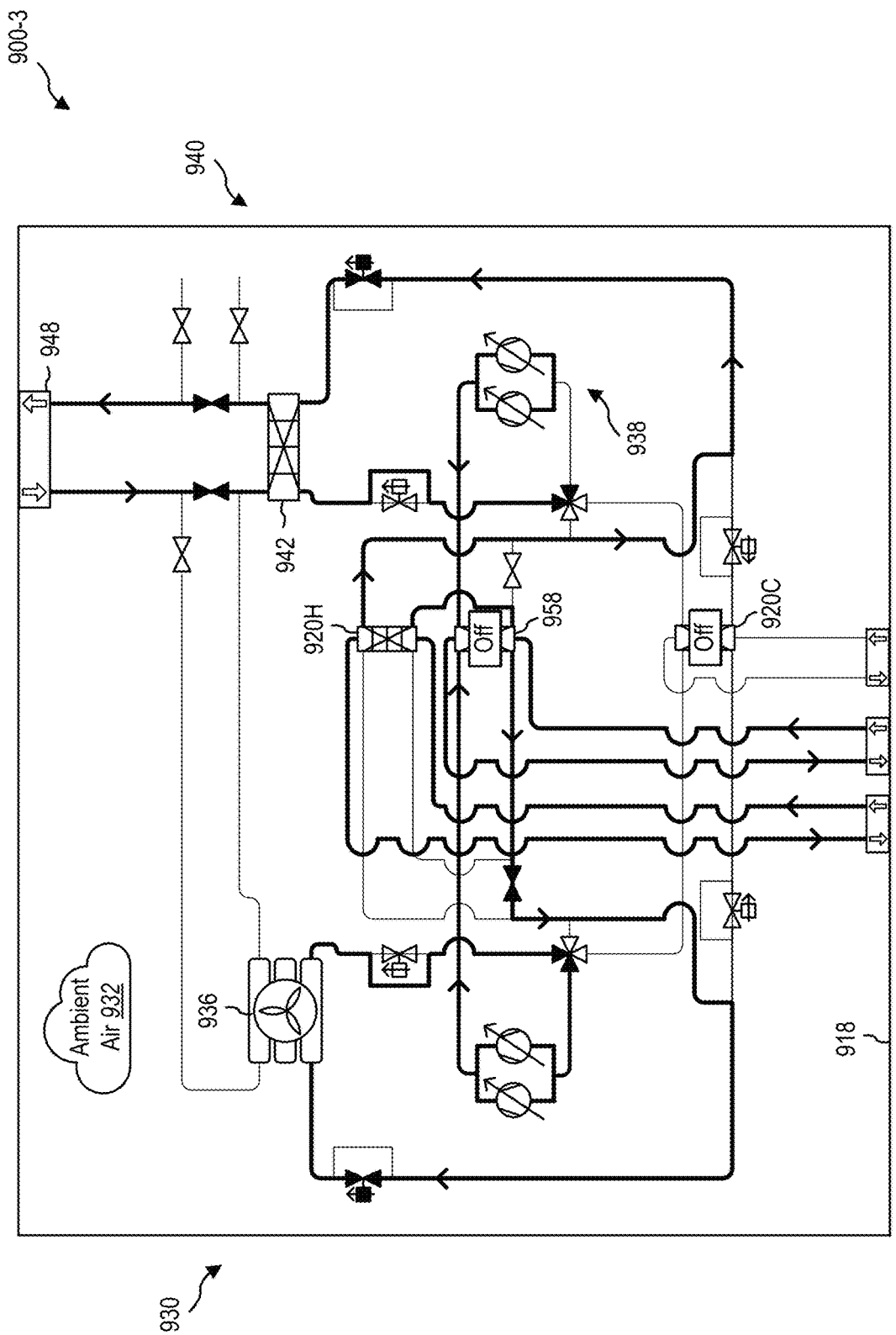
Figures 9, 10, 11, 12, 13, 14, 15:
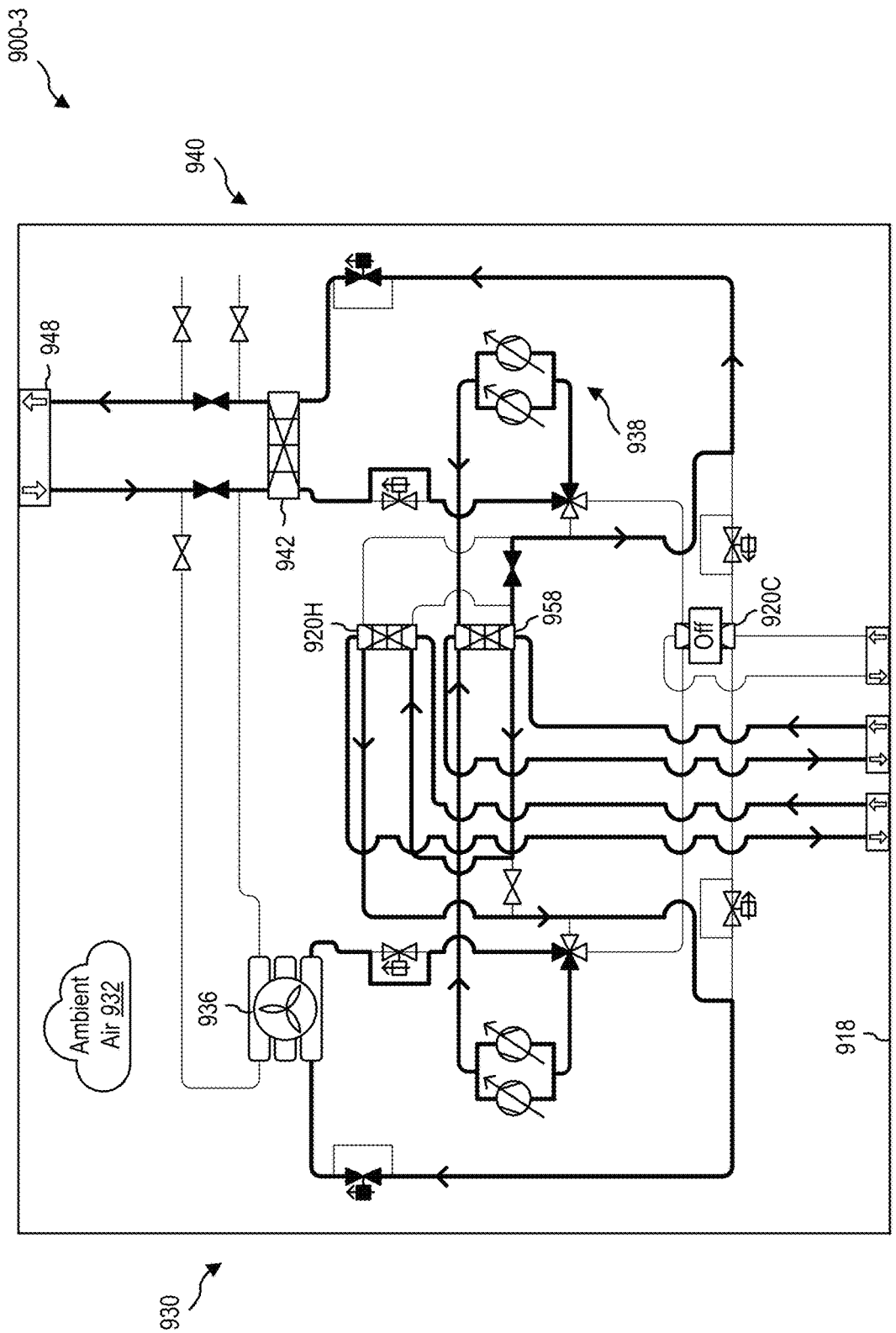
Figures 9, 10, 11, 12, 13, 14, 15, 16:
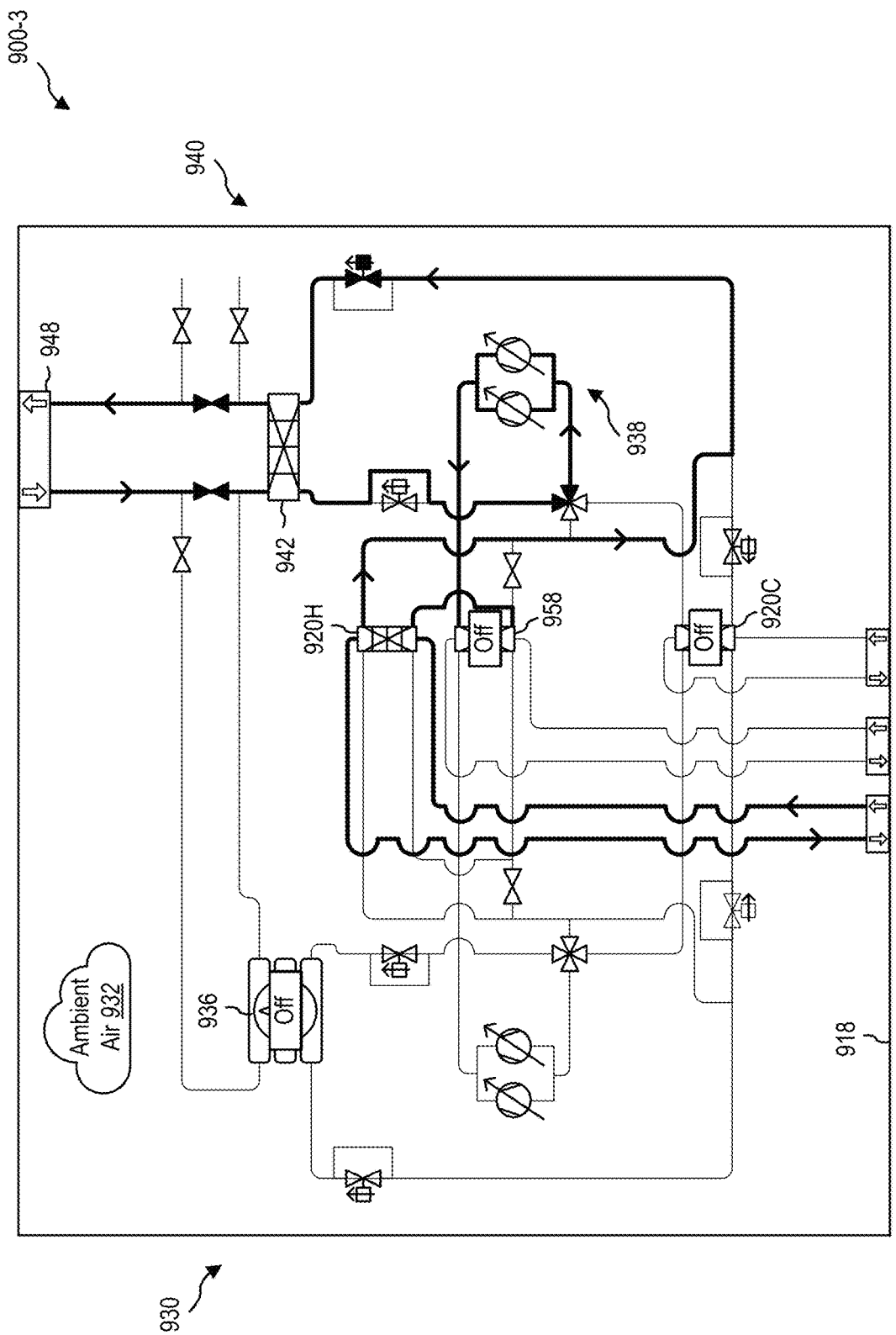
Figures 9, 10, 11, 12, 13, 14, 15, 16, 17:
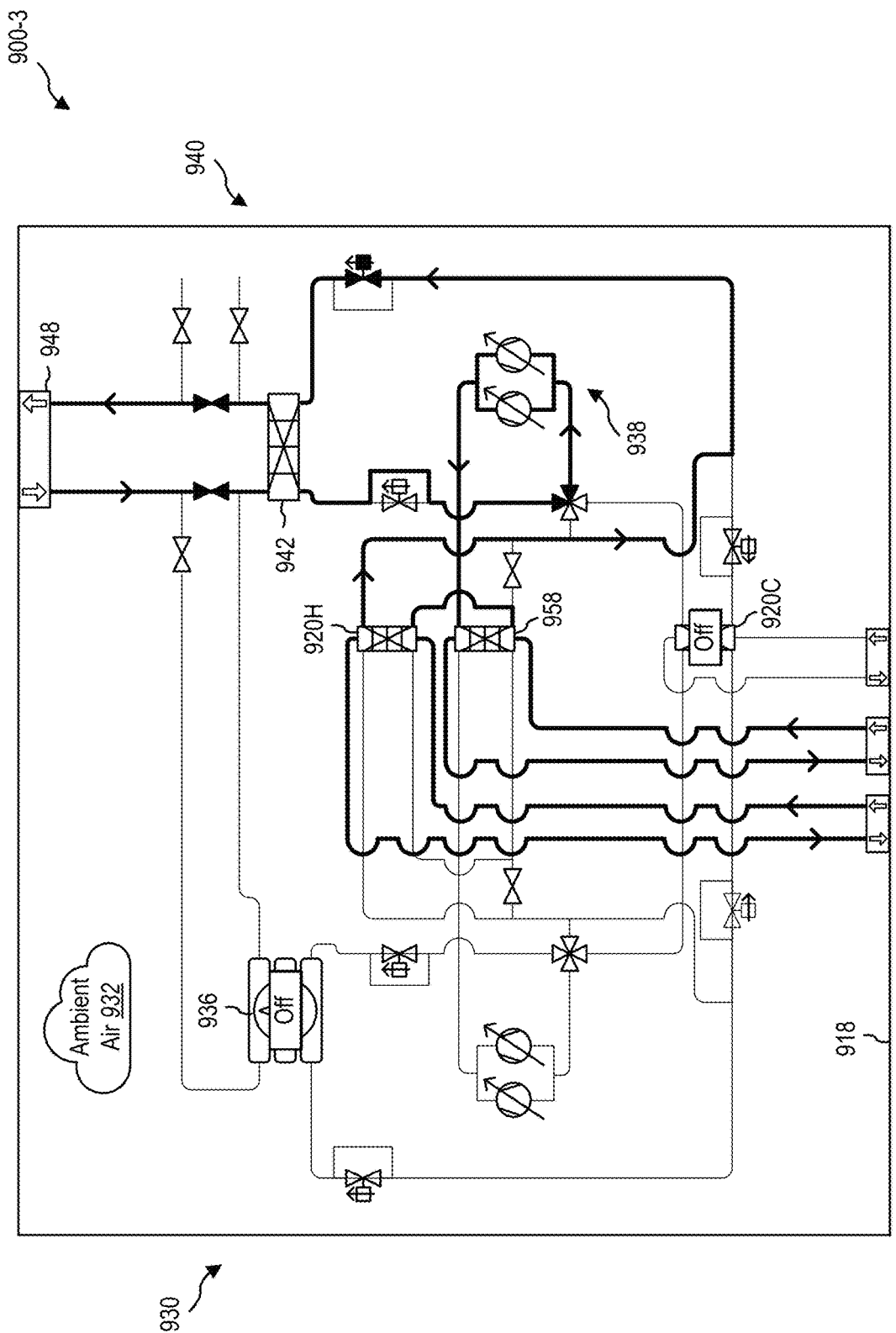
Figures 9, 10, 11, 12, 13, 14, 15, 16, 17, 18:
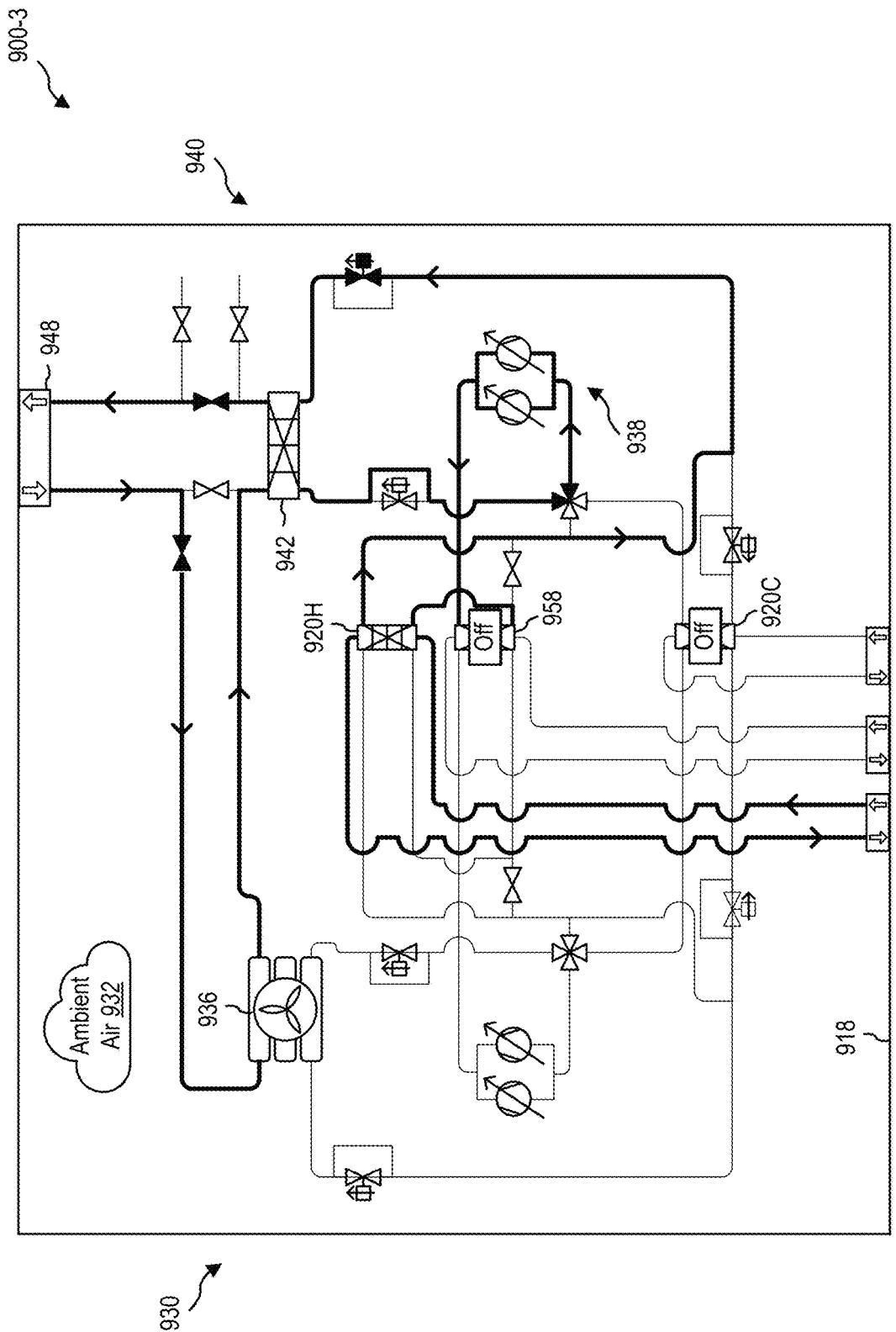
Figures 9, 10, 11, 12, 13, 14, 15, 16, 17, 18, 19:
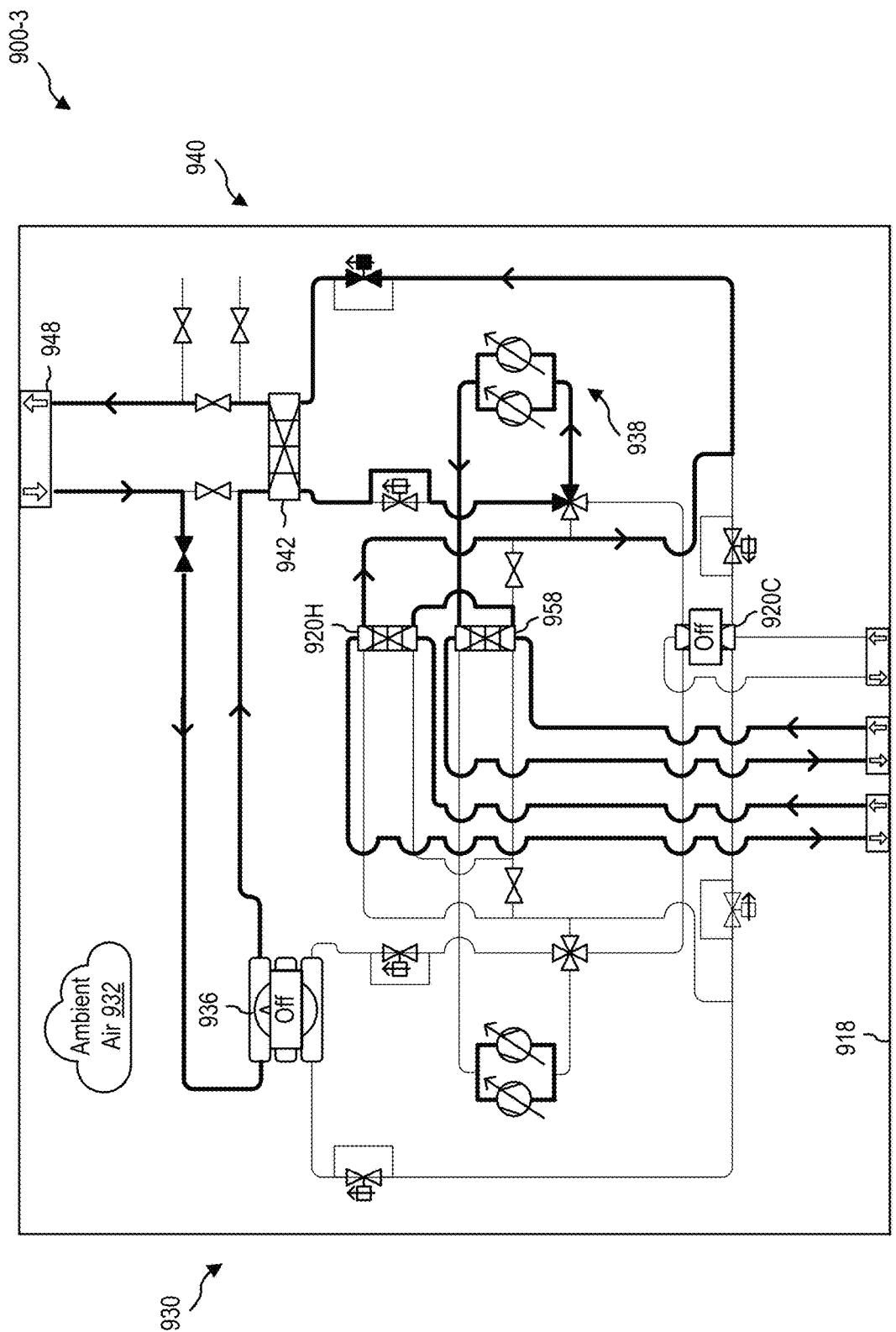
Figures 9, 10, 11, 12, 13, 14, 15, 16, 17, 18, 19, 20:
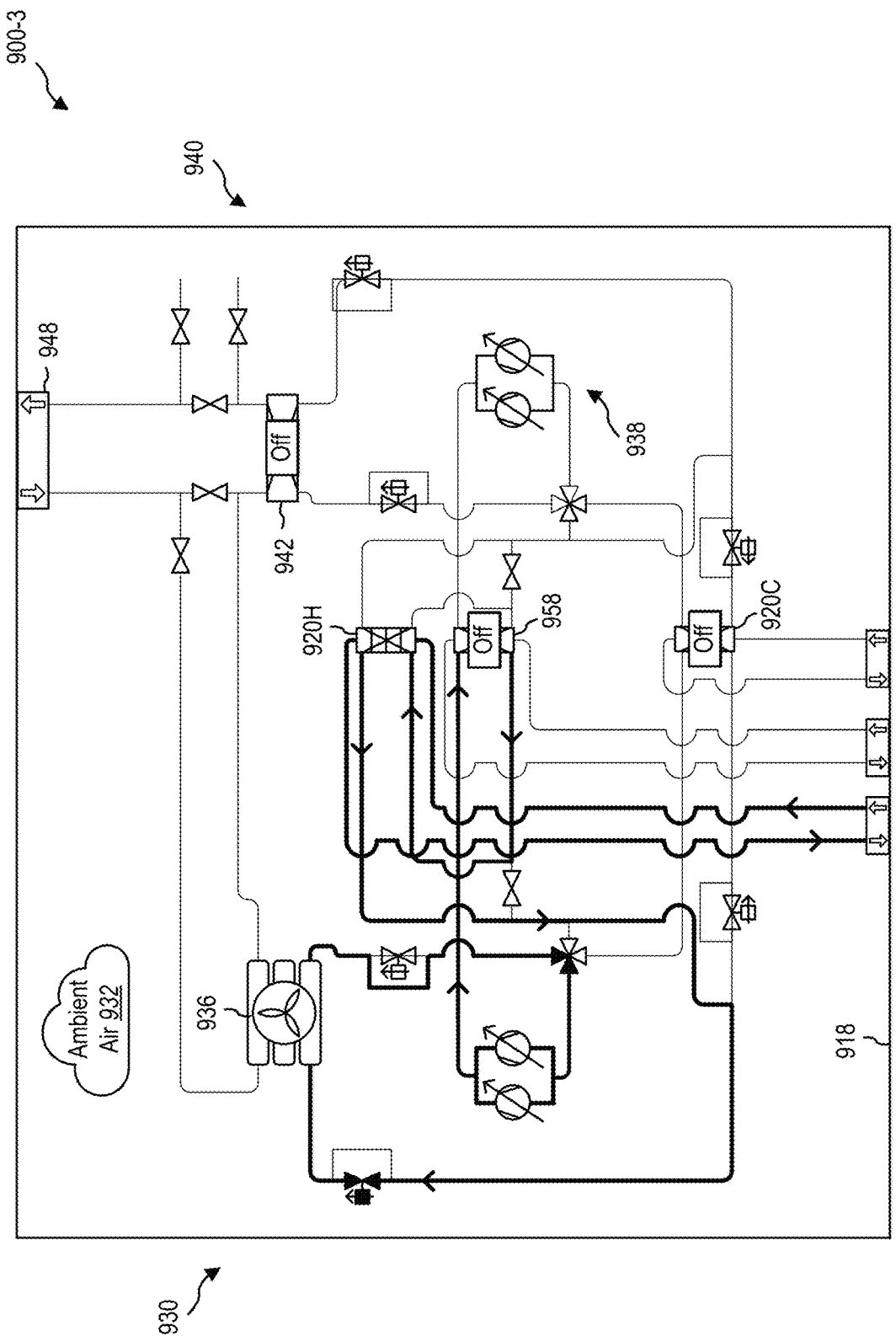
Figures 9, 10, 11, 12, 13, 14, 15, 16, 17, 18, 19, 20, 21:
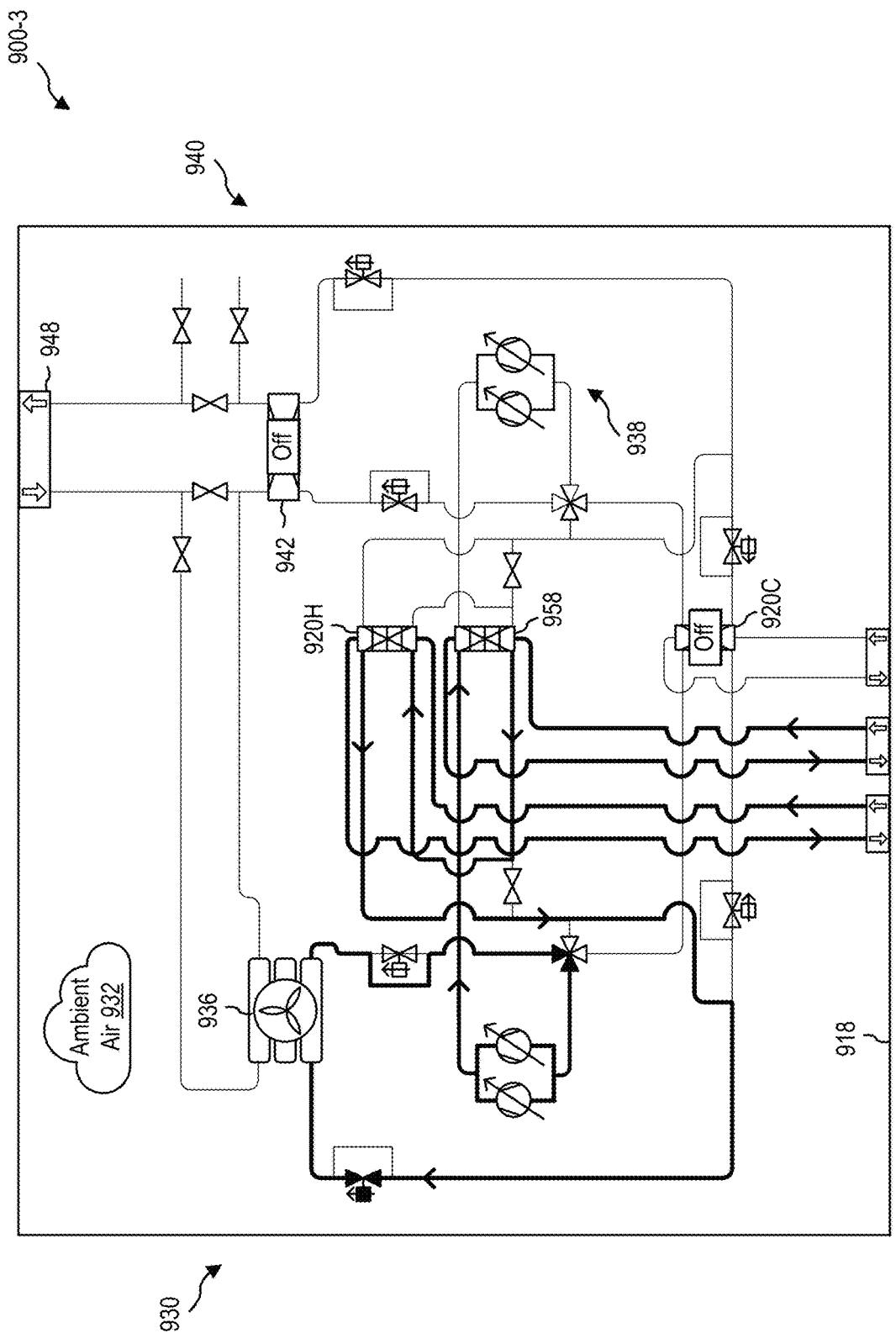
Figures 9, 10, 11, 12, 13, 14, 15, 16, 17, 18, 19, 20, 21, 22:
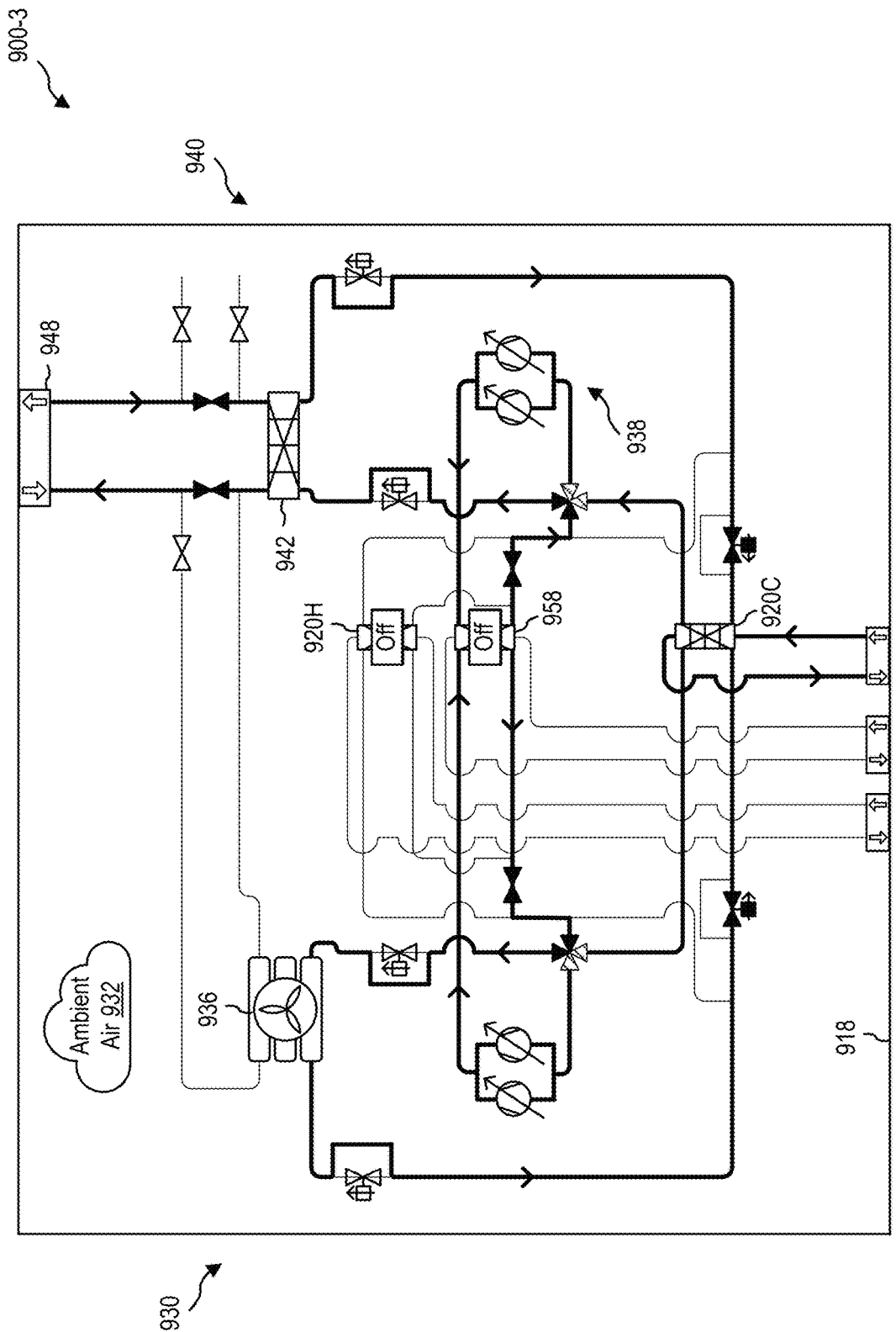
Figures 9, 10, 11, 12, 13, 14, 15, 16, 17, 18, 19, 20, 21, 22, 23:
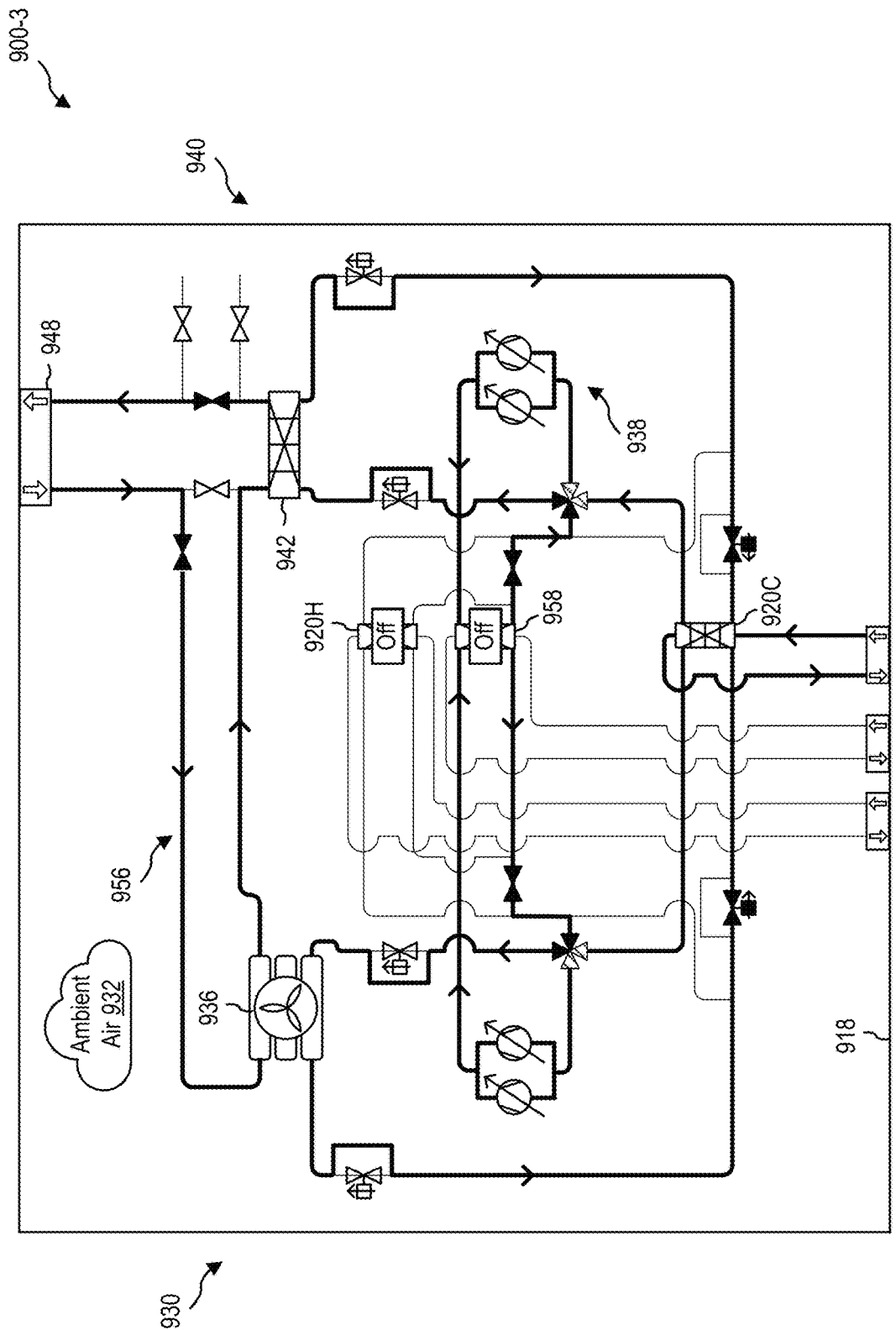
Figures 9, 10, 11, 12, 13, 14, 15, 16, 17, 18, 19, 20, 21, 22, 23, 24:
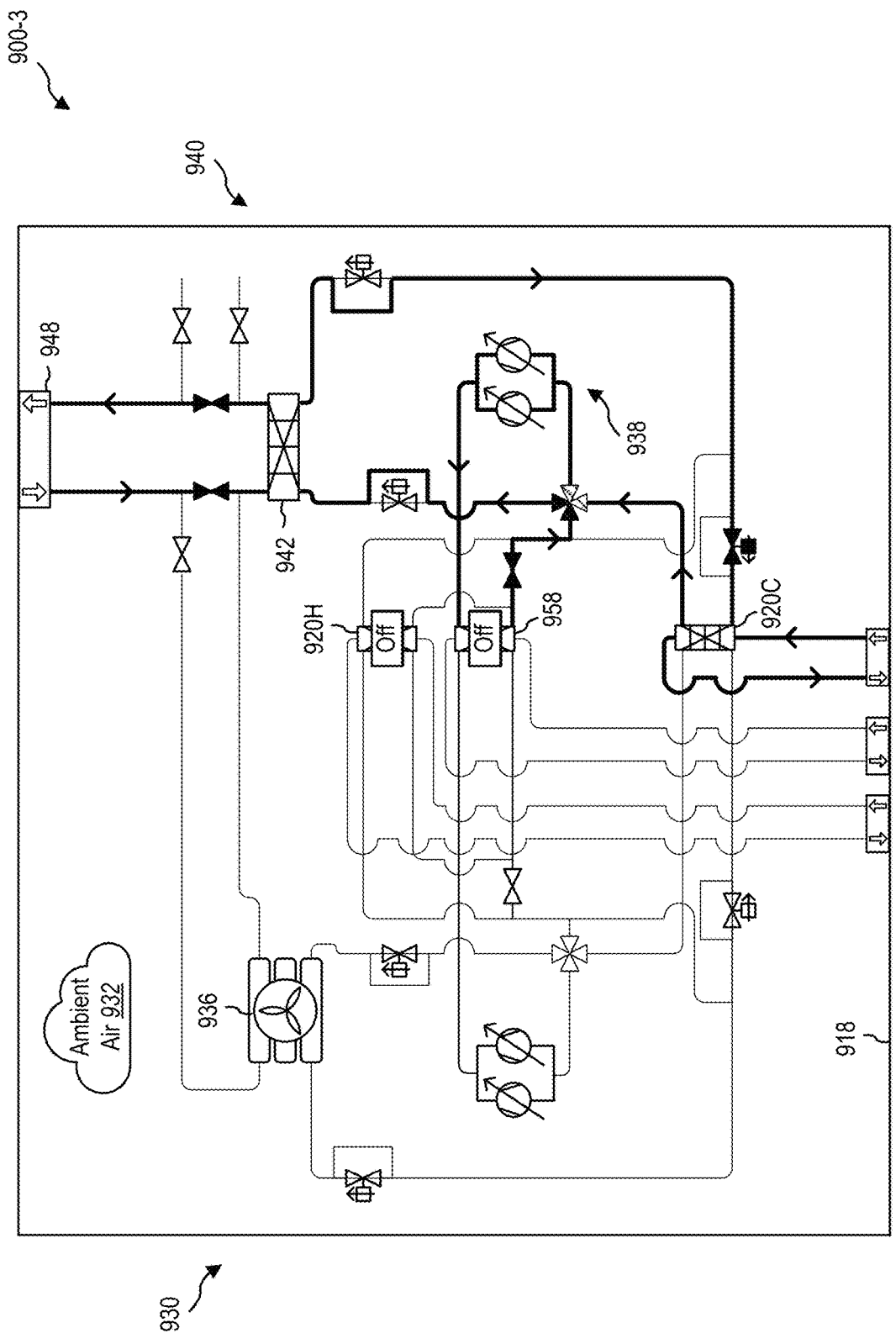
Figures 9, 10, 11, 12, 13, 14, 15, 16, 17, 18, 19, 20, 21, 22, 23, 24, 25:
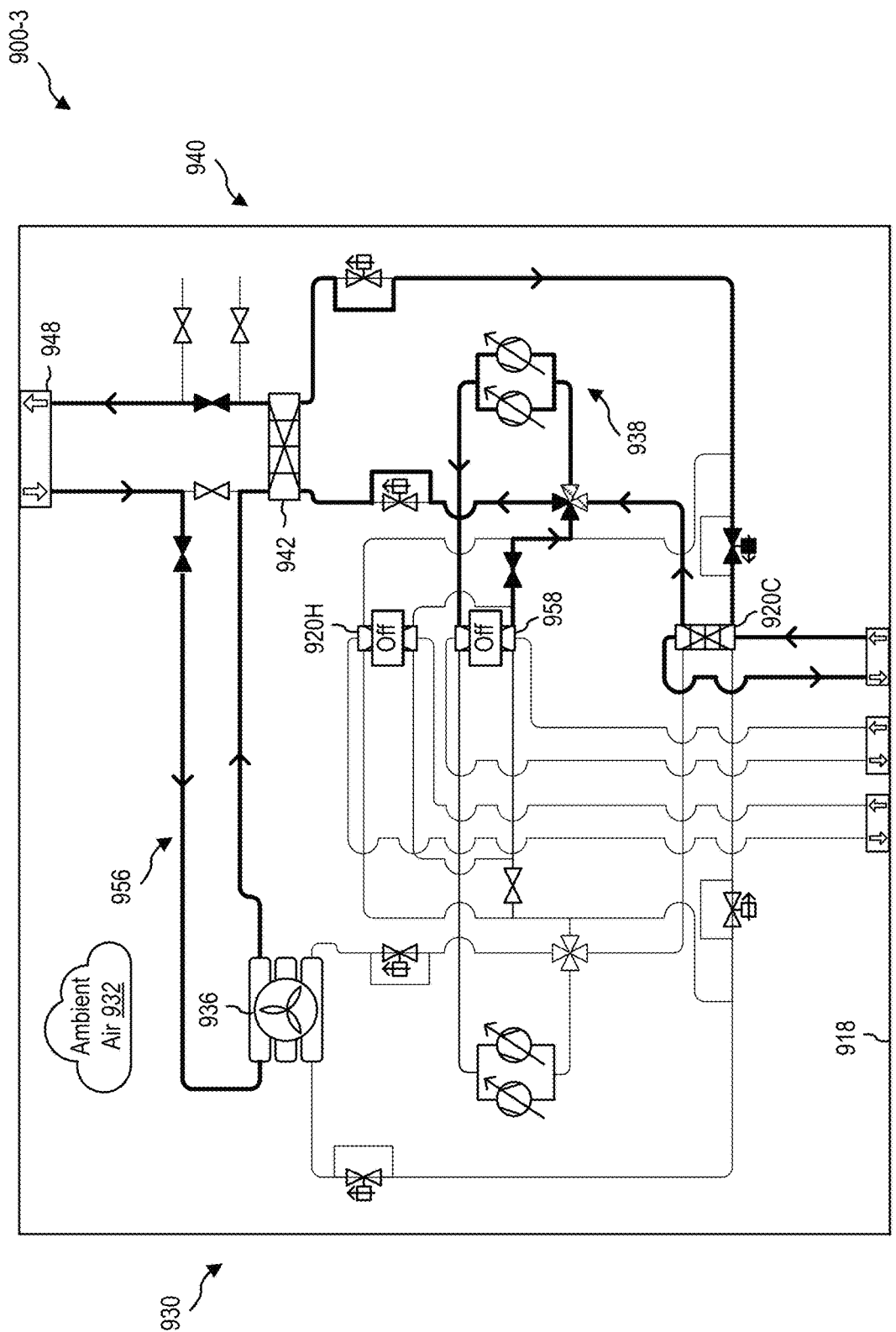
Figures 9, 10, 11, 12, 13, 14, 15, 16, 17, 18, 19, 20, 21, 22, 23, 24, 25, 26:
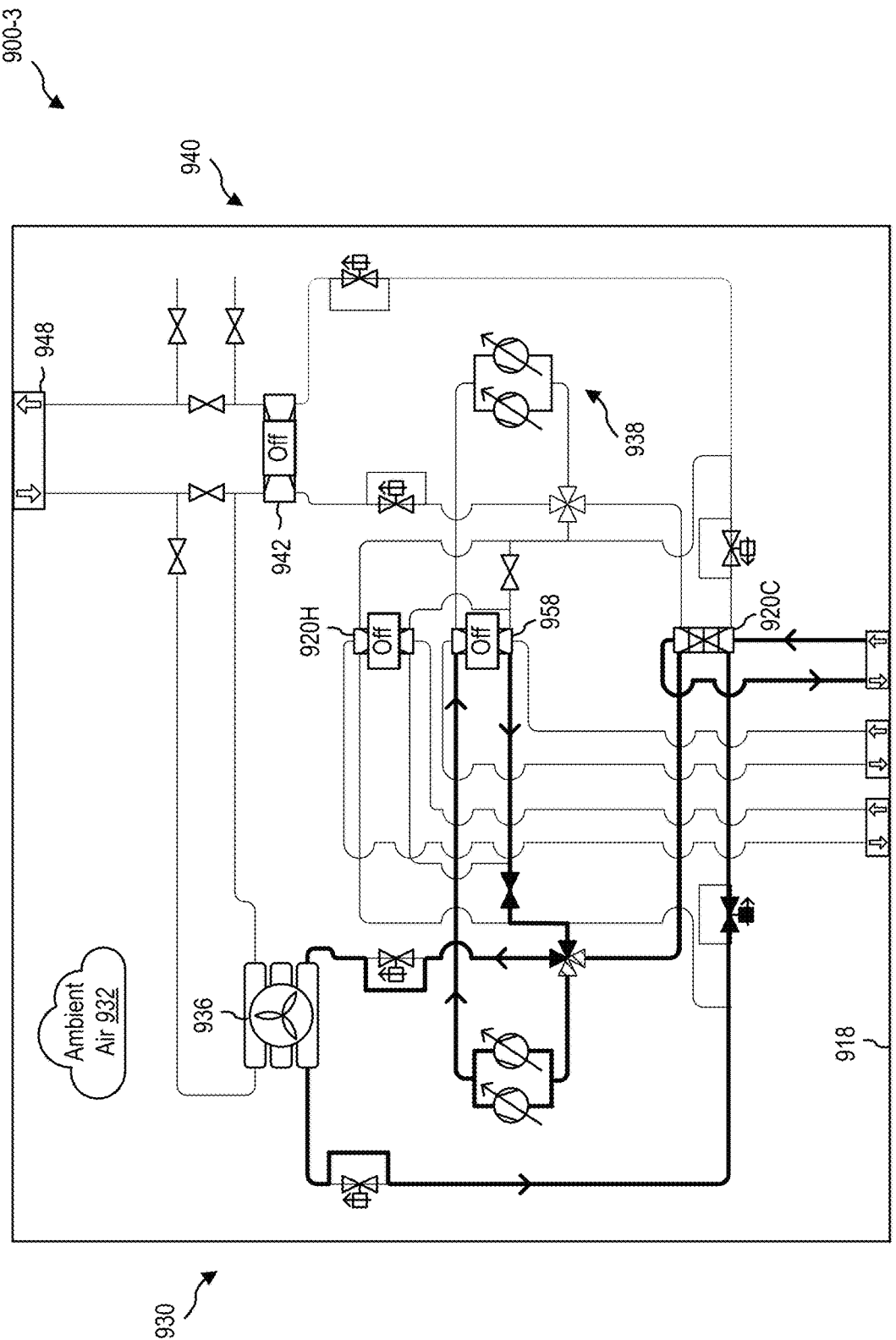
Figures 9, 10, 11, 12, 13, 14, 15, 16, 17, 18, 19, 20, 21, 22, 23, 24, 25, 26, 27:
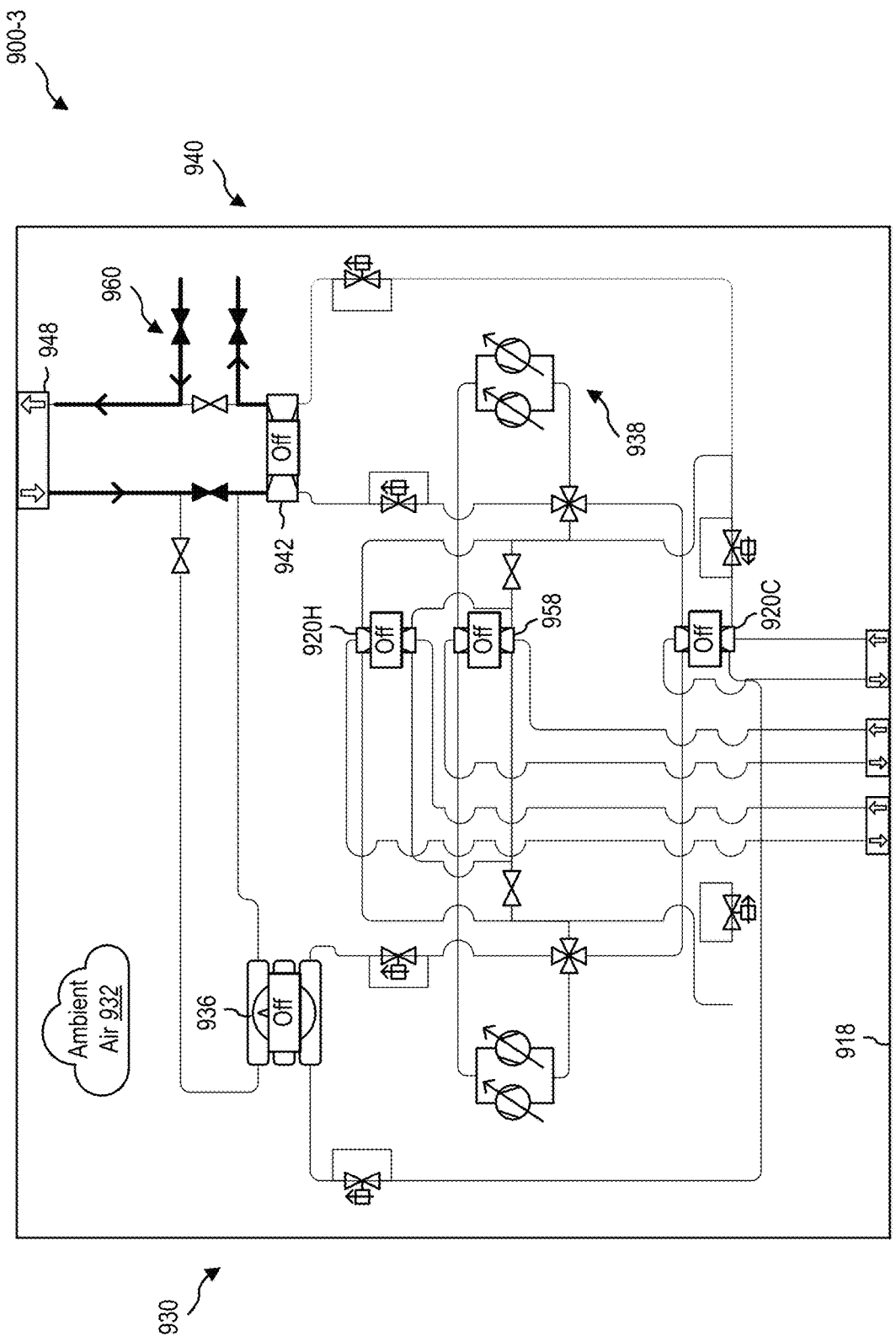
Figures 9, 10, 11, 12, 13, 14, 15, 16, 17, 18, 19, 20, 21, 22, 23, 24, 25, 26, 27, 28:
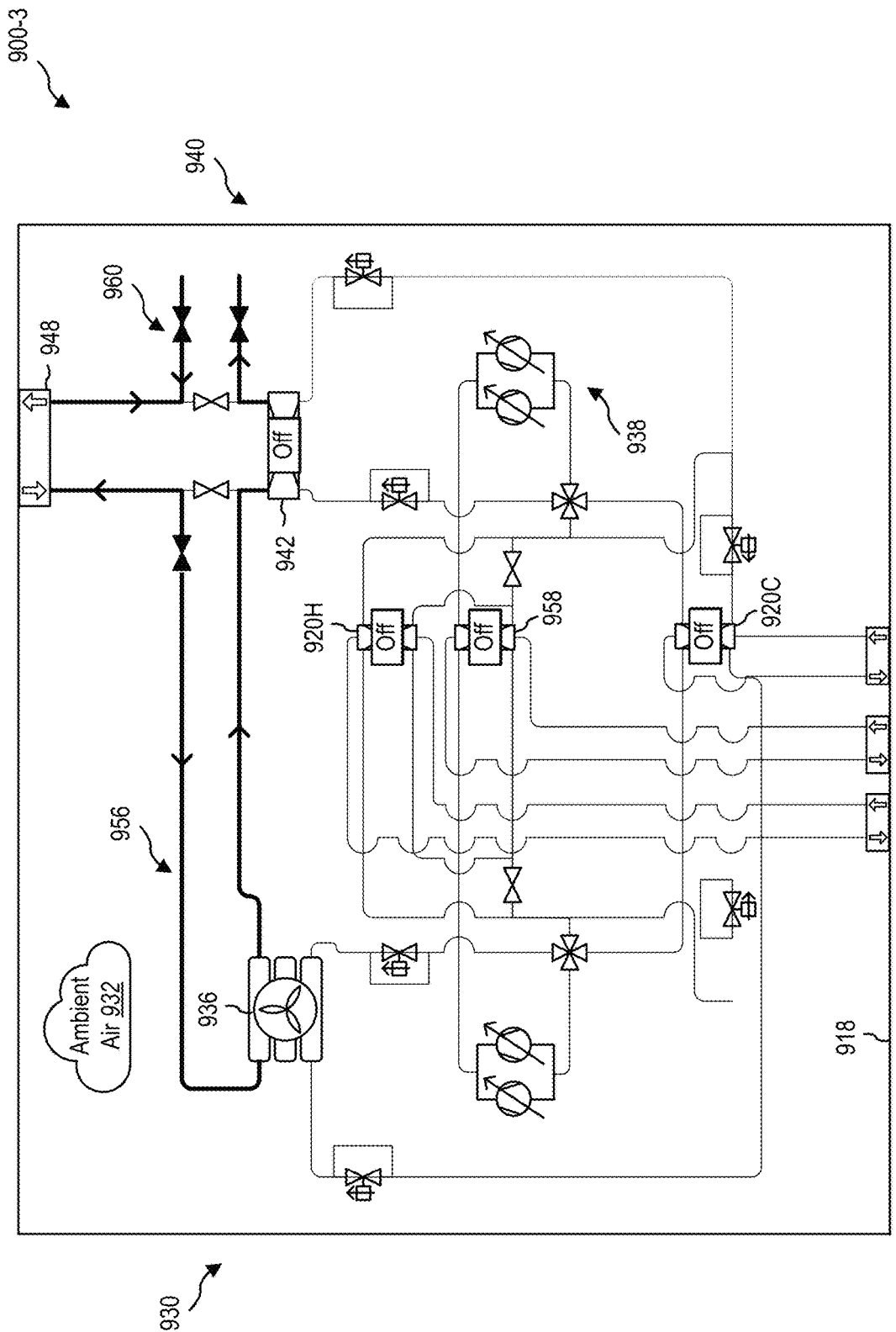
Figures 9, 10, 11, 12, 13, 14, 15, 16, 17, 18, 19, 20, 21, 22, 23, 24, 25, 26, 27, 28, 29:
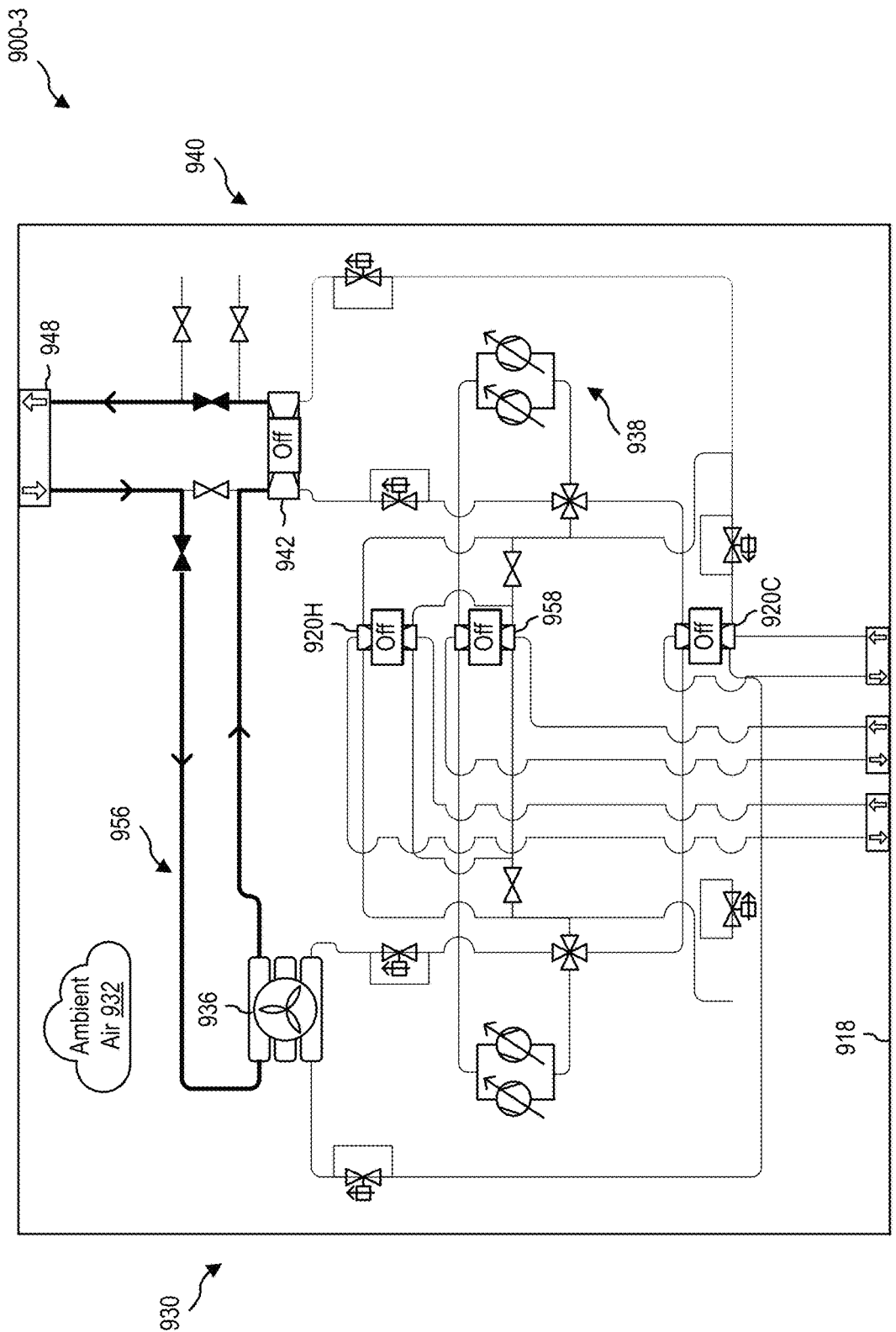
Figure 10:
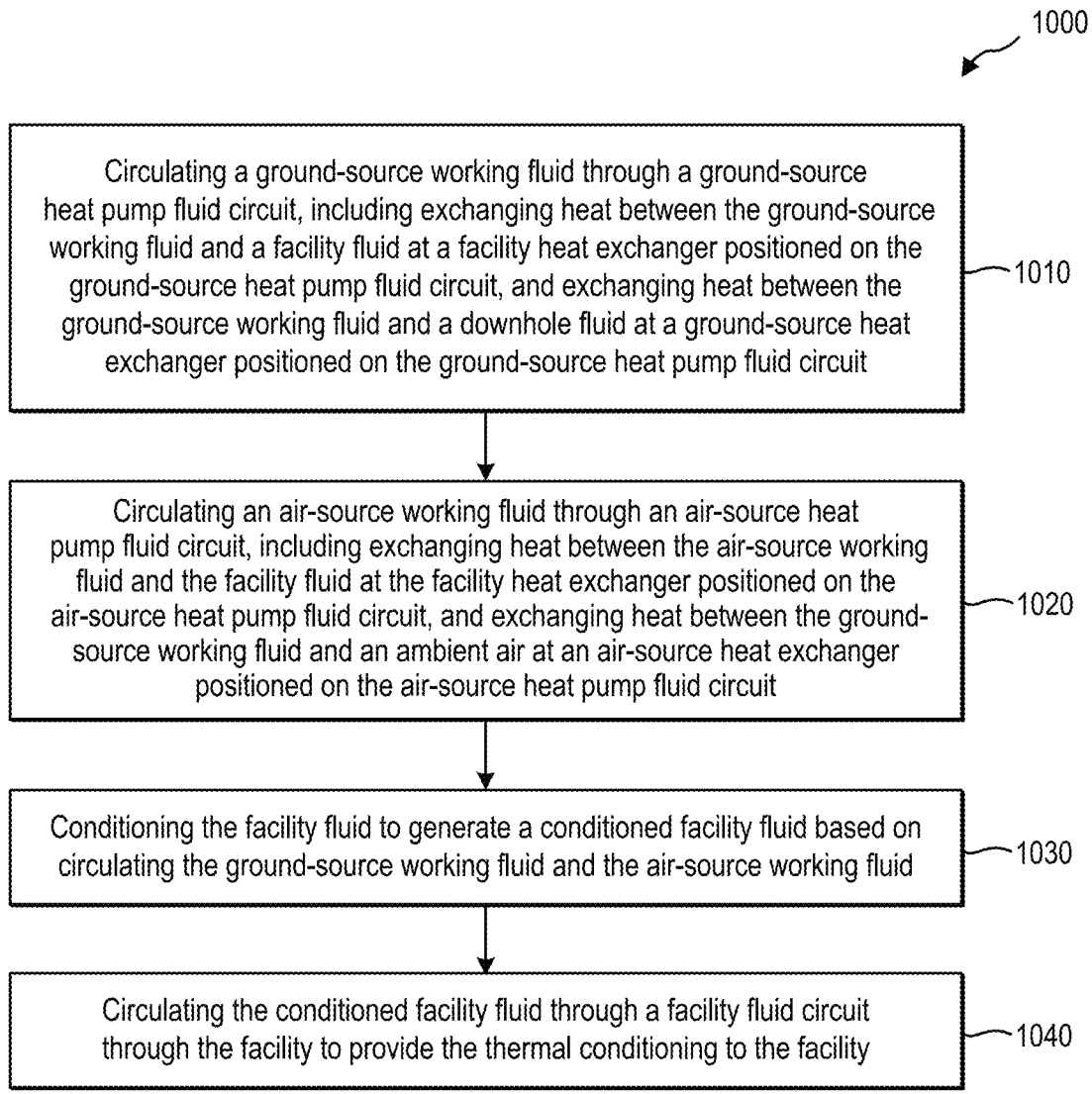

In FIG. 9-10, the thermal system 900-3 may operate to provide heating only to the facility with both the air-source heat exchanger 936 and the ground-source heat exchanger 942. For example, the air-source heat pump 930 may operate to transfer heat from the air-source heat exchanger 936 to the hot facility fluid via the hot facility heat exchanger 920H, and the ground-source heat pump 940 may similarly operate to transfer heat from the ground-source heat exchanger 942 to the hot facility fluid via the hot facility heat exchanger 920H. As shown in FIG. 9-11, a similar configuration can include the hot fluid heat exchanger 958 for providing the hot fluid to the facility. Also, in FIG. 9-12, the recovery fluid circuit 956 may be implemented to transfer heat from the ambient air to the geological formation, for example, when the ambient air temperature is greater than the ground temperature, such as to regulate the temperature of the ground during periods where the thermal system 900-3 extracts significant heat from the ground as described herein. Further, the recovery fluid circuit 956 may be implemented to transfer heat form the geological formation to the ambient air (e.g., when the temperature of the air is less than 0° C. and the temperature of the ground is warmer than the air temperature), in order to defrost the air-source heat exchanger 936. In FIG. 9-13, the thermal system 900-3 may operate similarly in this way in conjunction with providing the hot fluid via the hot fluid heat exchanger 958.

In FIG. 9-14, the thermal system 900-3 is operated to provide heating to the hot facility fluid via the hot facility heat exchanger 920H based on the ground-source heat exchanger 942 and to provide heating of the hot fluid via the hot fluid heat exchanger 958 based on the air-source heat exchanger 936. In FIG. 9-15, the thermal system 900-3 may be configured to provide heating to the hot facility fluid via the hot facility heat exchanger 920H based on the air-source heat exchanger 936 and to provide heating of the hot fluid via the hot fluid heat exchanger 958 based on the ground-source heat exchanger 942 and on the air source heat exchanger 936. This configuration may be provided when need for hot water is much higher than need for building heating.

In FIG. 9-16, the thermal system 900-3 is operated to provide heating only to the hot facility fluid via the hot facility heat exchanger 920H based on the ground-source heat exchanger 942. Additionally, in FIG. 9-17, heating can be provided to the hot fluid via the hot fluid heat exchanger 958 based on the ground-source heat exchanger 942 as well. Also, in FIG. 9-18, the recovery fluid circuit 956 may be implemented to transfer heat from the ambient air to the geological formation, for example, when the ambient air temperature is greater than the ground temperature, such as to regulate the temperature of the ground during periods where the thermal system 900-3 extracts significant heat from the ground as described herein. In FIG. 9-19, the thermal system 900-3 may operate similarly in this way in conjunction with providing the hot fluid via the hot fluid heat exchanger 958.

In FIG. 9-20, the thermal system 900-3 is operated to provide heating only to the hot facility fluid via the hot facility heat exchanger 920H based on the air-source heat exchanger 936. Additionally, in FIG. 9-21, heating can be provided to the hot fluid via the hot fluid heat exchanger 958 based on the air-source heat exchanger 936 as well.

In FIG. 9-22, the thermal system 900-3 is operated to provide cooling only to the cold facility fluid via the cold facility heat exchanger 920C based on the air-source heat pump 930 implementing the air-source heat exchanger 936 and the ground-source heat pump 940 implementing the ground-source heat exchanger 942. Also, in FIG. 9-23, the recovery fluid circuit 956 may be implemented to transfer heat from the geological formation to the ambient air, for example, when the ambient air temperature is lower than the ground temperature, such as to regulate the temperature of the ground during periods where the thermal system 900-3 injects significant heat to the ground as described herein.

In FIG. 9-24, the thermal system 900-3 is operated to provide cooling only to the cold facility fluid via the cold facility heat exchanger 920C based on the ground-source heat pump 940 implementing the ground-source heat exchanger 942. Also, in FIG. 9-25, the recovery fluid circuit 956 may be implemented to transfer heat from the geological formation to the ambient air, for example, when the ambient air temperature is lower than the ground temperature, such as to regulate the temperature of the ground during periods where the thermal system 900-3 injects significant heat to the ground as described herein.

In FIG. 9-26, the thermal system 900-3 is operated to provide cooling only to the cold facility fluid via the cold facility heat exchanger 920C based on the air-source heat pump 930 implementing the air-source heat exchanger 936.

In FIG. 9-27, the thermal system 900-2 may be operated to provide only cooling via the cold fluid circuit 960 with the downhole fluid. Also, in FIG. 9-28, the recovery fluid circuit 956 may be incorporated to provide cooling via the cold fluid circuit 960 based on rejecting heat to both the ambient air and the geological formation. Either of these configurations may be in connection with one or more other modes or configurations described herein, or may be independent, such as when the thermal system 900-3 is not operated to provide any heating, cooling, or hot fluid to the facility as described herein.

In FIG. 9-29, the thermal system 900-3 is operated to transfer heat to the geological formation from the ambient air or to the ambient air from the geological formation via the air-source heat exchanger 936. In some embodiments, this mode may be operated when no other thermal needs are being provided to the facility. For example, it may be advantageous to warm up the ground temperatures by leveraging the relatively warmer ambient air temperature (e.g., warmer than the ground) to recharge the thermal battery of the geological formation. In other examples, heat may be transferred from the geological formation to the ambient air to defrost the air-source heat pump 936 as described herein.

In this way, the thermal system 900-3 may be configured and/or operated in a variety of different operating modes to accomplish various objective as described herein and for meeting various thermal loads of the facility. The thermal system 900-3 may be operated in any other mode (e.g., not described herein) that is consistent with the techniques discussed above.

FIG. 10 illustrates a flow diagram for a method 1000 or a series of acts for providing thermal conditioning of a facility as described herein, according to at least one embodiment of the present disclosure. While FIG. 10 illustrates acts according to one embodiment, alternative embodiments may add to, omit, reorder, or modify any of the acts of FIG. 10.

In some embodiments, the method 1000 includes an act 1010 of circulating a ground-source working fluid through a ground-source heat pump fluid circuit, including exchanging heat between the ground-source working fluid and a facility fluid at a facility heat exchanger positioned on the ground-source heat pump fluid circuit, and exchanging heat between the ground-source working fluid and a downhole fluid at a ground-source heat exchanger positioned on the ground-source heat pump fluid circuit In some embodiments, the method 1000 includes an act 1020 of circulating an air-source working fluid through an air-source heat pump fluid circuit, including exchanging heat between the air-source working fluid and the facility fluid at the facility heat exchanger positioned on the air-source heat pump fluid circuit, and exchanging heat between the ground-source working fluid and an ambient air at an air-source heat exchanger positioned on the air-source heat pump fluid circuit.

In some embodiments, the method 1000 includes an act 1030 of conditioning the facility fluid to generate a conditioned facility fluid based on circulating the ground-source working fluid and the air-source working fluid.

In some embodiments, the method 1000 includes an act 1040 of circulating the conditioned facility fluid through a facility fluid circuit through the facility to provide the thermal conditioning to the facility.

In some embodiments, the facility fluid is a liquid. In some embodiments, the facility fluid is air.

In some embodiments, the method 1000 further includes circulating the ground-source working fluid through the ground-source heat pump fluid circuit independent of and in parallel with circulating the air-source working fluid through the air-source heat pump fluid circuit to generate the conditioned facility fluid.

In some embodiments, wherein conditioning the facility fluid circuit includes providing heating to the facility fluid from the ground-source working fluid and from the air-source working fluid, or providing cooling to the facility fluid from the ground-source working fluid and from the air-source working fluid.

In some embodiments, the method 1000 further includes, with a recovery heat exchanger positioned on the facility fluid circuit, exchanging heat between an inlet flow of the facility fluid and an exhaust flow of the facility fluid.

In some embodiments, the method 1000 further includes, with a supply heat exchanger positioned on the facility fluid circuit, exchanging heat between the downhole fluid and a supply flow of the facility fluid.

In some embodiments, the method 1000 further includes, with an exhaust heat exchanger positioned on the facility fluid circuit, exchanging heat between the downhole fluid and an exhaust flow of the facility fluid.

In some embodiments, the method 1000 further includes, with a hot fluid heat exchanger positioned on one or more of the ground-source heat pump fluid circuit or the air-source heat pump fluid circuit, transferring heat to a hot facility fluid from one or more of the ground-source working fluid or the air-source working fluid.

In some embodiments, the method 1000 further includes, with a cold fluid heat exchanger connected to a downhole fluid circuit of the downhole fluid, transferring heat from a cold facility fluid to the downhole fluid.

In some embodiments, the method 1000 further includes, with a secondary facility heat exchanger connected to one or more of the ground-source heat pump fluid circuit or the air-source heat pump fluid circuit, exchanging heat between a secondary facility fluid and one or more of the ground-source working fluid or the air-source working fluid.

INDUSTRIAL APPLICABILITY

The following description from section A1 to section I18 includes various embodiments that, where feasible, may be combined in any permutation. For example, the embodiment of section A1 may be combined with any or all embodiments of the following sections. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

A1. A thermal system for a facility, comprising:
  a facility fluid circuit, including:
    a facility fluid for circulating in the facility to provide thermal conditioning of the facility; and
    a facility heat exchanger for exchanging heat with the facility fluid;
  a ground-source heat pump thermally connected to the facility fluid circuit, including:
    a ground-source heat pump fluid circuit;
    a ground-source heat exchanger positioned on the ground-source heat pump fluid circuit and configured to exchange heat with a downhole fluid;
    the facility heat exchanger positioned on the ground-source heat pump fluid circuit; and
    a ground-source working fluid for circulating through the ground-source heat pump fluid circuit to exchange heat with the facility fluid at the facility heat exchanger, and to exchange heat with the downhole fluid of a downhole fluid circuit at the ground-source heat exchanger; and an air-source heat pump thermally connected to the facility fluid circuit, including:
  an air-source heat pump fluid circuit;
  an air-source heat exchanger positioned on the air-source heat pump fluid circuit and configured to exchange heat with an ambient air;
  the facility heat exchanger positioned on the air-source heat pump fluid circuit; and
  an air-source working fluid for circulating through the air-source heat pump fluid circuit to exchange heat with the facility fluid at the facility heat exchanger, and to exchange heat with the ambient air at the air-source heat exchanger.

A2. The thermal system of A1, further comprising the downhole fluid circuit, including:
  a heat exchanger configured to exchange heat with a geological formation;
  the ground-source heat exchanger; and
  the downhole fluid for circulating through the downhole fluid circuit to exchange heat with the ground-source working fluid at the ground-source heat exchanger and to exchange heat with the geological formation at the heat exchanger.

A3. The thermal system of A1 or A2, wherein the ambient air includes at least some exhaust air exhausted from the facility such that the air-source heat exchanger is configured to exchange heat with the at least some exhaust air.

A4 The thermal system of any of A1-A3, wherein the ground-source heat pump and the air-source heat pump each includes one or more compressors and one or more expansion valves for exchanging heat based on performing mechanical work on the ground-source working fluid and the air-source working fluid.

A5. The thermal system of A4, wherein the ground-source heat pump and the air-source heat pump are each reversible heat pumps for transferring heat to and from the facility fluid.

A6. The thermal system of any of A1-A5, further comprising:
  one or more fluid distribution devices included on the air-source heat pump fluid circuit for directing the air-source working fluid between the air-source heat exchanger and the facility heat exchanger;
  one or more fluid distribution devices included on the ground-source heat pump fluid circuit for directing the ground-source working fluid between the ground-source heat exchanger and the facility heat exchanger; and
  a controller for controlling an operation of the thermal system based on controlling the one or more fluid distribution devices of the air-source heat pump fluid circuit and of the ground-source heat pump fluid circuit.

A7. The thermal system of any of A1-A6, wherein the facility fluid is air for circulating through the facility to provide the thermal conditioning.

A8. The thermal system of any of A1-A7, wherein the facility fluid is a liquid for circulating through the facility to provide the thermal conditioning.

A9. The thermal system of any of A1-A8, wherein the ground-source heat pump fluid circuit and the air-source heat pump fluid circuit are independent and are connected to the facility fluid circuit in parallel.

A10. The thermal system of any of A1-A9, wherein the thermal system is configured to operate in a dual heating mode to provide heating to the facility with the ground-source heat pump and the air-source heat pump through the facility heat exchanger.

A11. The thermal system of any of A1-A10, wherein the thermal system is configured to operate in a dual cooling mode to provide cooling to the facility with the ground-source heat pump and the air-source heat pump through the facility heat exchanger.

A12. The thermal system of any of A1-A11, further comprising an inlet for providing at least some of the facility fluid through the inlet as an inlet flow of the facility fluid, and an outlet for exhausting at least some of the facility fluid through the outlet as an exhaust flow of the facility fluid, and further comprising a recovery heat exchanger for exchanging heat between the inlet flow and the exhaust flow.

A13. The thermal system of any of A1-A12, further comprising a supply heat exchanger connected to the downhole fluid circuit and configured, via one or more fluid distribution devices, to exchange heat between the downhole fluid and a supply flow of the facility fluid.

A14. The thermal system of any of A1-A13, wherein the supply heat exchanger is positioned on the facility fluid circuit upstream of the facility heat exchanger to precondition the supply flow of the facility fluid before flowing through the facility heat exchanger.

A15. The thermal system of any of A1-A14, further comprising an exhaust heat exchanger connected to the downhole fluid circuit and configured, via one or more fluid distribution devices, to exchange heat between the downhole fluid and an exhaust flow of the facility fluid.

A16. The thermal system of any of A1-A15, further comprising a hot fluid heat exchanger connected to one or more of the ground-source heat pump fluid circuit or the air-source heat pump fluid circuit and configured, via one or more fluid distribution devices, to transfer heat to a hot facility fluid from one or more of the ground-source working fluid or the air-source working fluid.

A17. The thermal system of A16, wherein the hot fluid heat exchanger is positioned directly downstream from one or more compressors of the ground-source heat pump, directly downstream from one or more compressors of the air-source heat pump, or both.

A18. The thermal system of any of A1-A17, further comprising a cold fluid heat exchanger connected to the downhole fluid circuit and configured, via one or more fluid distribution devices, to transfer heat from a cold facility fluid to the downhole fluid.

A19. The thermal system of any of A1-A18, further comprising a secondary facility heat exchanger connected to one or more of the ground-source heat pump fluid circuit or the air-source heat pump fluid circuit and configured, via one or more fluid distribution devices, to exchange heat between a secondary facility fluid and one or more of the ground-source working fluid or the air-source working fluid.

A20. The thermal system of A19, wherein the ground-source heat pump fluid circuit and the air-source heat pump fluid circuit are connected to the secondary facility heat exchanger in parallel, and wherein the thermal system is configured to operate in a plurality of modes with respect to the secondary facility heat exchanger, including:
  a parallel heating mode, wherein the ground-source heat pump and the air-source heat pump each provide heating in parallel to both the facility fluid via the facility heat exchanger and to the secondary facility fluid via the secondary facility heat exchanger;
a parallel cooling mode, wherein the ground-source heat pump and the air-source heat pump each provide cooling in parallel to both the facility fluid via the facility heat exchanger and to the secondary facility fluid via the secondary facility heat exchanger;
a first heating-cooling mode wherein the ground-source heat pump provides heating to the facility fluid via the facility heat exchanger and the air-source heat pump provides cooling to the secondary facility fluid via the secondary facility heat exchanger;
a second heating-cooling mode wherein the air-source heat pump provides heating to the facility fluid via the facility heat exchanger and the ground-source heat pump provides cooling to the secondary facility fluid via the secondary facility heat exchanger;
a first cooling-heating mode, wherein the ground-source heat pump provides cooling to the facility fluid via the facility heat exchanger and the air-source heat pump provides heating to the secondary facility fluid via the secondary facility heat exchanger; and
a second cooling-heating mode, wherein the air-source heat pump provides cooling to the facility fluid via the facility heat exchanger and the ground-source heat pump provides heating to the secondary facility fluid via the secondary facility heat exchanger.

A21. The thermal system of A20, wherein the heating mode is a parallel heating mode and wherein the ground-source heat pump and the air-source heat pump each provide heating in parallel to the facility fluid via the facility heat exchanger and to the secondary fluid via the secondary fluid heat exchanger.

A22. The thermal system of A20 or A21, wherein the cooling mode is a parallel cooling mode and wherein the ground-source heat pump and the air-source heat pump each provide cooling in parallel to the facility fluid via the facility heat exchanger and to the secondary fluid via the secondary fluid heat exchanger.

A23. The thermal system of any of A19-A22, wherein the secondary facility fluid is a liquid.

A24. The thermal system of any of A1-A23, further comprising:
one or more sensors for measuring one or more of:
a temperature at one or more locations of the facility;
a temperature of the facility fluid at one or more locations of the facility fluid circuit;
a temperature of the ambient air;
a temperature of the air-source working fluid at one or more locations of the air-source heat pump fluid circuit;
a temperature of a geological formation of the downhole fluid circuit;
a temperature of the downhole fluid at one or more locations in the downhole fluid circuit; or
a temperature of the ground-source working fluid at one or more location of the ground-source heat pump fluid circuit;
one or more fluid distribution devices, including one or more valves, for configuring the thermal system into a plurality of operating modes to provide one or more of heating or cooling to the facility with one or more of the air-source heat pump or ground-source heat pump; and
a controller for controlling the one or more fluid distribution devices to configure the plurality of operating modes of the thermal system based on one or more measurements from the one or more sensors.

B1. A thermal unit for connecting to a facility fluid circuit of a facility for providing thermal conditioning to the facility based on exchanging heat with a facility fluid of the facility fluid circuit, the thermal unit comprising:
an enclosure having a return coupling for receiving a return flow of the facility fluid from the facility and having a supply coupling for providing a supply flow of the facility fluid to the facility;
a facility heat exchanger positioned within the enclosure for exchanging heat with the facility fluid;
a ground-source heat pump positioned within the enclosure, including:
a ground-source heat pump fluid circuit;
a ground-source heat exchanger positioned on the ground-source heat pump fluid circuit and configured to exchange heat with a downhole fluid of a downhole fluid circuit;
the facility heat exchanger positioned on the ground-source heat pump fluid circuit; and
a ground-source working fluid for circulating through the ground-source heat pump fluid circuit to exchange heat with the facility fluid at the facility heat exchanger, and to exchange heat with the downhole fluid at the ground-source heat exchanger; and
an air-source heat pump positioned within the enclosure, including:
an air-source heat pump fluid circuit,
an air-source heat exchanger positioned on the air-source heat pump fluid circuit and configured to exchange heat with an ambient air;
the facility heat exchanger positioned on the air-source heat pump fluid circuit; and
an air-source working fluid for circulating through the air-source heat pump fluid circuit to exchange heat with the facility fluid at the facility heat exchanger, and to exchange heat with the ambient air at the air-source heat exchanger;
wherein the ground-source heat pump and the air-source heat pump are connected to the facility heat exchanger in parallel and the thermal unit is configured to exchange heat between the facility fluid and the ambient air, and between the facility fluid and the downhole fluid.

B2. The thermal unit of B1, wherein the enclosure is transportable and wherein the enclosure is positionable on a roof of the facility or within the facility.

B3. The thermal unit of B1 or B2, further comprising a downhole coupling on or in the enclosure for connecting the ground-source heat exchanger to the downhole fluid circuit.

B4. The thermal unit of any of B1-B3, further comprising an ambient air coupling on or in the enclosure for providing access for the air-source heat exchanger to the ambient air.

B5. The thermal unit of any of B1-B4, further comprising a recovery heat exchanger positioned within the enclosure for exchanging heat between an inlet flow of the facility fluid provided from an air inlet of the facility fluid circuit and an exhaust flow of the facility fluid provided to an air outlet of the facility fluid circuit.

B6. The thermal unit of any of B1-B5, further comprising a supply heat exchanger positioned within the enclosure and connected to the downhole fluid circuit, wherein the supply heat exchanger is configured to exchange heat between the downhole fluid and the supply flow of the facility fluid.

B7. The thermal unit of any of B1-B6, further comprising an exhaust heat exchanger positioned within the enclosure and connected to the downhole fluid circuit, wherein the exhaust heat exchanger is configured to exchange heat between the downhole fluid circuit and an exhaust flow of the facility fluid.

B8. The thermal unit of any of B1-B7, further comprising a hot fluid heat exchanger positioned within the enclosure and connected to one or more of the ground-source heat pump fluid circuit or the air-source heat pump fluid circuit for transferring heat to a hot facility fluid from one or more of the ground-source working fluid or the air-source working fluid.

B9. The thermal unit of any of B1-B8, further comprising a cold fluid heat exchanger positioned within the enclosure and connected to the downhole fluid circuit, wherein the cold fluid heat exchanger is configured to transfer heat from a cold facility fluid to the downhole fluid.

B10. The thermal unit of any of B1-B9, further comprising a secondary facility heat exchanger positioned within the enclosure and connected to one or more of the ground-source heat pump fluid circuit or the air-source heat pump fluid circuit for exchanging heat between a secondary facility fluid and one or more of the ground-source working fluid or the air-source working fluid.

B11. The thermal unit of any of B1-B10, further comprising, within the enclosure:
one or more sensors for measuring one or more of:
a temperature at one or more locations of the facility;
a temperature of the facility fluid at one or more locations of the facility fluid circuit;
a temperature of the ambient air;
a temperature of the air-source working fluid at one or more locations of the air-source heat pump fluid circuit;
a temperature of a geological formation of the downhole fluid circuit;
a temperature of the downhole fluid at one or more locations in the downhole fluid circuit; or
a temperature of the ground-source working fluid at one or more location of the ground-source heat pump fluid circuit;
one or more fluid distribution devices, including one or more valves, for configuring the air-source heat pump, the ground-source heat pump, or both into a plurality of operating modes to provide heating, cooling, or both to the facility; and
a controller for controlling the one or more fluid distribution devices to configure the plurality of operating modes based on one or more measurements from the one or more sensors.

C1. A method of providing thermal conditioning to a facility, comprising:
circulating a ground-source working fluid through a ground-source heat pump fluid circuit, including:
exchanging heat between the ground-source working fluid and a facility fluid at a facility heat exchanger positioned on the ground-source heat pump fluid circuit; and
exchanging heat between the ground-source working fluid and a downhole fluid at a ground-source heat exchanger positioned on the ground-source heat pump fluid circuit;
circulating an air-source working fluid through an air-source heat pump fluid circuit, including:
exchanging heat between the air-source working fluid and the facility fluid at the facility heat exchanger positioned on the air-source heat pump fluid circuit; and
exchanging heat between the ground-source working fluid and an ambient air at an air-source heat exchanger positioned on the air-source heat pump fluid circuit;
conditioning the facility fluid to generate a conditioned facility fluid based on
circulating the ground-source working fluid and the air-source working fluid; and
circulating the conditioned facility fluid through a facility fluid circuit through the facility to provide the thermal conditioning to the facility.

C2. The method of C1, wherein the facility fluid is air.

C3. The method of C1 or C2, wherein the facility fluid is a liquid.

C4. The method of any of C1-C3, further comprising circulating the ground-source working fluid through the ground-source heat pump fluid circuit independent of and in parallel with circulating the air-source working fluid through the air-source heat pump fluid circuit to generate the conditioned facility fluid.

C5. The method of any of any of C1-C4, wherein conditioning the facility fluid circuit includes:
providing heating to the facility fluid from the ground-source working fluid and from the air-source working fluid; or
providing cooling to the facility fluid from the ground-source working fluid and from the air-source working fluid.

C6. The method of any of C1-C5, further comprising, with a recovery heat exchanger positioned on the facility fluid circuit, exchanging heat between an inlet flow of the facility fluid and an exhaust flow of the facility fluid.

C7. The method of any of C1-C6, further comprising, with a supply heat exchanger positioned on the facility fluid circuit, exchanging heat between the downhole fluid and a supply flow of the facility fluid.

C8. The method of any of C1-C7, further comprising, with an exhaust heat exchanger positioned on the facility fluid circuit, exchanging heat between the downhole fluid and an exhaust flow of the facility fluid.

C9. The method of any of C1-C8, further comprising, with a hot fluid heat exchanger positioned on one or more of the ground-source heat pump fluid circuit or the air-source heat pump fluid circuit, transferring heat to a hot facility fluid from one or more of the ground-source working fluid or the air-source working fluid.

C10. The method of any of C1-C9, further comprising, with a cold fluid heat exchanger connected to a downhole fluid circuit of the downhole fluid, transferring heat from a cold facility fluid to the downhole fluid.

C11. The method of any of C1-C10, further comprising, with a secondary facility heat exchanger connected to one or more of the ground-source heat pump fluid circuit or the air-source heat pump fluid circuit, exchanging heat between a secondary facility fluid and one or more of the ground-source working fluid or the air-source working fluid.

D1. A heating and cooling system for a building including:
- a. A building fluid circuit for circulating a building fluid in the building, configured to heat and/or cool the building,
- b. A heat pump system including:
  - i. at least a working fluid circuit for circulating a working fluid and comprising a compressor system;
  - ii. at least a first heat exchanger, wherein the at least one first heat exchanger is configured to exchange heat between the at least one of the working fluid circuit and at least a source circuit; and
  - iii. a second heat exchanger configured to exchange heat between the at least one of the working fluid circuit and the building fluid circuit,
- c. Two source circuits including
  - i. A downhole fluid circuit for circulating a downhole fluid between the or at least one of the first heat exchanger of the heat pump system and a borehole heat exchanger situated in a geological formation;
  - ii. An air circulation circuit for circulating air in the or at least one of the first heat exchanger of the heat pump system,
- Wherein the system is configured so that heat is transferred from the downhole fluid and from air to the building fluid.

D2. The system of D1, wherein the heat pump system includes:
- a. A Working fluid circuit,
- b. One first heat exchanger configured to exchange heat between the downhole fluid circuit, the air circulation circuit and the working fluid circuit.
- c.

D3. The system of D1 or D2, wherein the heat pump system includes:
- a. a first working fluid circuit, and a second working fluid circuit,
- b. the at least one first heat exchanger includes:
  - i. a ground source heat exchanger for exchanging heat between the downhole fluid circuit and the first working fluid circuit,
  - ii. an air heat exchanger for exchanging heat between the air circulation circuit and the second working fluid circuit.
    - wherein the second heat exchanger to exchange heat between the first and second working fluid circuits and the building fluid circuit.

D4. The system of any D1-D3, wherein each working fluid circuit includes a fluid circulation device movable between a first position enabling a first mode of operation in which the working fluid extracts heat from at least one of the source circuits through the at least one first heat exchanger and a second position enabling a second mode of operation in which the working fluid extracts heat from the building fluid through the second heat exchanger.

D5. The system of D3 or D4, configured so that the fluid circulation devices of the first and second working fluid circuit so that the first and second working fluid circuits are in the same mode of operation.

D6. The system of any of D1-D5, including one or more sensors to measure parameters of the building and/or of the external environment and/or of the building fluid and/or of the downhole fluid and/or of the at least one working fluids, and a processor to control the system as a function of one or more of the measured parameters.

D7. The system of any of D1-D6, wherein the building fluid is air, and wherein the system includes an air inlet connected to the external environment for entering renewed air in the building, D8. The system of D7, including an air outlet connected to the external environment for exiting used air from the building and a heat exchanger between the air inlet and the air outlet.

D9. The system of D7 or D8, including at least an air damper in the air inlet and/or outlet and a regulating motor to control the air dampers.

D10. The system of any of D1-D9, including one or more sensors to measure parameters of the building and/or of the external environment and/or of the building fluid and/or of the downhole fluid and/or of the at least one working fluids and at least one processor to control the regulating motor as a function of one or more measured parameters.

D11. The system of any of D7-D10, including at least a freecooling/freeheating heat exchanger configured to exchange heat between the renewed air and or used air and the downhole fluid circulating in the downhole fluid circuit.

D12. The system of D11, wherein the downhole fluid circuit including a downhole fluid circulating device to allow or prevent the circulation of the downhole fluid in the at least one freecooling/freeheating heat exchanger.

D13. The system of D11 or D12, including one or more sensors to measure parameters of the building and/or of the external environment and/or of the building fluid and/or of the downhole fluid and at least one processor to control downhole fluid circulating device as a function of one or more measured parameters.

D14. The system of any of D1-D13, further comprising a hot water supply circuit, and a hot water heat exchanger to exchange heat between the hot water supply circuit and at least one of the working fluid circuits.

D15. The system of any of D1-D14, further comprising a cold fluid supply circuit and a cold fluid heat exchanger to exchange heat between the downhole fluid circuit and the cold fluid circuit.

D16. The system of any of any of D1-D15, further comprising a second building fluid circuit to heat and/or cool the building and a second building fluid heat exchanger to exchange heat between the second building fluid circuit and the at least one working fluid circuit.

D17. The system of any of D1-D16, including a unit including:
- The heat pump system,
- The air circulation circuit,
- A downhole fluid circuit having inlet and outlet connected to the borehole heat exchanger, and optionally one or more fluid circulation devices,
- A building fluid circuit having a building fluid inlet and outlet connected to the building, wherein the building fluid circuit outlet is optionally associated with an air damper,
- Optionally the air inlet, optionally associated with an air damper,
- Optionally the air outlet, optionally associated with an air damper, Optionally the regulating motor for regulating the air dampers, Optionally the freecooling/freeheating heat exchanger, Optionally the hot water supply inlet and outlet and the hot water heat exchanger, Optionally the cold fluid supply inlet and outlet and a cold fluid heat exchanger, Optionally a second building fluid circuit inlet and outlet and the second building fluid heat exchanger, Optionally the one or more sensors to measure parameters of the building and/or of the external environment and/or of the building fluid and/or of the downhole fluid and/or of the at least one working fluids; and Optionally at least one processor to control one or more devices of the system as a function of the one or more measured parameters.

E1. A heating and cooling unit for a building including:
  a. A building fluid circuit having a building fluid inlet and outlet to connect the heating and cooling unit to the building fluid supply circuit configured to heat and/or cool the building,
  b. A heat pump system including:
    i. at least a working fluid circuit for circulating a working fluid and comprising a compressor system;
    ii. at least a first heat exchanger, wherein the at least one first heat exchanger is configured to exchange heat between the or at least one of the working fluid circuit and at least a source circuit; and
    iii. a second heat exchanger configured to exchange heat between the or at least one of the working fluid circuit and the building fluid circuit,
  c. An air circulation circuit for circulating air in the or at least one of the first heat exchanger of the heat pump system,
  d. A downhole fluid circuit for circulating a downhole fluid having a downhole fluid circuit inlet and outlet for connecting the unit to a borehole heat exchanger situated in a geological formation, wherein the downhole fluid circuit is configured to connect the borehole heat exchanger to the at least one first heat exchanger;
  Wherein the unit is configured so that heat is transferred from the downhole fluid and from air to the building fluid.

E2. The unit of E1, wherein it is situated on the roof or inside of the building.

E3. The unit of E1 or E2, wherein the heat pump system includes:
  a. A Working fluid circuit,
  b. One first heat exchanger configured to exchange heat between the downhole fluid circuit, the air circulation circuit and the working fluid circuit.

E4. The unit of claim any of E1-E3, wherein the heat pump system includes:
  a. a first working fluid circuit, and a second working fluid circuit,
  b. the at least one first heat exchanger includes:
    i. a ground source heat exchanger for exchanging heat between the downhole fluid circuit and the first working fluid circuit,
    ii. an air heat exchanger for exchanging heat between the air circulation circuit and the second working fluid circuit,
  wherein the second heat exchanger to exchange heat between the first and second working fluid circuits and the building fluid circuit.

E5. The unit of any of E1-E4, wherein each working fluid circuit includes a fluid circulation device movable between a first position enabling a first mode of operation in which the working fluid extracts heat from at least one of the source circuits through the at least one first heat exchanger and a second position enabling a second mode of operation in which the working fluid extracts heat from the building fluid through the second heat exchanger.

E6. The unit of E4 or E5, configured so that the fluid circulation devices of the first and second working fluid circuit so that the first and second working fluid circuits are in the same mode of operation.

E7. The unit of any of E1-E6, including one or more sensors to measure parameters of the building and/or of the external environment and/or of the building fluid and/or of the downhole fluid and/or of the at least one working fluids, and a processor to control the system as a function of one or more of the measured parameters.

E8. The unit of any of E1-E7, wherein the building fluid is air, and wherein the unit includes an air inlet connected to the external environment for entering renewed air in the building, E9. The unit of E8, including an air outlet connected to the external environment for exiting used air from the building and a heat exchanger between the building fluid inlet and the building fluid outlet.

E10. The unit of E8 or E9, including at least an air damper in the air inlet and/or outlet and a regulating motor to control the air dampers.

E11. The unit of any of E1-E11, including one or more sensors to measure parameters of the building and/or of the external environment and/or of the building fluid and/or of the downhole fluid and/or of the at least one working fluid and at least one processor to control the regulating motor as a function of one or more measured parameters.

E12. The system of E9-E11, including at least a freecooling/freeheating heat exchanger configured to exchange heat between the renewed air and or used air and the downhole fluid circulating in the downhole fluid circuit.

E13. The unit of E12, wherein the downhole fluid circuit including a downhole fluid circulating device to allow or prevent the circulation of the downhole fluid in the at least one freecooling/freeheating heat exchanger.

E14. The unit of E13, including one or more sensors to measure parameters of the building and/or of the external environment and/or of the building fluid and/or of the downhole fluid and at least one processor to control downhole fluid circulating device as a function of one or more measured parameters.

E15. The unit of any of E1-E14, further comprising a hot water circuit having a hot water inlet and outlet to connect to a hot water supply circuit of the building, and a hot water heat exchanger to exchange heat between the hot water circuit and at least one of the working fluid circuits.

E16. The unit of any of E1-E15, further comprising a cold fluid circuit having a cold fluid inlet and outlet to connect to a cold fluid supply circuit of the building and a cold water heat exchanger to exchange heat between the downhole fluid circuit and the cold water circuit.

E17. The unit of any of E1-E16, further comprising a second building fluid circuit having a second building fluid inlet and outlet to connect to a second building fluid supply circuit of the building and configured to heat and/or cool the building, and a second building fluid heat exchanger to exchange heat between the second building fluid unit circuit and the at least one working fluid circuit.

F1. A thermal system as disclosed in the present disclosure.

G1. A thermal unit as disclosed in the current specification.

H1. A method for operating a thermal system and/or a thermal unit as disclosed in the present disclosure.

I1. A heating and cooling system for a building including:
 a. A building fluid circuit for circulating a building fluid in the building, configured to heat and/or cool the building,
 b. A ground source heat pump system including:
  i. a first working fluid circuit for circulating a working fluid and comprising a compressor system;
  ii. a first ground source heat exchanger, configured to exchange heat between the first working fluid circuit and a downhole fluid circuit for circulating a downhole fluid between through a borehole heat exchanger situated in a geological formation; and
  iii. a second ground source heat exchanger configured to exchange heat between the first working fluid circuit and the building fluid circuit,
 c. A air source heat pump system including:
  i. a second working fluid circuit for circulating a working fluid and comprising a compressor system;
  ii. a first air source heat exchanger, configured to exchange heat between the second working fluid circuit and an air fluid circuit in fluid communication with air from the outside environment; and
  iii. a second air source heat exchanger configured to exchange heat between the second working fluid circuit and the building fluid circuit,
 wherein the heating and cooling system is configured so that heat is transferred from both the downhole fluid and from air to the building fluid.

I2. The system of I1, wherein at least one of the first and second working fluid circuit includes a fluid circulation device movable between a first position enabling a first mode of operation in which the working fluid extracts heat from the air circulation, respectively downhole fluid circulation system, through the first air source, respectively ground source, heat exchanger and a second position enabling a second mode of operation in which the working fluid extracts heat from the building fluid through the second air source, respectively ground source, heat exchanger.

I3. The system of I2, configured so that the fluid circulation devices of the first and second working fluid circuit so that the first and second working fluid circuits are in the same mode of operation.

I4. The system of any of I2-I3, including one or more sensors to measure parameters of the building and/or of the external environment and/or of the building fluid and/or of the downhole fluid and/or of the at least one working fluids, and a processor to control the system as a function of one or more of the measured parameters.

I5. The system of I4, wherein the processor controls both the air source heat pump system and the ground source heat pump system.

I6. The system of any of I1-I5, wherein the building fluid is air, and wherein the system includes at least an air inlet connected to the external environment for entering renewed air in the building, I7. The system of I6, including at least an air outlet connected to the external environment for exiting used air from the building and a heat exchanger between the air inlet and the air outlet.

I8. The system of I6 or I7, including at least an air damper in the air inlet and/or outlet and a regulating motor to control the air dampers.

I9. The system of I8, including one or more sensors to measure parameters of the building and/or of the external environment and/or of the building fluid and/or of the downhole fluid and/or of the at least one working fluid and at least one processor to control the regulating motor as a function of one or more measured parameters.

I10. The system of any of I6-I9, including at least a freecooling/freeheating heat exchanger configured to exchange heat between the renewed air and/or used air and the downhole fluid circulating in the downhole fluid circuit.

I11. The system of I10, wherein the downhole fluid circuit including a downhole fluid circulating device to allow or prevent the circulation of the downhole fluid in the at least one freecooling/freeheating heat exchanger.

I12. The system of I10 or I11, including one or more sensors to measure parameters of the building and/or of the external environment and/or of the building fluid and/or of the downhole fluid and at least one processor to control downhole fluid circulating device as a function of one or more measured parameters.

I13. The system of any of I1-I12, further comprising a hot water supply circuit, and a hot water heat exchanger to exchange heat between the hot water supply circuit and at least one of the first and second working fluid circuits.

I14. The system of any of I1-I13, further comprising a cold fluid supply circuit and a cold fluid heat exchanger to exchange heat between the downhole fluid circuit and the cold fluid circuit.

I15. The system of any of I1-I14, further comprising a second building fluid circuit to heat and/or cool the building and a second building fluid heat exchanger to exchange heat between the second building fluid circuit and at least one of the first and second working fluid circuit.

I16. The system of any of I1-I15, including:
 a. a first unit including:
  The ground source heat pump system,
  A downhole fluid circuit having inlet and outlet connected to the borehole heat exchanger, and optionally one or more fluid circulation devices,
  A first building fluid fluid inlet and outlet connected to a building fluid circuit,
 b. a second unit including:
  The air source heat pump system,
  The air circulation circuit having inlet and outlet connected to an external environment of the building,
  A second building fluid fluid inlet and outlet connected to the building fluid circuit, I17. The system of claim I16, wherein at least one of the first and second unit is a rooftop unit.

I18. The system of I16 or I17, wherein at least one of the first and second unit includes one or more of:

the air inlet, optionally associated with an air damper,
the air outlet, optionally associated with an air damper,
the regulating motor for regulating the air dampers,
the freecooling/freeheating heat exchanger connected to the downhole fluid circuit,
the hot water supply inlet and outlet and the hot water heat exchanger,
the cold fluid supply inlet and outlet and a cold fluid heat exchanger,
a second building fluid circuit inlet and outlet and the second building fluid heat exchanger,
the one or more sensors to measure parameters of the building and/or of the external environment and/or of the building fluid and/or of the downhole fluid and/or of the at least one working fluids; and
the at least one processor to control the system as a function of the one or more measured parameters.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A thermal system for a facility, comprising:
    a facility fluid circuit, including:
        a facility fluid for circulating in the facility to provide thermal conditioning of the facility; and
        a facility heat exchanger for exchanging heat with the facility fluid;
    a ground-source heat pump thermally connected to the facility fluid circuit, including:
        a ground-source heat pump fluid circuit;
        a ground-source heat exchanger positioned on the ground-source heat pump fluid circuit and configured to exchange heat with a downhole fluid;
        the facility heat exchanger positioned on the ground-source heat pump fluid circuit;
        a ground-source working fluid for circulating through the ground-source heat pump fluid circuit to exchange heat with the facility fluid at the facility heat exchanger, and to exchange heat with the downhole fluid of a downhole fluid circuit at the ground-source heat exchanger; and
    a supply heat exchanger connected to the downhole fluid circuit and configured, via one or more fluid distribution devices, to exchange heat between the downhole fluid and a supply flow of the facility fluid; and
    an air-source heat pump thermally connected to the facility fluid circuit, including:
        an air-source heat pump fluid circuit;
        an air-source heat exchanger positioned on the air-source heat pump fluid circuit and configured to exchange heat with an ambient air;
        the facility heat exchanger positioned on the air-source heat pump fluid circuit; and
        an air-source working fluid for circulating through the air-source heat pump fluid circuit to exchange heat with the facility fluid at the facility heat exchanger, and to exchange heat with the ambient air at the air-source heat exchanger.

2. The thermal system of claim 1, further comprising the downhole fluid circuit, including:
a heat exchanger configured to exchange heat with a geological formation;
the ground-source heat exchanger; and
the downhole fluid for circulating through the downhole fluid circuit to exchange heat with the ground-source working fluid at the ground-source heat exchanger and to exchange heat with the geological formation at the heat exchanger.

3. The thermal system of claim 1, wherein the ambient air includes at least some exhaust air exhausted from the facility such that the air-source heat exchanger is configured to exchange heat with the at least some exhaust air.

4. The thermal system of claim 1, wherein the ground-source heat pump and the air-source heat pump each includes one or more compressors and one or more expansion valves for exchanging heat based on performing mechanical work on the ground-source working fluid and the air-source working fluid, and wherein the ground-source heat pump and the air-source heat pump are each reversible heat pumps for transferring heat to and from the facility fluid.

5. The thermal system of claim 1, further comprising:
one or more fluid distribution devices included on the air-source heat pump fluid circuit for directing the air-source working fluid between the air-source heat exchanger and the facility heat exchanger;
one or more fluid distribution devices included on the ground-source heat pump fluid circuit for directing the ground-source working fluid between the ground-source heat exchanger and the facility heat exchanger; and
a controller for controlling an operation of the thermal system based on controlling the one or more fluid distribution devices of the air-source heat pump fluid circuit and of the ground-source heat pump fluid circuit.

6. The thermal system of claim 1, wherein the ground-source heat pump fluid circuit and the air-source heat pump fluid circuit are independent and are connected to the facility fluid circuit in parallel.

7. The thermal system of claim 1, wherein the thermal system is configured to operate in a dual heating mode to provide heating to the facility with the ground-source heat pump and the air-source heat pump through the facility heat exchanger.

8. The thermal system of claim 1, wherein the thermal system is configured to operate in a dual cooling mode to provide cooling to the facility with the ground-source heat pump and the air-source heat pump through the facility heat exchanger.

9. The thermal system of claim 1, further comprising an inlet for providing at least some of the facility fluid through the inlet as an inlet flow of the facility fluid, and an outlet for exhausting at least some of the facility fluid through the outlet as an exhaust flow of the facility fluid, and further comprising a recovery heat exchanger for exchanging heat between the inlet flow and the exhaust flow.

10. The thermal system of claim 1, wherein the supply heat exchanger is positioned on the facility fluid circuit upstream of the facility heat exchanger to pre-condition the supply flow of the facility fluid before flowing through the facility heat exchanger.

11. A thermal system for a facility, comprising:
a facility fluid circuit, including:
a facility fluid for circulating in the facility to provide thermal conditioning of the facility; and
a facility heat exchanger for exchanging heat with the facility fluid;
a ground-source heat pump thermally connected to the facility fluid circuit, including:
a ground-source heat pump fluid circuit;
a ground-source heat exchanger positioned on the ground-source heat pump fluid circuit and configured to exchange heat with a downhole fluid;
the facility heat exchanger positioned on the ground-source heat pump fluid circuit;
a ground-source working fluid for circulating through the ground-source heat pump fluid circuit to exchange heat with the facility fluid at the facility heat exchanger, and to exchange heat with the downhole fluid of a downhole fluid circuit at the ground-source heat exchanger; and
an exhaust heat exchanger connected to the downhole fluid circuit and configured, via one or more fluid distribution devices, to exchange heat between the downhole fluid and an exhaust flow of the facility fluid; and
an air-source heat pump thermally connected to the facility fluid circuit, including:
an air-source heat pump fluid circuit;
an air-source heat exchanger positioned on the air-source heat pump fluid circuit and configured to exchange heat with an ambient air;
the facility heat exchanger positioned on the air-source heat pump fluid circuit; and
an air-source working fluid for circulating through the air-source heat pump fluid circuit to exchange heat with the facility fluid at the facility heat exchanger, and to exchange heat with the ambient air at the air-source heat exchanger.

12. The thermal system of claim 1, further comprising a hot fluid heat exchanger connected to one or more of the ground-source heat pump fluid circuit or the air-source heat pump fluid circuit and configured, via one or more fluid distribution devices, to transfer heat to a hot facility fluid from one or more of the ground-source working fluid or the air-source working fluid.

13. The thermal system of claim 12, wherein the hot fluid heat exchanger is positioned directly downstream from one or more compressors of the ground-source heat pump, directly downstream from one or more compressors of the air-source heat pump, or both.

14. The thermal system of claim 1, further comprising a cold fluid heat exchanger connected to the downhole fluid circuit and configured, via one or more fluid distribution devices, to transfer heat from a cold facility fluid to the downhole fluid.

15. The thermal system of claim 1, further comprising a secondary facility heat exchanger connected to one or more of the ground-source heat pump fluid circuit or the air-source heat pump fluid circuit and configured, via one or more fluid distribution devices, to exchange heat between a secondary facility fluid and one or more of the ground-source working fluid or the air-source working fluid.

16. The thermal system of claim 15, wherein the ground-source heat pump fluid circuit and the air-source heat pump fluid circuit are connected to the secondary facility heat exchanger in parallel, and wherein the thermal system is configured to operate in a plurality of modes with respect to the secondary facility heat exchanger, including:

a heating mode, wherein the ground-source heat pump and the air-source heat pump each provide heating to at least one of the facility fluid via the facility heat exchanger or the secondary facility fluid via the secondary facility heat exchanger;

a cooling mode, wherein the ground-source heat pump and the air-source heat pump each provide cooling to at least one of the facility fluid via the facility heat exchanger or the secondary facility fluid via the secondary facility heat exchanger;

a first heating-cooling mode wherein the ground-source heat pump provides heating to the facility fluid via the facility heat exchanger and the air-source heat pump provides cooling to the secondary facility fluid via the secondary facility heat exchanger;

a second heating-cooling mode wherein the air-source heat pump provides heating to the facility fluid via the facility heat exchanger and the ground-source heat pump provides cooling to the secondary facility fluid via the secondary facility heat exchanger;

a first cooling-heating mode, wherein the ground-source heat pump provides cooling to the facility fluid via the facility heat exchanger and the air-source heat pump provides heating to the secondary facility fluid via the secondary facility heat exchanger; and a second cooling-heating mode, wherein the air-source heat pump provides cooling to the facility fluid via the facility heat exchanger and the ground-source heat pump provides heating to the secondary facility fluid via the secondary facility heat exchanger.

17. The thermal system of claim 1, further comprising:
one or more sensors for measuring one or more of:
   a temperature at one or more locations of the facility;
   a temperature of the facility fluid at one or more locations of the facility fluid circuit;
   a temperature of the ambient air;
   a temperature of the air-source working fluid at one or more locations of the air-source heat pump fluid circuit;
   a temperature of a geological formation of the downhole fluid circuit;
   a temperature of the downhole fluid at one or more locations in the downhole fluid circuit; or
   a temperature of the ground-source working fluid at one or more location of the ground-source heat pump fluid circuit;
one or more fluid distribution devices, including one or more valves, for configuring the thermal system into a plurality of operating modes to provide one or more of heating or cooling to the facility with one or more of the air-source heat pump or ground-source heat pump; and
a controller for controlling the one or more fluid distribution devices to configure the plurality of operating modes of the thermal system based on one or more measurements from the one or more sensors.

18. A thermal unit for connecting to a facility fluid circuit of a facility for providing thermal conditioning to the facility based on exchanging heat with a facility fluid of the facility fluid circuit, the thermal unit comprising:

an enclosure having a return coupling for receiving a return flow of the facility fluid from the facility and having a supply coupling for providing a supply flow of the facility fluid to the facility;

a facility heat exchanger positioned within the enclosure for exchanging heat with the facility fluid;

a ground-source heat pump positioned within the enclosure, including:
   a ground-source heat pump fluid circuit;
   a ground-source heat exchanger positioned on the ground-source heat pump fluid circuit and configured to exchange heat with a downhole fluid of a downhole fluid circuit;
   the facility heat exchanger positioned on the ground-source heat pump fluid circuit;
   a ground-source working fluid for circulating through the ground-source heat pump fluid circuit to exchange heat with the facility fluid at the facility heat exchanger, and to exchange heat with the downhole fluid at the ground-source heat exchanger; and
   a supply heat exchanger connected to the downhole fluid circuit and configured, via one or more fluid distribution devices, to exchange heat between the downhole fluid and a supply flow of the facility fluid; and an air-source heat pump positioned within the enclosure, including:
   an air-source heat pump fluid circuit;
   an air-source heat exchanger positioned on the air-source heat pump fluid circuit and configured to exchange heat with an ambient air;
   the facility heat exchanger positioned on the air-source heat pump fluid circuit; and
   an air-source working fluid for circulating through the air-source heat pump fluid circuit to exchange heat with the facility fluid at the facility heat exchanger, and to exchange heat with the ambient air at the air-source heat exchanger;

wherein the ground-source heat pump and the air-source heat pump are connected to the facility heat exchanger in parallel and the thermal unit is configured to exchange heat between the facility fluid and the ambient air, and between the facility fluid and the downhole fluid.

19. The thermal system of claim 11, further comprising a hot fluid heat exchanger connected to one or more of the ground-source heat pump fluid circuit or the air-source heat pump fluid circuit and configured, via one or more fluid distribution devices, to transfer heat to a hot facility fluid from one or more of the ground-source working fluid or the air-source working fluid.

20. The thermal system of claim 11, further comprising a cold fluid heat exchanger connected to the downhole fluid circuit and configured, via one or more fluid distribution devices, to transfer heat from a cold facility fluid to the downhole fluid.

* * * * *